United States Patent
Zhang et al.

(10) Patent No.: US 11,161,105 B2
(45) Date of Patent: Nov. 2, 2021

(54) HYDROGENATION CATALYST, ITS PRODUCTION AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Le Zhang, Beijing (CN); Mingfeng Li, Beijing (CN); Huifeng Li, Beijing (CN); Hong Nie, Beijing (CN); Shi Ding, Beijing (CN); Xuefen Liu, Beijing (CN); Zhihai Hu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 0 days.

(21) Appl. No.: 16/332,292

(22) PCT Filed: Apr. 24, 2017

(86) PCT No.: PCT/CN2017/000318
§ 371 (c)(1),
(2) Date: Mar. 11, 2019

(87) PCT Pub. No.: WO2018/045693
PCT Pub. Date: Mar. 15, 2018

(65) Prior Publication Data
US 2019/0232269 A1    Aug. 1, 2019

(30) Foreign Application Priority Data

Sep. 12, 2016 (CN) .......................... 201610817658.0
Sep. 12, 2016 (CN) .......................... 201610818804.1
Sep. 12, 2016 (CN) .......................... 201610819780.1

(51) Int. Cl.
| | |
|---|---|
| *B01J 35/00* | (2006.01) |
| *B01J 21/04* | (2006.01) |
| *B01J 23/882* | (2006.01) |
| *B01J 23/883* | (2006.01) |
| *B01J 23/888* | (2006.01) |
| *C10G 45/08* | (2006.01) |
| *B01J 37/02* | (2006.01) |
| *B01J 21/06* | (2006.01) |
| *B01J 21/08* | (2006.01) |
| *B01J 21/12* | (2006.01) |
| *B01J 27/132* | (2006.01) |
| *B01J 31/34* | (2006.01) |

(Continued)

(52) U.S. Cl.
CPC ........... *B01J 35/0006* (2013.01); *B01J 21/04* (2013.01); *B01J 21/066* (2013.01); *B01J 21/08* (2013.01); *B01J 21/12* (2013.01); *B01J 23/882* (2013.01); *B01J 23/883* (2013.01); *B01J 23/888* (2013.01); *B01J 23/8885* (2013.01); *B01J 27/132* (2013.01); *B01J 31/34* (2013.01); *B01J 37/02* (2013.01); *B01J 37/0207* (2013.01); *B01J 37/0213* (2013.01); *B01J 37/0236* (2013.01); *B01J 37/08* (2013.01); *B01J 37/20* (2013.01); *C10G 45/08* (2013.01); *C10G 2300/1055* (2013.01); *C10G 2300/202* (2013.01)

(58) Field of Classification Search
CPC ...... B01J 35/0006; B01J 21/04; B01J 21/066; B01J 21/12; B01J 21/08
USPC ......................................................... 502/246
See application file for complete search history.

(56) References Cited

U.S. PATENT DOCUMENTS 3,547,830 A * 12/1970 Shropshire ............... B01J 23/74
502/104
5,468,709 A   11/1995 Abe Satoshi et al.
(Continued)

FOREIGN PATENT DOCUMENTS

| | | |
|---|---|---|
| CN | 1325942 A | 12/2001 |
| CN | 1609172 A | 4/2005 |

(Continued)

OTHER PUBLICATIONS

Rinaldi, Nino et al.; "Hydrodesulfurization Activity of Co—Mo/Al2O3 Catalysts Prepared with Citric Acid: Post-treatment of Calcined Catalysts with High Mo Loading", Journal of the Japan Petroleum Institute, 53, (5), 292-302; Jan. 27, 2010.

(Continued)

*Primary Examiner* — Melissa S Swain
(74) *Attorney, Agent, or Firm* — Novick, Kim & Lee, PLLC; Allen Xue

(57) ABSTRACT

The present application relates to a hydrogenation catalyst, a process for producing the same and application thereof in the hydrotreatment of feedstock oil. The process comprises at least the following steps: (1) contacting a first active metal component and a first organic complexing agent with a carrier to obtain a composite carrier; (2) calcining the composite carrier to obtain a calcined composite carrier having a total carbon content of 1% by weight or less; and (3) contacting a second organic complexing agent with the calcined composite carrier to obtain the hydrogenation catalyst. The hydrogenation catalyst has both excellent hydrodesulfurization activity and hydrodenitrogenation activity, and exhibits a significantly prolonged service life.

14 Claims, No Drawings

(51) Int. Cl.
  *B01J 37/08* (2006.01)
  *B01J 37/20* (2006.01)

(56) References Cited

U.S. PATENT DOCUMENTS

| | | | | |
|---|---|---|---|---|
| 5,759,947 | A | * | 6/1998 | Zhou ................... B01J 23/8892 |
| | | | | 502/324 |
| 8,697,598 | B2 | | 4/2014 | Long et al. |
| 2003/0116473 | A1 | | 6/2003 | Koide et al. |
| 2004/0186013 | A1 | | 9/2004 | Iwata et al. |
| 2007/0207921 | A1 | * | 9/2007 | Sijpkes ............... B01J 37/0203 |
| | | | | 502/338 |
| 2013/0217915 | A1 | * | 8/2013 | Nakazawa ............ B01J 27/199 |
| | | | | 562/535 |
| 2015/0202614 | A1 | * | 7/2015 | Inoue ..................... B01J 38/02 |
| | | | | 502/33 |

FOREIGN PATENT DOCUMENTS

| | | | |
|---|---|---|---|
| CN | 1853777 | A | 11/2006 |
| CN | 102166520 | A | 8/2011 |
| CN | 102247864 | A | 11/2011 |
| CN | 102909027 | A | 2/2013 |
| CN | 102950012 | A | 3/2013 |
| CN | 103055956 | A | 4/2013 |
| CN | 103551162 | A | 2/2014 |
| CN | 102600913 | B | 6/2014 |
| CN | 104941654 | A | 9/2015 |
| CN | 104998670 | A | 10/2015 |
| CN | 105435824 | A | 3/2016 |
| CN | 106607039 | A | 5/2017 |
| CN | 106607096 | A | 5/2017 |
| CN | 106607097 | A | 5/2017 |
| EP | 2918339 | A1 | 9/2015 |
| JP | 04156948 | A  * | 5/1992 ............ B01J 23/882 |
| JP | H06226108 | A | 8/1994 |
| JP | H07108173 | A | 4/1995 |
| JP | 2001300325 | A | 10/2001 |
| JP | 2012214604 | A  * | 11/2012 ............ B01J 37/088 |
| RU | 2249601 | C2 | 4/2005 |
| WO | 200174973 | A1 | 10/2001 |
| WO | 2003002253 | A1 | 1/2003 |
| WO | 2012133316 | A1 | 10/2012 |
| WO | 2012133319 | A1 | 10/2012 |
| WO | 2013093228 | A1 | 6/2013 |

OTHER PUBLICATIONS

Fujikawa, Takashi et al.; "Development of Highly Acive Co—Mo Catalysts with Phosphorus and Citric acid for Ultra-deep Desulfurization of Diesel fractions (Part 1) Preparation and Performance of Catalysts", Journal of the Japan Petroleum Institute, vol. 48, No. 2, pp. 106-113 (2005).

Nino Rinaldi et al.: "Effect of Citric Acid Addition on Co—Mo/$B_2O_3$/$Al_2O_3$ Catalysts Prepared by a Post-Treatment Method", Industrial & Engineering Chemistry Research, vol. 48, No. 23, Sep. 25, 2009, pp. 10414-10424, XP055683964, ISSN: 0888-5885, DOI: 10.1021/ie9008343.

* cited by examiner

HYDROGENATION CATALYST, ITS PRODUCTION AND APPLICATION THEREOF

TECHNICAL FIELD

The present application relates to a catalyst, in particular to a hydrogenation catalyst. The present application also relates to a process for the production of the hydrogenation catalyst and the application thereof in the hydrotreatment of feedstock oils.

BACKGROUND ART

Increasing environmental awareness and increasingly stringent environmental regulations have forced the refining industry to focus more on the development of clean fuel production technologies. In the future market, vehicle fuels tend to be "ultra-low sulfur", and fuels that fail to meet emission standards will not be able to enter the market. As an effective means of desulfurization, hydrogenation technology plays an increasingly important role in the production of clean vehicle fuels. Here, hydrogenation catalysts are the key point of this type of hydrogenation technology. Therefore, the development of new hydrogenation catalysts with higher catalytic activity has become one of the most urgent needs of the refining industry.

It is known that hydrogenation catalysts are generally produced by an impregnation method. For example, Chinese Patent Application No. CN 103551162 A discloses a process for producing a hydrogenation catalyst. However, the hydrogenation catalyst produced by the conventional impregnation method has room for further improvement in catalytic activity. Further, the hydrogenation catalyst can also be produced by a complexation-impregnation method. For example, Chinese Patent Application No. CN 102909027 A discloses a process for producing a hydrogenation catalyst by using an organic complexing agent during the impregnation step. Although the complexation-impregnation method can improve the catalytic activity of the hydrogenation catalyst to some extent, there is a problem that the catalytic activity is decreased too fast and the service life of the catalyst is too short.

Thus, there is still a need in the art of a hydrogenation catalyst that exhibits improved catalytic activity as compared to existing hydrogenation catalysts, while exhibiting a significantly extended service life.

SUMMARY OF THE INVENTION

The inventors of the present application have found through intensive research that, on the one hand, in the prior complexation-impregnation method, by introducing an organic complexing agent during the impregnation process and drying at a low temperature, the interaction between the active component and the carrier can be weakened, the dispersion of metal can be improved, and the sulfurization sequence of the metal can be changed, so that more active phase with high activity can be formed and the number of active centers can be increased. However, due to the low temperature drying empolyed in such a complexation-impregnation technique and the absence of the high temperature calcination process, the metal compound is still present on the surface of the carrier in the form of metal salts, and the interation between the active component and the carrier is weak, resulting in a number of problems under hydrogenation conditions of high temperature, high pressure and poor raw materials, including the accumulation of the metal during the reaction process, the weakening of the auxiliary effect, the reduction of the number of active centers, and the decrease of the intrinsic activity. As a result, the catalytic activity and stability of the hydrogenation catalyst thus produced is reduced. On the other hand, although the hydrogenation catalyst produced by the prior impregnation method has a better stability, the interation between the active component and the carrier is strong, and the intrinsic activity of the active center is low. In addition, due to the absence of the dispersive and barrier effect of the complexing agent, the platelets of the active component are large, while the number of active centers is small. As a result, the catalytic activity is difficult to be increased.

Without being bound by any theory, the inventors of the present application believe that the catalytic activity of the catalyst can be improved by adding an organic complexing agent during the first impregnation step and then calcining according to the process of the present application. Moreover, it is possible to effectively maintain the high activity of the catalyst for a long time, thereby greatly increasing the service life of the catalyst. It is speculated that the reason may be that when the organic complexing agent is added during the first impregnation step, the presence of the organic complexing agent hinders the aggregation of the active metal during the calcination, making the dispersion thereof more uniform; and, at the same time, the calcination after the first impregnation step can convert the metal compound into a metal oxide, thereby making the bond between the active metal and the carrier stronger, and improving the catalytic activity and stability of the catalyst. In addition, by adding an organic complexing agent during the second impregnation step to cover the surface of the catalyst with the same, the agglomeration of the active metal during the sulfurization process can be effectively prevented, so that the dispersion of the metal can be improved, which is more favorable to the formation of a Class II active phase with higher activity and the formation of more active centers, thereby further increasing the catalytic activity of the catalyst.

The inventors of the present application have completed the present invention based on the foregoing findings and have solved the aforementioned problems existing in the prior art.

In particular, the present application relates to the following aspects.

1. A process for producing a hydrogenation catalyst, comprising the steps of:

(1) contacting a first active metal component, a first organic complexing agent and an optional coagent with a carrier to obtain a composite carrier;

(2) calcining the composite carrier to obtain a calcined composite carrier, wherein the total carbon content on dry basis of the calcined composite carrier is 1% by weight or less, 0.5% by weight or less, 0.4% by weight or less, 0.3% by weight or less, 0.1% by weight or less, 0.08% by weight or less, 0.06% by weight or less, 0.04% by weight or less, 0.03% by weight or less, 0.01% by weight or less, or 0.005% by weight or less, based on the dry weight of the calcined composite carrier; and (3) contacting a second organic complexing agent with the calcined composite carrier to obtain the hydrogenation catalyst, and optionally, the process further comprises one or more of the following steps:

(0) producing the carrier; and (4) sulfurizing the hydrogenation catalyst.

2. The process according to any one of the preceding aspects, wherein the step (0) further comprises the following steps:

(0-1) forming a carrier precursor or a carrier precursor composition to obtain a preformed carrier, wherein the carrier precursor composition comprises a carrier precursor, a shaping aid, and an optional coagent;

(0-2) calcining the preformed carrier to obtain the carrier; and (0-3) optionally, contacting the coagent and/or the second active metal component with the carrier, wherein the coagent is one or more selected from the group consisting of metallic coagents (preferably one or more selected from the group consisting of Group IIB metallic elements (such as one or more selected from the group consisting of zinc and cadmium), Group IA metallic elements (such as one or more selected from the group consisting of lithium, sodium, potassium, rubidium, cesium and francium), Group IIA metallic elements (such as one or more selected from the group consisting of beryllium, magnesium, calcium, and strontium) and rare earth metallic elements (such as one or more selected from the group consisting of lanthanum, cerium, praseodymium and neodymium), preferably one or more selected from the group consisting of zinc, sodium, potassium, magnesium, calcium, lanthanum and cerium) and non-metallic coagents (preferably one or more selected from the group consisting of Group IVA elements (such as silicon), Group VIIA elements (such as one or more selected from the group consisting of fluorine, chlorine, bromine and iodine), Group VA elements (such as one or more selected from phosphorus and arsenic) and Group IIIA elements (such as boron), preferably one or more selected from the group consisting of fluorine, silicon, phosphorus, and boron), and wherein, in the hydrogenation catalyst, the content of the metallic coagent, calculated on the basis of the metallic element, is in a range from 0% by weight to 10% by weight, preferably from 0.5% by weight to 6% by weight, based on the total weight of the hydrogenation catalyst, and the content of the non-metallic coagent, calculated on the basis of the non-metallic element, is in a range from 0% by weight to 10% by weight, preferably from 0.5% by weight to 6% by weight, based on the total weight of the hydrogenation catalyst.

3. The process according to any one of the preceding aspects, wherein the calcination conditions employed in the step (0-2) include: a calcination temperature in a range from 250° C. to 500° C., preferably from 350° C. to 450° C., and a calcination time in a range from 2 h to 8 h, preferably from 3 h to 6 h.

4. The process according to any one of the preceding aspects, wherein the step (0-3) further comprises the following steps:

(0-3-1) impregnating the carrier with the coagent and/or the second active metal component to obtain an impregnated product, and (0-3-2) drying the impregnated product at a temperature in a range from 100° C. to 250° C. (preferably from 100° C. to 200° C.), and/or calcining the impregnated product at a temperature in a range from 250° C. to 600° C. (preferably from 350° C. to 500° C.).

5. The process according to any one of the preceding aspects, wherein the step (1) further comprises the following steps:

(1-1) impregnating the carrier with the first active metal component, the first organic complexing agent, and the optional coagent to obtain an impregnated product, and (1-2) heat-treating the impregnated product at a temperature in a range from 100° C. to 250° C. (preferably from 100° C. to 200° C.) to obtain the composite carrier.

6. The process according to any one of the preceding aspects, wherein the calcination conditions employed in the step (2) include: a calcination temperature in a range from 350° C. to 500° C., preferably from 360° C. to 450° C., a calcination time in a range from 0.5 h to 8 h, preferably from 1 h to 6 h, an oxygen-containing gas (preferably having an oxygen content of not less than 20 vol %) introduced in an amount of more than 0.2 L/(g·hr), preferably from 0.2 L/(g·hr) to 20 L/(g·hr), further preferably from 0.3 L/(g·hr) to 10 L/(g·hr) based on the weight of the carrier.

7. The process according to any one of the preceding aspects, wherein the step (3) further comprises the following steps:

(3-1) impregnating the calcined composite carrier with the second organic complexing agent to obtain an impregnated product, and (3-2) heat-treating the impregnated product at a temperature in a range from 100° C. to 250° C. (preferably from 100° C. to 200° C.) to obtain the hydrogenation catalyst.

8. The process according to any one of the preceding aspects, wherein the content of the first active metal component or the total content of the first active metal component and the second active metal component, calculated on the basis of oxides, is in a range from 6% by weight to 70% by weight, preferably from 15% by weight to 60% by weight, preferably from 20% by weight to 50% by weight, preferably from 20% by weight to 40% by weight based on the total weight of the hydrogenation catalyst; a molar ratio of the first organic complexing agent to the first active metal component is in a range from 0.03:1 to 2:1, preferably from 0.08:1 to 1.5:1; a molar ratio of the first organic complexing agent to the second organic complexing agent is in a range from 1:0.25 to 1:4, preferably from 1:0.5 to 1:2; and a molar ratio of the first active metal component to the second active metal component is in a range from 1:0 to 1:0.4, preferably from 1:0 to 1:0.1.

9. The process according to any one of the preceding aspects, wherein the carrier precursor is one or more selected from the group consisting of alumina, silica, alumina-silica, titania, magnesia, silica-magnesia, silica-zirconia, silica-thoria, silica-beryllia, silica-titania, silica-zirconia, titania-zirconia, silica-alumina-thoria, silica-alumina-titania, silica-alumina-magnesia and silica-alumina-zirconia, preferably alumina, including precursors thereof.

10. The process according to any one of the preceding aspects, wherein the first organic complexing agent and the second organic complexing agent are the same or different from each other, each independently being one or more selected from the group consisting of the following species:

(i) an organic compound A obtained by interrupting the carbon backbone of a $C_{2-30}$ (preferably $C_{2-10}$) linear or branched alkane with one or more (for example, 1 to 5, 1 to 4, 1 to 3, 1 to 2 or 1) hetero groups selected from —O— and —$NR_1$— (wherein the group $R_1$ is selected from H and optionally substituted $C_{1-10}$ linear or branched alkyl group), (ii) an organic compound B obtained by replacing one or more (for example, 1 to 5, 1 to 4, 1 to 3, 1 to 2 or 1) hydrogen atoms in the structure of a $C_{1-30}$ (preferably $C_{2-10}$) linear or branched alkane, a $C_{2-30}$ (preferably $C_{2-10}$) linear or branched alkene, an optionally substituted $C_{3-20}$ (preferably $C_{5-10}$) cycloalkane or the organic compound A with a group selected from —$R_2$—OH (wherein the group $R_2$ represents a single bond or a $C_{1-10}$ linear or branched alkylene group, preferably a single bond or a $C_{1-6}$ linear or branched alkylene group, preferably a single bond or a $C_{1-3}$ linear or branched alkylene group), —$R_3$—$NR_4R_5$ (wherein the group $R_3$ represents a single bond or a $C_{1-10}$ linear or branched alkylene group, preferably a $C_{1-6}$ linear or branched alkylene group, preferably a $C_{1-3}$ linear or branched alkylene group; the groups $R_4$ and $R_5$ are the same or different from each other, and each independently selected from hydrogen, a $C_{1-10}$ linear or branched alkyl group and —$R_6$—C(=O)OM, preferably each independently selected from hydrogen, a $C_{1-6}$ linear or branched alkyl group and —$R_6$—C(=O)OM, preferably each independently selected from a $C_{1-3}$ linear or branched alkyl group and —$R_6$—C(=O)OM, more preferably each independently represents —$R_6$—C(=O)OM; wherein the group $R_6$ represents a single bond or a $C_{1-10}$ linear or branched alkylene group, preferably a $C_{1-6}$ linear or branched alkylene group, preferably a $C_{1-3}$ linear or branched alkylene group; M represents H, an alkali metal or alkaline earth metal) and —$R_6$—C(=O)OM (wherein the group $R_6$ represents a single bond or a $C_{1-10}$ linear or branched alkylene group, preferably a $C_{1-6}$ linear or branched alkylene group, preferably a $C_{1-3}$ linear or branched alkylene group; M represents H, an alkali metal or an alkaline earth metal), with a proviso that the organic compound A and the organic compound B do not comprise any oxygen-oxygen bond, nitrogen-nitrogen bond, or nitrogen-oxygen bond in their structures, and (iii) an alkylene oxide homopolymer or copolymer, more preferably, the first organic complexing agent and the second organic complexing agent are the same or different from each other, each independently being one or more selected from the group consisting of: (i) a $C_{1-20}$ (preferably $C_{2-7}$) aliphatic or $C_{5-10}$ alicyclic monocarboxylic acid or polycarboxylic acid (such as one or more selected from the group consisting of acetic acid, maleic acid, oxalic acid, citric acid, tartaric acid, and malic acid) or a salt thereof, optionally substituted with one or more (for example, 1 to 5, 1 to 4, 1 to 3, 1 to 2 or 1) —$R_2$—OH group (wherein the group $R_2$ represents a single bond or a $C_{1-10}$ linear or branched alkylene group, preferably a single bond or a $C_{1-6}$ linear or branched alkylene group, preferably a single bond or a $C_{1-3}$ linear or branched alkylene group), (ii) a $C_{1-20}$ (preferably $C_{2-7}$) aliphatic or $C_{5-10}$ alicyclic monoamine or polyamine (such as one or more selected from the group consisting of ethylenediamine, triethylamine, hexamethylenediamine, ethanolamine, diethanolamine, triethanolamine, ethylenediamine tetraacetic acid or a salt thereof, nitrilotriacetic acid or a salt thereof, and 1,2-cyclohexanediamine tetraacetic acid or a salt thereof), optionally substituted with one or more (for example, 1 to 5, 1 to 4, 1 to 3, 1 to 2 or 1) groups selected from —$R_2$—OH (wherein the group $R_2$ represents a single bond or a $C_{1-10}$ linear or branched alkylene group, preferably a single bond or a $C_{1-6}$ linear or branched alkylene group, preferably a single bond or a $C_{1-3}$ linear or branched alkylene group) and —$R_6$—C(=O)OM (wherein the group $R_6$ represents a single bond or a $C_{1-10}$ linear or branched alkylene group, preferably a $C_{1-6}$ linear or branched alkylene group, preferably a $C_{1-3}$ linear or branched alkylene group; M represents H, an alkali metal or an alkaline earth metal), and (iii) a $C_{2-20}$ (preferably $C_{2-6}$) aliphatic or $C_{5-10}$ alicyclic polyol, an oligomer or polymer thereof, or a $C_{1-6}$ linear or branched alkyl etherate thereof (such as one or more selected from the group consisting of ethylene glycol, glycerol, polyethylene glycol, diethylene glycol, diethylene glycol monomethyl ether, and butylene glycol), more preferably each independently being one or more selected from the group consisting of ethylene glycol, glycerol, polyethylene glycol (having a molecular weight in a range from 200 to 1500, preferably from 200 to 600), diethylene glycol, butanediol, acetic acid, maleic acid, oxalic acid, nitrilotriacetic acid or a salt thereof, 1,2-cyclohexanediamine tetraacetic acid or a salt thereof, citric acid, tartaric acid, malic acid, ethylenediamine, and ethylenediamine tetraacetic acid or a salt thereof.

11. The process according to any one of the preceding aspects, wherein the first active metal component and the second active metal component are the same or different from each other, each independently being one or more selected from the group consisting of a Group VIB metallic element (preferably one or more selected from the group consisting of molybdenum and tungsten) and a Group VIII metallic element (preferably one or more selected from the group consisting of cobalt and nickel), preferably each independently selected from the combinations of one or more Group VIB metallic elements with one or more Group VIII metallic elements, more preferably each independently selected from the combinations of molybdenum and/or tungsten with cobalt and/or nickel.

12. The process according to any one of the preceding aspects, wherein the process does not comprise any calcination step during or after the step (3), and/or the process does not comprise any step for introducing a coagent and/or a metallic element having hydrogenation activity during or after the step (3).

13. A hydrogenation catalyst produced by the process according to any one of the preceding aspects.

14. A hydrogenation catalyst composition, comprising a hydrogenation catalyst I and a hydrogenation catalyst II, wherein the hydrogenation catalyst I is different from the hydrogenation catalyst II, the hydrogenation catalyst I is present in an amount by volume of 5 to 95%, preferably 10 to 80%, more preferably 20 to 70%, based on the total volume of the hydrogenation catalyst composition, and the hydrogenation catalyst I is a hydrogenation catalyst produced by the process according to any one of the preceding aspects.

15. A hydrotreatment process, comprising the step of contacting a feedstock oil with a hydrogenation catalyst according to any one of the preceding aspects or a hydrogenation catalyst composition according to any one of the preceding aspects in the presence of hydrogen to conduct a hydrogenation reaction.

16. The process according to any one of the preceding aspects, wherein the feedstock oil is (i) firstly contacted with the hydrogenation catalyst I and then with the hydrogenation catalyst II, (ii) firstly contacted with the hydrogenation catalyst II and then with the hydrogenation catalyst I, or (iii) contacted alternately with the hydrogenation catalyst I disposed in multiple stages and the hydrogenation catalyst II disposed in multiple stages.

17. The process according to any one of the preceding aspects, wherein the hydrogenation conditions include: a reaction temperature in a range from 300° C. to 400° C., preferably from 320° C. to 380° C., a reaction pressure in a range from 1 MPa to 10 MPa (gauge pressure), preferably from 1 MPa to 8 MPa (gauge pressure), a liquid hourly space velocity of the feedstock oil in a range from 0.5 $h^{-1}$ to 3 $h^{-1}$, preferably from 0.5 $h^{-1}$ to 2.5 $h^{-1}$, and a hydrogen-to-oil volume ratio in a range from 100 to 800, preferably from 100 to 700.

Technical Effect

The hydrogenation catalyst According to the present application has both excellent hydrodesulfurization activity and hydrodenitrogenation activity.

The hydrogenation catalyst According to the present application exhibits a significantly prolonged service life.

DETAILED DESCRIPTION OF THE INVENTION

Specific embodiments of the present application are described in detail below, but it should be noted that the scope of the present invention is not limited by those specific embodiments, but is defined by the appended claims.

All publications, patent applications, patents and other reference documents mentioned herein are hereby incorporated by reference. Unless otherwise defined, all technical and scientific terms used herein have the meaning as commonly understood by those skilled in the art. In case of conflict, the definition provided herein shall prevail.

When a material, substance, process, step, device, component or the like is defined herein using the wording "known to those skilled in the art", "prior art", "conventionally known" or the like, the object defined by such wording covers not only those conventionally used in the art at the time of filing the present application, but also those not commonly used at present but will become recognized in the art to be suitable for use for similar purposes.

In the context of the present specification, any matter or matters not mentioned are directly applicable to those known in the art without any change. Moreover, any embodiment described herein can be freely combined with one or more other embodiments described herein, and the resulting technical solution or technical concept should be considered to be part of the original disclosure or original description of the present application, and should not be considered as new matter that has not been disclosed or contemplated herein, unless it is apparent to those skilled in the art that such a combination is obviously unreasonable.

In the context of the present specification, unless explicitly stated otherwise, the expression "optionally substituted" means optionally substituted by one or more groups selected from the group consisting of hydroxyl, amino, a $C_{1-10}$ linear or branched alkyl group, a $C_{2-10}$ linear or branched alkenyl group, a $C_{3-20}$ cycloalkyl group, and a $C_{6-20}$ aryl group. As the substituent, hydroxyl, amino and $C_{1-10}$ linear or branched alkyl group are preferred, and $C_{1-10}$ linear or branched alkyl group is more preferred. Here, as the $C_{1-10}$ linear or branched alkyl group, for example, a $C_{1-6}$ linear or branched alkyl group or a $C_{1-4}$ linear or branched alkyl group may be mentioned, and more specifically, for example, methyl, ethyl, propyl, n-butyl, isobutyl and n-hexyl may be mentioned. As the $C_{2-10}$ linear or branched alkenyl group, for example, a $C_{2-6}$ linear or branched alkenyl group or a $C_{2-4}$ linear or branched alkenyl group may be mentioned, and more specifically, for example, vinyl, allyl, propenyl, n-butenyl, isobutenyl and n-hexenyl may be mentioned.

In the context of the present specification, the term "$C_{3-20}$ cycloalkane" refers to a monocyclic, bicyclic or polycyclic cycloalkane having 3 to 20 ring carbon atoms. Here, specific examples of the $C_{3-20}$ cycloalkane include monocyclic cycloalkanes, such as cyclopropane, cyclohexane, and cyclopentane, and spiro, bridged or fused bicyclic or polycyclic alkanes, such as dicyclopentane, decalin, adamantane, spiro[2.4]alkane, spiro[4.5]decane, bicyclo[3.2.1]octane, tricyclo[2.2.1.0$^{2,6}$]octane, norbornane,

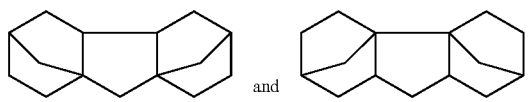
and

As the $C_{3-20}$ cycloalkane, $C_{3-15}$ cycloalkane is preferred, and $C_{5-10}$ cycloalkane or $C_{5-7}$ cycloalkane is more preferred. Further, the term "$C_{3-20}$ cycloalkyl" refers to a monovalent group obtained by removing one hydrogen atom from the $C_{3-20}$ cycloalkane.

In the context of the present specification, the term "$C_{6-20}$ aryl" refers to an aromatic group having 6 to 20 ring carbon atoms. Examples of the $C_{6-20}$ aryl group include phenyl, a group in which two or more benzene rings are directly bonded by a single bond, such as biphenyl and terphenyl, and a group in which two or more benzene rings are condensed, such as naphthyl, anthryl, and phenanthryl. As the $C_{6-20}$ aryl group, phenyl, naphthyl, and biphenyl are more preferred.

In the context of the present specification, unless explicitly stated otherwise, the expression "one or more" generally refers to 1 to 5, 1 to 4, 1 to 3, 1 to 2 or 1.

In the context of the present specification, the term "unsaturated impregnation method", applicable to the conventional understanding in the art, means that the volume of the dampening fluid for impregnation (also referred to as the dipping or wetting fluid) is less than the saturated liquid absorption of the object to be impregnated (such as carrier particles, etc.) during the impregnation. For example, at a given mass of the object to be impregnated (such as carrier particles, etc.), the ratio by volume of the dampening fluid to the saturated liquid absorption (converted to an amount by volume) of the object to be impregnated is generally 0.01-0.6:1, preferably 0.02-0.4:1. The unsaturated impregnation method is generally carried out under normal temperature and normal pressure, but may also be carried out at elevated temperature, or under reduced or elevated pressure as needed in some cases, with no particular limitation.

In the context of the present specification, the term "saturated impregnation method" (also referred to as equal-volume impregnation method), applicable to the conventional understanding in the art, means that the volume of the dampening fluid for impregnation (also referred to as the dipping or wetting fluid) is equal to the saturated liquid absorption of the object to be impregnated (such as carrier particles, etc.) during the impregnation. For example, at a given mass of the object to be impregnated (such as carrier particles, etc.), the ratio by volume of the dampening fluid to the saturated liquid absorption (converted to an amount by volume) of the object to be impregnated is generally 0.9-1.1:1, preferably 0.95-1.05:1. The saturated impregnation method is generally carried out under normal temperature and normal pressure, but may also be carried out at elevated temperature, or under reduced or elevated pressure as needed in some cases, with no particular limitation.

In the context of the present specification, the term "excessive impregnation method", applicable to the conventional understanding in the art, means that the volume of the dampening fluid for impregnation (also referred to as the dipping or wetting fluid) is greater than the saturated liquid absorption of the object to be impregnated (such as carrier particles, etc.) during the impregnation. For example, at a given mass of the object to be impregnated (such as carrier particles, etc.), the ratio by volume of the dampening fluid to the saturated liquid absorption (converted to an amount by volume) of the object to be impregnated is generally 1.5-15:1, preferably 5-10:1. The excessive impregnation method is generally carried out under normal temperature and normal pressure, but may also be carried out at elevated temperature, or under reduced or elevated pressure as needed in some cases, with no particular limitation.

Where there is no explicit indication, all percentages, parts, ratios, etc. provided herein should be understood to be expressed by weight, unless such an understanding do not meet the ordinary knowledge of those skilled in the art.

According to the present application, there is firstly provided a process for producing a hydrogenation catalyst, which comprises at least the following steps:

(1) contacting a first active metal component and a first organic complexing agent with a carrier to obtain a composite carrier;

(2) calcining the composite carrier to obtain a calcined composite carrier, wherein the total carbon content on dry basis of the calcined composite carrier is 1% by weight or less based on the dry weight of the calcined composite carrier; and (3) contacting a second organic complexing agent with the calcined composite carrier to obtain the hydrogenation catalyst.

According to the present application, in the step (1), as the carrier, for example, any material known in the art which can be used as carriers for hydrogenation catalysts can be mentioned, with no particular limitation. Specific examples include, for example, porous refractory carriers. Here, as the porous refractory carrier, for example, porous refractory oxides may be mentioned, and porous inorganic refractory oxides are preferred. More specifically, examples of the porous inorganic refractory oxide include oxides of Group II, Group III, and Group IV elements of the periodic table, and more specifically, for example, alumina, silica, alumina-silica, titania, magnesia, silica-magnesia, silica-zirconia, silica-thoria, silica-beryllia, silica-titania, silica-zirconia, titania-zirconia, silica-alumina-thoria, silica-alumina-titania, silica-alumina-magnesia and silica-alumina-zirconia, preferably alumina. Here, specific examples of the alumina include γ-alumina, η-alumina, θ-alumina, δ-alumina, and χ-alumina, and γ-alumina is preferred.

According to an embodiment of the present application, in the step (1), the carrier contains alumina as an essential component. Here, specific examples of the alumina include γ-alumina, η-alumina, θ-alumina, δ-alumina, and χ-alumina, and γ-alumina is preferred.

According to the present application, in the step (1), the carrier is a particulate material (i.e., a formed material), rather than an amorphous material like powders. As the shape of the particles, various shapes conventionally used for (formed) carriers known in the art to be useful in hydrogenation catalysts may be mentioned, and spheroidal, columnar, and sheet-like shapes may be further mentioned as specific examples, with spheroidal or columnar shapes being preferred. Examples of the spheroidal shape include a spherical shape and an ellipsoidal shape. Examples of the columnar shape include a cylindrical shape, a square columnar shape, and a columnar shape having a profiled cross section (for example, a clover).

According to the present application, in the step (1), the carrier can be formed into particles by any method conventionally known in the art, and commercially available granular products can also be used.

According to the present application, in the step (1), the specific surface area (BET method) of the carrier is generally in a range from 100 to 500 m$^2$/g, preferably from 150 to 400 m$^2$/g.

According to the present application, in the step (1), the pore volume (BET method) of the carrier is generally in a range from 0.1 to 1.0 ml/g, preferably from 0.3 to 0.9 ml/g.

According to the present application, in the step (1), the bulk density (mechanical tapping method) of the carrier is generally in a range from 40 to 100 g/100 ml, preferably from 45 to 70 g/100 ml.

According to the present application, in the step (1), the saturated liquid absorption of the carrier is generally in a range from 40 to 140 ml/100 g, preferably from 60 to 120 ml/100 g. In order to determine the saturated liquid absorption, 100 g of the granular porous refractory carrier was weighed into a separatory funnel, and then 300 ml of purified water was added to make the water surface exceed the surface of the carrier; the resultant was left for 30 minutes, and then the excess water was drained into a graduated cylinder, and the volume L of the excess water was obtained. Here, the saturated liquid absorption can be obtained via calculation in accordance with the equation (300-L)÷100 (ml/100 g).

According to the present application, in the step (1), the average particle size (sieving method) of the carrier is generally in a range from 2 mm to 8 mm, preferably from 3 mm to 5 mm.

According to the present application, in the step (1), the order of contacting the first active metal component and the first organic complexing agent with the carrier is not particularly limited, and specific examples thereof include a process in which the first active metal component and the first organic complexing agent are simultaneously contacted with the carrier (referred to as a one-step contact process), and a process in which the first active metal component and the first organic complexing agent are contacted with the carrier in a sequential order (referred to as a multi-step contact process). When a multi-step contact process is employed, it is preferable to subject the product resulted from the contact to a heat treatment (e.g., drying) after the completion of each contact step. Here, the present application has no limitation to the drying process and drying conditions for the product resulted from the contact, and knowledge known in the art can be adopted. For example, as the drying conditions, the drying temperature is generally in a range from 100° C. to 250° C., preferably from 100° C. to 200° C., and the drying time is generally in a range from 1 h to 12 h, preferably from 1 h to 10 h.

According to an embodiment of the present application, in the step (1), in addition to the first active metal component and the first organic complexing agent, a coagent may be further introduced and contacted with the carrier.

According to this embodiment of the present application, in the step (1), the order of contacting the first active metal component, the first organic complexing agent and the coagent with the carrier is not particularly limited, and specific examples thereof include a process in which the first active metal component, the first organic complexing agent and the coagent are simultaneously contacted with the carrier (referred to as a one-step contact process), and a process in which the first active metal component, the first organic complexing agent and the coagent are contacted with the carrier in a sequential order (referred to as a multi-step contact process). When a multi-step contact process is employed, it is preferable to subject the product resulted from the contact to a heat treatment (e.g., drying)

after the completion of each contact step. Here, the present application has no limitation to the drying process and drying conditions for the product resulted from the contact, and knowledge known in the art can be adopted. For example, as the drying conditions, the drying temperature is generally in a range from 100° C. to 250° C., preferably from 100° C. to 200° C., and the drying time is generally in a range from 1 h to 12 h, preferably from 1 h to 10 h. Alternatively, when a multi-step contact process is employed and the coagent is contacted with the carrier in the first place, it is preferable to subject the product resulted from the contact to a heat treatment, such as drying, calcining, or drying followed by calcining, after the completion of each contact step. Here, the present application has no limitation to the drying process and drying conditions for the product resulted from the contact, and knowledge known in the art can be adopted. For example, as the drying conditions, the drying temperature is generally in a range from 100° C. to 250° C., preferably from 100° C. to 200° C., and the drying time is generally in a range from 1 h to 12 h, preferably from 1 h to 10 h. Further, the present application has no limitation to the calcination process and calcination conditions for the product resulted from the contact, and knowledge known in the art can be adopted. For example, as the calcination conditions, the calcination temperature is generally in a range from 250° C. to 600° C., preferably from 350° C. to 500° C., and the calcination time is generally in a range from 2 h to 8 h, preferably from 3 h to 6 h.

According to the present application, in the step (1), the manner of contacting the first active metal component, the first organic complexing agent, and the optional coagent with the carrier is not particularly limited. Specifically, for example, any manner in which the first active metal component, the first organic complexing agent, and the optional coagent may be supported onto the carrier may be mentioned, and more specifically, for example, the first active metal component, the first organic complexing agent and the optional coagent may be impregnated into the carrier to obtain an impregnated product. Here, the impregnation can be carried out in any manner known in the art. For example, as the impregnation method, an unsaturated impregnation method, a saturated impregnation method, and an excessive impregnation method can be mentioned. Further, the impregnation temperature is not particularly limited according to the present application, and various temperatures that can be achieved using the impregnation liquid may be employed, and the impregnation time is not particularly limited as long as a desired amount of the desired component can be loaded. For example, the impregnation temperature may be in a range from 15 to 60° C., and the impregnation time may be in a range from 0.5 to 5 hours.

According to the present application, in the step (1), more specifically, as the contact process, for example, a process in which the carrier may be firstly impregnated with an impregnation liquid (preferably an aqueous solution) containing a predetermined amount of the coagent to obtain a prepreg carrier after drying and calcination as described above, and the prepreg carrier is then impregnated with an impregnation liquid (preferably an aqueous solution) containing a predetermined amount of the first active metal component and a predetermined amount of the first organic complexing agent to obtain an impregnated product, or a process in which the carrier is impregnated with an impregnation liquid (preferably an aqueous solution) containing a predetermined amount of the first active metal component, a predetermined amount of the first organic complexing agent, and a predetermined amount of the coagent to obtain an impregnated product, or a process in which the carrier is impregnated with an impregnation liquid (preferably an aqueous solution) containing a predetermined amount of the first active metal component and a predetermined amount of the first organic complexing agent to obtained an impregnated product, or a process in which the carrier is firstly impregnated with an impregnation liquid (preferably an aqueous solution) containing a predetermined amount of the first active metal component to obtain a prepreg carrier after drying as described above, and the prepreg carrier is then impregnated with an impregnation liquid (preferably an aqueous solution) containing a predetermined amount of the first organic complexing agent to obtain an impregnated product, or a process in which the carrier is firstly impregnated with an impregnation liquid (preferably an aqueous solution) containing a predetermined amount of the first organic complexing agent to obtain a prepreg carrier after drying as described above, and the prepreg carrier is then impregnated with an impregnation liquid (preferably an aqueous solution) containing a predetermined amount of the first active metal component to obtain an impregnated product, or a process in which the carrier is firstly impregnated with an impregnation liquid (preferably an aqueous solution) containing a part of the first organic complexing agent to obtain a prepreg carrier after drying as described above, and the prepreg carrier is then impregnated with an impregnation liquid (preferably an aqueous solution) containing a predetermined amount of the first active metal component and a remaining amount of the first organic complexing agent to obtain an impregnated product may be mentioned.

According to an embodiment of the present application, after the step (1) is fully completed, the composite carrier or impregnated product obtained may be subjected to a heat treatment such as drying. Here, the present application has no limitation to the drying process and drying conditions for the composite carrier or the impregnated product, and knowledge known in the art can be adopted. For example, as the drying conditions, the drying temperature is generally in a range from 100° C. to 250° C., preferably from 100° C. to 200° C., and the drying time is generally in a range from 1 h to 12 h, preferably from 1 h to 10 h. The heat-treated product obtained after the heat treatment is also referred to in the present application as a composite carrier.

According to the present application, in the step (2), the composite carrier is calcined to obtain a calcined composite carrier. Here, the total carbon content on the dry basis of the calcined composite carrier must be no more than 1% by weight based on the dry weight of the calcined composite carrier.

According to the present application, in the step (2), the calcination process and calcination conditions for the composite carrier are not limited as long as the total carbon content on the dry basis of the calcined composite carrier finally obtained is no more than 1% by weight based on the dry weight of the calcined composite carrier. Specific examples of the calcination conditions include, for example, a calcination temperature generally in a range from 350° C. to 500° C., preferably from 360° C. to 450° C., and a calcination time generally in a range from 0.5 h to 8 h, preferably from 1 h to 6 h. Further, the calcination is preferably carried out under an oxygen-containing atmosphere, more preferably with an introduction of an oxygen-containing gas. In this case, the oxygen-containing gas is generally introduced in an amount of more than 0.2 L/(g·hr), preferably 0.2 to 20 L/(g·hr), more preferably 0.3-10 L/(g·hr) based on the weight of the carrier. Here, the unit "g"

represents the weight of the carrier. Here, as the oxygen-containing gas, for example, air, oxygen, and other oxygen-containing gas may be mentioned. Preferably, the volume content of oxygen in the oxygen-containing gas is generally not less than 20% by volume.

According to the present application, in the step (2), the total carbon content on the dry basis may further be 0.5% by weight or less or less than 0.5% by weight, 0.4% by weight or less or less than 0.4% by weight, and 0.3% by weight or less or less than 0.3% by weight, 0.1% by weight or less or less than 0.1% by weight, 0.08% by weight or less or less than 0.08% by weight, 0.06% by weight or less or less than 0.06% by weight, 0.04% by weight or less or less than 0.04% by weight, 0.03% by weight or less or less than 0.03% by weight, 0.01% by weight or less or less than 0.01% by weight, 0.005% by weight or less or less than 0.005% by weight, based on the dry weight of the calcined composite carrier. In addition, as a lower limit of the total carbon content on the dry basis, specifically, for example, 0.04% by weight, 0.03% by weight, 0.01% by weight, 0.005% by weight, or 0% by weight based on the dry weight of the calcined composite carrier may be mentioned. Here, said "0% by weight" means that the value of the total carbon content is lower than the threshold of the measuring instrument and thus cannot be effectively measured by the measuring instrument, but it does not necessarily mean that the total carbon content is zero, in the true sense, or the calcined composite carrier is completely free of carbon. In addition, said "total carbon content" refers to the total amount of carbon present in any form in the calcined composite carrier, including but not limited to the carbon present in organic compounds (such as organics), the carbon present in inorganic compounds (such as carbonates) and the carbon present as elemental carbon.

According to the present application, in the step (3), the second organic complexing agent is contacted with the calcined composite carrier to obtain the hydrogenation catalyst of the present application.

According to the present application, in the step (3), the manner of contacting the second organic complexing agent with the calcined composite carrier is not particularly limited. Specifically, for example, any manner in which the second organic complexing agent may be supported onto the calcined composite carrier may be mentioned, and more specifically, for example, the second organic complexing agent may be impregnated into the calcined composite carrier to obtain an impregnated product. Here, the impregnation can be carried out in any manner known in the art. For example, as the impregnation method, an unsaturated impregnation method, a saturated impregnation method, and an excessive impregnation method can be mentioned. Further, the impregnation temperature is not particularly limited according to the present application, and various temperatures that can be achieved using the impregnation liquid may be employed, and the impregnation time is not particularly limited as long as a desired amount of the desired component can be loaded. For example, the impregnation temperature may be in a range from 15 to 60° C., and the impregnation time may be in a range from 0.5 to 5 hours.

According to the present application, in the step (3), more specifically, as the contact process, for example, a process in which the calcined composite carrier is impregnated with an impregnation liquid (preferably an aqueous solution) containing a predetermined amount of the second organic complexing agent to obtain an impregnated product, or a process in which the calcined composite carrier is firstly impregnated with an impregnation liquid (preferably an aqueous solution) containing a part of the second organic complexing agent to obtain a prepreg carrier after drying, and the prepreg carrier is then impregnated with an impregnation liquid (preferably an aqueous solution) containing the remaining amount of the second organic complexing agent to obtain an impregnated product may be mentioned. Here, the present application has no limitation to the drying process and drying conditions, and knowledge known in the art can be adopted. For example, as the drying conditions, the drying temperature is generally in a range from 100° C. to 250° C., preferably from 100° C. to 200° C., and the drying time is generally in a range from 1 h to 12 h, preferably from 1 h to 10 h.

According to an embodiment of the present application, after the step (3) is completed, the hydrogenation catalyst or impregnated product obtained may be subjected to a heat treatment such as drying. Here, the present application has no limitation to the drying process and drying conditions, and knowledge known in the art can be adopted. For example, as the drying conditions, the drying temperature is generally in a range from 100° C. to 250° C., preferably from 100° C. to 200° C., and the drying time is generally in a range from 1 h to 12 h, preferably from 1 h to 10 h. The heat-treated product obtained after the heat treatment is also referred to in the present application as a hydrogenation catalyst. Here, it is preferable that the heat treatment is conducted in a manner such that at least 50% by weight (for example at least 60% by weight, at least 70% by weight or at least 80% by weight) of the second organic complexing agent or a thermal decomposition product thereof is maintained in the hydrogenation catalyst. More preferably, the heat treatment does not comprise calcination, or in other words, during or after the step (3), the hydrogenation catalyst or impregnated product obtained is not subjected to calcination. Here, the term "calcination" can be understood according to the general knowledge in the art, for example, it can be understood to be a process in which the sample to be treated is held at a temperature in a range from 300° C. to 500° C. for at least 0.1 h or longer.

According to an embodiment of the present application, in order to enable the contemplated technical effect of the present application to be fully realized, no introduction of an effective amount of a coagent (as described below) and/or an effective amount of a metallic element having hydrogenation activity (as described below) into the calcined composite carrier is conducted during or after the step (3), preferably no introduction of an effective amount of the coagent and an effective amount of the metallic element having hydrogenation activity into the calcined composite carrier is conducted. Here, as can be readily understood by those skilled in the art, the term "effective amount" refers to the minimum amount of the relevant component needed to provide the desired function or effect.

According to an embodiment of the present application, the process for producing the hydrogenation catalyst may further comprise a step of producing the carrier (referred to as step (0)).

According to this embodiment of the present application, the process for producing the carrier is not particularly limited, and any process known in the art that can be used for the production of carriers for hydrogenation catalysts can be employed without limitation. For example, the step (0) may be performed in a manner including at least the following two steps.

(0-1) forming a carrier precursor or a carrier precursor composition to obtain a preformed carrier; and (0-2) calcining the preformed carrier to obtain the carrier.

According to the present application, in the step (0-1), the carrier precursor composition comprises a carrier precursor and a shaping aid.

According to an embodiment of the present application, in the step (0-1), the carrier precursor composition may further comprise a coagent.

According to the present application, in the step (0-1), as the carrier precursor, for example, any material known in the art that can be used as a carrier precursor for hydrogenation catalysts can be mentioned, with no particular limitation. Specific examples include, for example, porous refractory oxides (including precursors thereof), and porous inorganic refractory oxides (including precursors thereof) are preferred. More specifically, examples of the porous inorganic refractory oxide include oxides of Group II, Group III, and Group IV elements of the periodic table, and more specifically, for example, alumina, silica, alumina-silica, titania, magnesia, silica-magnesia, silica-zirconia, silica-thoria, silica-beryllia, silica-titania, silica-zirconia, titania-zirconia, silica-alumina-thoria, silica-alumina-titania, silica-alumina-magnesia and silica-alumina-zirconia, preferably alumina. Further, as the precursor of the alumina, hydrated alumina, aluminum salts, organoaluminum, and aluminum sol can be specifically mentioned. More specifically, as the hydrated alumina, alumina trihydrate, alumina monohydrate, amorphous aluminum hydroxide, and boehmite may be mentioned. Specific examples of the precursor of silica include water-soluble silicon-containing compounds or silicon-containing compounds that can be hydrolyzed to form a silicone gel or a sol in an aqueous medium, and more specifically, for example, water glass, silica sol, silica gel, and silicate. These carrier precursors (including precursors thereof) may be used alone or in a combination of two or more thereof in any ratio. Preferably, the carrier precursor contains alumina (including precursors thereof) as an essential component.

According to the present application, in the step (0-1), as the shaping aid, for example, any shaping aid known in the art useful in the production of catalyst carriers may be used, with no particular limitation. Specific examples thereof include water, squeezing agents, peptizing agents, pH modifiers, pore forming agents, and lubricants. More specifically, for example, phthalocyanine powder, citric acid, methyl cellulose, starch, polyvinyl alcohol, and polyethylene ethanol may be mentioned. These shaping aids may be used alone or in a combination of two or more thereof in any ratio. Further, regarding the amount of the shaping aid, knowledge known in the art can be adopted, with no particular limitation.

According to the present application, in the step (0-1), the process for producing the carrier precursor composition is not particularly limited, and any process that can bring the carrier precursor, the shaping aid, and the optional coagent together can be used. For example, the process for producing the carrier precursor composition may include, for example, a process in which the carrier precursor, the shaping aid, and the optional coagent are mixed in a predetermined ratio until uniform.

According to the present application, in the step (0-1), the process for forming the carrier precursor or the carrier precursor composition is not limited, and any process known in the art to be useful in the production of carriers for hydrogenation catalysts can be used. Specific examples of the forming process include drip molding process, ball-rolling granulation process, extrusion molding process, and compression molding process, and more particularly the drip molding process and the extrusion molding process.

According to the present application, in the step (0-1), the shape of the preformed carrier is not particularly limited, and various shapes conventionally used in the art for hydrogenation catalysts can be used. Specific examples of the shape of the preformed carrier include spheroidal shape, columnar shape, sheet-like shape, and the like, and spheroidal shape or columnar shape is preferred. Examples of the spheroidal shape include spherical shape and ellipsoidal shape. Examples of the columnar shape include cylindrical shape, square columnar shape, and columnar shape having a profiled cross section (for example, a clover).

According to the present application, in the step (0-1), the size of the preformed carrier is not particularly limited, and various sizes conventionally used in the art for carriers of hydrogenation catalysts can be used. Specifically, for example, an average particle size (sieving method) is generally in a range from 2 mm to 8 mm, preferably from 3 mm to 5 mm.

According to the present application, in the step (0-2), the calcination process and calcination conditions for the preformed carrier are not limited, and any calcination process and calcination conditions known in the art to be useful for the production of carriers for hydrogenation catalysts can be used. Specific examples of the calcination conditions include, for example, a calcination temperature generally in a range from 250° C. to 500° C., preferably from 350° C. to 450° C., and a calcination time generally in a range from 2 h to 8 h, preferably from 3 h to 6 h.

According to an embodiment of the present application, the preformed carrier may be dried prior to the step (0-2). Here, the present application has no limitation to the drying process and drying conditions for the preformed carrier, and any drying process and drying conditions useful in the art for producing carriers for hydrogenation catalysts can be employed. Specifically, as the drying conditions, for example, the drying temperature is generally in a range from 100° C. to 250° C., preferably from 100° C. to 200° C., and the drying time is generally in a range from 1 h to 12 h, preferably from 1 h to 10 h.

According to a particular embodiment of the present application, the step (0) may further comprise a step of contacting the coagent with the carrier to obtain a contact product (referred to as step (0-3)). Here, the carrier refers to the carrier obtained after the step (0-2).

According to a particular embodiment of the present application, the step (0) may further comprise a step of contacting the second active metal component with the carrier to obtain a contact product (also referred to as step (0-3)). Here, the carrier refers to the carrier obtained after the step (0-2).

According to a particular embodiment of the present application, the step (0) may further comprise a step of contacting the coagent and the second active metal component with the carrier to obtain a contact product (also referred to as step (0-3)). Here, the carrier refers to a carrier obtained after the step (0-2).

According to the present application, in the step (0-3), when the coagent and the second active metal component are used at the same time, the order of contacting the coagent and the second active metal component with the carrier is not particularly limited, and specific examples thereof include a process in which the coagent and the second active metal component are simultaneously contacted with the carrier (referred to as a one-step contact process), and a process in which the coagent and the second active metal component are contacted with the carrier in a sequential order (referred to as a multi-step contact process). When the multi-step contact process is used, it is preferable to subject the product resulted from the contact to a heat treatment (such as calcination, or drying followed by calcination) after the completion of each contact step. Here, the present application has no limitation to the drying process and drying conditions for the product resulted from the contact, and knowledge known in the art can be adopted. For example, as the drying conditions, the drying temperature is generally in a range from 100° C. to 250° C., preferably from 100° C. to 200° C., and the drying time is generally in a range from 1 h to 12 h, preferably from 1 h to 10 h. Further, the present application has no limitation to the calcination process and calcination conditions for the product resulted from the contact, and knowledge known in the art can be adopted. For example, as the calcination conditions, the calcination temperature is generally in a range from 250° C. to 600° C., preferably from 350° C. to 500° C., and the calcination time is generally in a range from 2 h to 8 h, preferably from 3 h to 6 h.

According to the present application, in the step (0-3), the manner of contacting the coagent and/or the second active metal component with the carrier is not particularly limited. Specifically, for example, any manner in which the coagent and/or the second active metal component may be supported onto the carrier may be mentioned, and more specifically, for example, the coagent and/or the second active metal component may be impregnated into the carrier to obtain an impregnated product. Here, the impregnation can be carried out in any manner known in the art. For example, as the impregnation method, an unsaturated impregnation method, a saturated impregnation method, and an excessive impregnation method can be mentioned. Further, the impregnation temperature is not particularly limited in the present application, and various temperatures that can be achieved using the impregnation liquid may be employed, and the impregnation time is not particularly limited as long as a desired amount of the desired component can be loaded. For example, the impregnation temperature may be in a range from 15 to 60° C., and the impregnation time may be in a range from 0.5 to 5 hours.

According to the present application, in the step (0-3), more specifically, as the contact process, for example, a process in which the carrier is impregnated with an impregnation liquid (preferably an aqueous solution) containing a predetermined amount of the coagent to obtain an impregnated product, or a process in which the carrier is impregnated with an impregnation liquid (preferably an aqueous solution) containing a predetermined amount of the second active metal component to obtain an impregnated product, or a process in which the carrier is impregnated with an impregnation liquid (preferably an aqueous solution) containing a predetermined amount of the coagent and a predetermined amount of the second active metal component to obtain an impregnated product, or a process in which the carrier is firstly impregnated with an impregnation liquid (preferably an aqueous solution) containing a predetermined amount of the second active metal component to obtain a prepreg carrier after drying and calcining as described above, and the prepreg carrier is then impregnated with an impregnation liquid (preferably an aqueous solution) containing a predetermined amount of the coagent to obtain an impregnated product, or a process in which the carrier is impregnated with an impregnation liquid (preferably an aqueous solution) containing a predetermined amount of the coagent to obtain a prepreg carrier after drying and calcining as described above, and the prepreg carrier is then impregnated with an impregnation liquid (preferably an aqueous solution) containing a predetermined amount of the second active metal component to obtain an impregnated product, or the carrier is firstly impregnated with an impregnation liquid (preferably an aqueous solution) containing a part of the coagent to obtain a prepreg carrier after drying and calcining as described above, and the prepreg carrier is then impregnated with an impregnation liquid (preferably an aqueous solution) containing a predetermined amount of the second active metal component and the remaining amount of the coagent to obtain an impregnated product may be mentioned.

According to an embodiment of the present application, in the step (0-3), after the contact or impregnation is completed, the product resulted from the contact or impregnation may be subjected to a heat treatment such as calcination, drying or drying followed by calcination. Here, the present application has no limitation to the drying process and drying conditions, and knowledge known in the art can be adopted. For example, as the drying conditions, the drying temperature is generally in a range from 100° C. to 250° C., preferably from 100° C. to 200° C., and the drying time is generally in a range from 1 h to 12 h, preferably from 1 h to 10 h. Further, the present application has no limitation to the calcination process and calcination conditions, and knowledge known in the art can be adopted. For example, as the calcination conditions, the calcination temperature is generally in a range from 250° C. to 600° C., preferably from 350° C. to 500° C., and the calcination time is generally in a range from 2 h to 8 h, preferably from 3 h to 6 h. The heat-treated product obtained after the heat treatment is also referred to in the present application as a carrier.

According to an embodiment of the present application, the process for producing the hydrogenation catalyst may further comprise a step of sulfurizing the hydrogenation catalyst (referred to as step (4)). Here, the hydrogenation catalyst refers to any hydrogenation catalyst produced by the above-described process of the present application for producing a hydrogenation catalyst.

According to the present application, in the step (4), any method known in the art to be useful in the sulfurization of hydrogenation catalysts can be employed. For example, the sulfurization conditions generally include: the presence of hydrogen, a sulfurization temperature in a range from 180° C. to 450° C., and a sulfurization reagent selected from sulfur, hydrogen sulfide, carbon disulfide, dimethyl disulfide or polysulfide, and a sulfurization time in a range from 2 h to 48 h. Here, the sulfurization can be carried out outside the hydrogenation reactor or inside the hydrogenation reactor (like in-situ sulfurization).

According to the present application, in the process for producing a hydrogenation catalyst, as the first active metal component and the second active metal component, any metallic element known in the art having hydrogenation activity may be used, and specifically, the metallic element of Group VIB of the periodic table and the metallic element of Group VIII of the periodic table can be mentioned. Here, as the metallic element of Group VIB of the periodic table, more specifically, for example, molybdenum and tungsten can be mentioned, and as the metallic element of Group VIII of the periodic table, more specifically, for example, cobalt and nickel can be mentioned. These metallic elements having hydrogenation activity may be used alone or in a combination of two or more thereof in any ratio.

According to the present application, in the process for producing a hydrogenation catalyst, the first active metal component and the second active metal component may be the same or different from each other, each independently representing the metallic element having hydrogenation activity. Further, the molar ratio of the first active metal component to the second active metal component is generally in a range from 1:0 to 1:0.4, preferably from 1:0 to 1:0.1, and more preferably no second active metal component is introduced.

According to a particular embodiment of the present application, as the metallic element having hydrogenation activity, the metallic element of Group VIB of the periodic table and the metallic element of Group VIII of the periodic table are used in combination. Here, as the combination, specifically, for example, a combination of molybdenum and tungsten with cobalt, a combination of molybdenum and tungsten with nickel, a combination of tungsten with cobalt and nickel, combinations of molybdenum-nickel, molybdenum-cobalt or tungsten-nickel may be mentioned.

According to the present application, the metallic element having hydrogenation activity can be used in any form known in the art. As the form of the metallic element having hydrogenation activity, for example, any water-soluble compound of which the solubility of the corresponding metallic element can satisfy the load requirement or which has a satisfactory solubility in water in the presence of a co-solvent can be mentioned, and specific examples thereof include the salts and oxides of the metallic elements, preferably nitrates, chlorides, sulfates and carbonates of the corresponding metallic elements, more preferably nitrates of the corresponding metallic elements. These water-soluble compounds may be used alone or in a combination of two or more thereof in any ratio. More specifically, the Group VIB metallic element can be used in any form known in the art. Examples of the form of the metallic element of Group VIB of the periodic table include salts, oxysalts and oxides of the corresponding metallic elements, and particularly ammonium molybdate, ammonium paramolybdate, ammonium metatungstate, molybdenum oxide and tungsten oxide. These forms of the Group VIB metallic element may be used alone or in a combination of two or more thereof in any ratio. The Group VIII metallic element can be used in any form known in the art. As the form of the metallic element of Group VIII of the periodic table, for example, salts and oxides of the corresponding metallic elements may be mentioned, preferably nitrates, chlorides, sulfates, formates, acetates, phosphates, citrates, oxalates, carbonates, basic carbonates, hydroxides, phosphates, phosphides, sulfides, aluminates, molybdates, tungstates, and water-soluble oxides, more preferably oxalates, nitrates, sulfates, acetates, chlorides, carbonates, basic carbonates, hydroxides, phosphates, molybdates, tungstates, and water-soluble oxides of the corresponding metallic elements, most preferably nickel nitrate, nickel sulfate, nickel acetate, basic nickel carbonate, cobalt nitrate, cobalt sulfate, cobalt acetate, basic cobalt carbonate, cobalt chloride and nickel chloride. These forms of the metallic element of Group VIII of the periodic table may be used alone or in a combination of two or more thereof in any ratio.

According to the present application, in the process for producing a hydrogenation catalyst, for the convenience of operation, the metallic element having hydrogenation activity (including the metallic element of Group VIB of the periodic table and the metallic element of Group VIII of the periodic table) is generally used in the form of an impregnation liquid, preferably an aqueous solution, such as when carrying out the contacting or impregnation process involved in the step (1) or step (0-3). For this purpose, the concentration of the metallic element having hydrogenation activity, on the basis of the corresponding metallic element, in the impregnation liquid is generally in a range from 0.2 to 8 mol/L, preferably from 0.2 to 5 mol/L, more preferably from 0.2 to 2 mol/L. Here, the concentration refers to the respective concentration of each metallic element having hydrogenation activity in the impregnation liquid, rather than the total concentration of all the metallic elements having hydrogenation activity. In addition, the impregnation liquid may further contain other components, such as the first organic complexing agent or the coagent, depending on the case, in addition to the metallic element having hydrogenation activity. Thus, the effort of separately preparing a corresponding impregnation liquid for the first organic complexing agent or the coagent can be reduced. In this case, the first organic complexing agent or the coagent is present in the impregnation solution in an amount specified in the context of the present specification. Preferably, the impregnation liquid comprises at least the first active metal component and the first organic complexing agent at the same time.

As can be appreciated by those skilled in the art, according to the present application, the amount of the metallic element having hydrogenation activity (including the metallic element having hydrogenation activity as the first active metal component and/or the metallic element having hydrogenation activity as the second active metal component) used is not particularly limited, as long as it is sufficient to enable the hydrogenation catalyst finally obtained according to the present application to exhibit an effective catalytic activity (referred to as an effective amount). For example, the amount of the metallic element having hydrogenation activity (including the metallic element having hydrogenation activity as the first active metal component and/or the metallic element having hydrogenation activity as the second active metal component) is such that, in the hydrogenation catalyst finally obtained by the process of the present application for producing a hydrogenation catalyst, the content of the metallic element having hydrogenation activity, on the basis of the oxide of the corresponding metallic element, is generally in a range of 6 to 70% by weight, preferably 15 to 60% by weight, preferably 20 to 50% by weight, further preferably 20 to 40% by weight, based on the total weight of the hydrogenation catalyst. Further, for example, the amount of the metallic element of Group VIII of the periodic table (including the metallic element of Group VIII of the periodic table as the first active metal component and/or the metallic element of Group VIII of the period table as the second active metal component) used is such that, in the hydrogenation catalyst finally obtained by the process of the present application for producing a hydrogenation catalyst, the content of the metallic element of Group VIII of the periodic table, on the basis of the oxide of the corresponding metallic element, is generally in a range from 1 to 10% by weight based on the total weight of the hydrogenation catalyst. Further, for example, the amount of the metallic element of Group VIB of the periodic table (including the metallic element of Group VIB of the periodic table as the first active metal component and/or the metallic element of Group VIB of the periodic table as the second active metal component) is such that, in the hydrogenation catalyst finally obtained by the process of the present application for producing a hydrogenation catalyst, the content of the Group VIB metallic element, on the basis of the oxide of the corresponding metallic element, is generally in a range from 5 to 60% by weight based on the total weight of the hydrogenation catalyst.

According to the present application, in the step (1) or step (0-3), when a plurality of metallic elements having hydrogenation activity are used in combination, the order of contacting (for example by impregnation) each of the metallic element having hydrogenation activity with the carrier is not particularly limited, and specific examples thereof include a process in which the plurality of metallic elements having hydrogenation activity are simultaneously contacted with the carrier (referred to as a one-step contact process), and a process in which the plurality of metallic elements having hydrogenation activity are contacted with the carrier in a sequential order or sequentially in different combinations with each other (referred to as a multi-step contact process) may be mentioned. When a multi-step contact process is employed, it is preferable to subject the product resulted from the contact to a heat treatment (e.g., drying) after the completion of each contact step. Here, the present application has no limitation to the drying process and drying conditions for the product resulted from the contact, and knowledge known in the art can be adopted. For example, as the drying conditions, the drying temperature is generally in a range from 100° C. to 250° C., preferably from 100° C. to 200° C., and the drying time is generally in a range from 1 h to 12 h, preferably from 1 h to 10 h.

According to the present application, in the process for producing a hydrogenation catalyst, as the first organic complexing agent and the second organic complexing agent, various organic additives generally used in the art in the production of hydrogenation catalysts can be used. Specific examples of the additives include the organic compound A, the organic compound B, and an alkylene oxide polymer described below. These organic additives may be used alone or in a combination of two or more thereof in any ratio.

According to the present application, the first organic complexing agent and the second organic complexing agent may be the same or different from each other, each independently representing the organic additive. Further, the molar ratio of the first organic complexing agent to the second organic complexing agent is generally in a range from 1:0.25 to 1:4, preferably from 1:0.5 to 1:2.

According to the present application, as the organic compound A, it refers to an organic compound obtained by interrupting the carbon backbone of a $C_{2-30}$ linear or branched alkane with one or more hetero groups selected from —O— and Here, the group $R_1$ is selected from H and an optionally substituted $C_{1-10}$ linear or branched alkyl group, preferably H. Here, as the $C_{1-10}$ linear or branched alkyl group, for example, $C_{1-6}$ linear or branched alkyl group or $C_{1-4}$ linear or branched alkyl group may be mentioned, and more specifically, for example, methyl, ethyl, propyl, n-butyl, isobutyl and n-hexyl may be mentioned. Specific examples of the $C_{2-30}$ linear or branched alkane include $C_{2-20}$ linear or branched alkanes or $C_{2-10}$ linear or branched alkanes, and more specifically, for example, ethane, n-propane, isopropane, n-butane, tert-butane, isobutane, n-pentane, isopentane, neopentane, n-hexane, isohexane, neohexane, n-octane, isooctane, t-octane, n-nonane, n-decane, isodecane and tert-decane. From the viewpoint of structural stability, it is preferable that, where there are two or more said hetero groups, any two of the hetero groups are not directly bonded. It is apparent that the hetero group is not present at the end of the carbone backbone of the linear or branched alkane or the organic compound A. For example, organic compounds, such as $CH_3$—O—$CH_2$—O—$CH_2$—$CH_3$ or $CH_3$—$CH_2$—O—$CH_2$—$CH_3$, can be obtained by interrupting a $C_4$ linear alkane (n-butane, $CH_3$—$CH_2$—$CH_2$—$CH_3$) with one hetero group —O—, organic compounds, such as $CH_3$—O—$CH_2$—O—$CH_2$—$CH_3$ or $CH_3$—O—$CH_2$—$CH_2$—O—$CH_3$, can be obtained by interrupting the $C_4$ linear alkane with two hetero groups —O—, and organic compounds, such as $CH_3$—O—$CH_2$—O—$CH_2$—O—$CH_3$, can be obtained by interrupting the $C_4$ linear alkane with three hetero groups —O—. Alternatively, organic compounds, such as $CH_3$—$NCH_3$—$CH_2$—$CH_2$—$CH_3$ or $CH_3$—$CH_2$—$NCH_3$—$CH_2$—$CH_3$, can be obtained by interrupting a $C_4$ linear alkane (n-butane, $CH_3$—$CH_2$—$CH_2$—$CH_3$) with one hetero group —$NCH_3$—, organic compounds, such as $CH_3$—$NCH_3$—$CH_2$—$NCH_3$—$CH_2$—$CH_3$ or $CH_3$—$NCH_3$—$CH_2$—$CH_2$—$NCH_3$—$CH_3$, can be obtained by interrupting the $C_4$ linear alkane with two hetero groups —$NCH_3$—, and organic compounds, such as $CH_3$—$NCH_3$—$CH_2$—$NCH_3$—$CH_2$—$NCH_3$—$CH_3$, can be obtained by interrupting the $C_4$ linear alkane with three hetero groups —$NCH_3$—. These organic compounds A may be used alone or in a combination of two or more thereof in any ratio. These organic compounds A can be produced according to a known method, and can also be obtained commercially.

According to the present application, as the organic compound B, it refers to an organic compound obtained by replacing one or more hydrogen atoms in the structure of a $C_{1-30}$ linear or branched alkane, a $C_{2-30}$ linear or branched alkene, an optionally substituted $C_{3-20}$ cycloalkane or the organic compound A with a group selected from the group consisting of —$R_2$—OH, —$R_3$—$NR_4R_5$, and —$R_6$—C(=O)OM. Here, as the $C_{1-30}$ linear or branched alkane, specifically, for example, a $C_{2-20}$ linear or branched alkane or a $C_{2-10}$ linear or branched alkane may be mentioned, and more specifically, for example, ethane, n-propane, isopropane, n-butane, tert-butane, isobutane, n-pentane, isopentane, neopentane, n-hexane, isohexane, neohexane, n-octane, isooctane, tert-octane, n-nonane, n-decane, isodecane and tert-decane may be mentioned. Specific examples of the $C_{2-30}$ linear or branched alkene include $C_{2-20}$ linear or branched alkene or $C_{2-10}$ linear or branched alkene, and more specifically, for example, ethylene, propylene, 1-butylene, 2-butene, 1-pentene, 2-pentene, 2-methyl-1-butene, 1-hexene, 2-hexene, 3-hexene, 2-methyl-1-pentene, 1-heptene, 2-heptene, 2-methyl-1-hexene, 3-methyl-1-hexene, 1-octene, 2-octene, 2-methyl-1-octene, 4-methyl-2-octene, 4-octene, 1-decene, 2-decene, 1-decene, 2-decene, 5-decene, 2-methyl-1-nonene, 3-methyl-1-nonene, 5-methyl-1-nonene, 3-methyl-2-nonene and 2-methyl-5-nonene. These organic compounds B may be used alone or in a combination of two or more thereof in any ratio. These organic compounds B can be produced according to a known method, and can also be obtained commercially.

According to the present application, the group $R_2$ represents a single bond or a $C_{1-10}$ linear or branched alkylene group, preferably a single bond or a $C_{1-6}$ linear or branched alkylene group, preferably a single bond or a $C_{1-3}$ linear or branched alkylene group, such as ethylene or methylene.

According to the present application, the group $R_3$ represents a single bond or a $C_{1-10}$ linear or branched alkylene group, preferably a $C_{1-6}$ linear or branched alkylene group, preferably a $C_{1-3}$ linear or branched alkylene group, such as ethylene or methylene.

According to the present application, the groups $R_4$ and $R_5$ are identical or different from each other, each independently selected from the group consisting of hydrogen, $C_{1-10}$ linear or branched alkyl group and —$R_6$—C(=O)OM, preferably each independently selected from hydrogen, $C_{1-6}$ linear or branched alkyl group and —$R_6$—C(=O)OM, more preferably each independently selected from $C_{1-3}$ linear or branched alkyl group and —R$_6$—C(=O)OM, preferably each independently represents —R$_6$—C(=O)OM. Here, examples of the C$_{1-3}$ linear or branched alkyl group include ethyl or methyl. Further, the group —C(=O)OM represents a carboxylic acid group or a carboxylate group.

According to the present application, the group R$_6$ represents a single bond or a C$_{1-10}$ linear or branched alkylene group, preferably a C$_{1-6}$ linear or branched alkylene group, preferably a C$_{1-3}$ linear or branched alkylene group, such as ethylene or methylene.

According to the present application, the group M represents H, an alkali metal or an alkaline earth metal. Here, specific examples of the alkali metal include sodium and potassium, and specific examples of the alkaline earth metal include magnesium, calcium, and barium.

According to the present application, from the viewpoint of structural stability, in the structures of the organic compound A and the organic compound B, no oxygen-oxygen bond (such as O—O), nitrogen-nitrogen bond (such as N—N or N=N), or nitrogen-oxygen bond (such as N—O or N=O) is present.

According to the present application, as the alkylene oxide polymer, it refers to an alkylene oxide homopolymer or copolymer. Here, specific examples of the alkylene oxide homopolymer include polyethylene glycol and polypropylene glycol. Specific examples of the alkylene oxide copolymer include an ethylene oxide/propylene oxide copolymer. In the alkylene oxide copolymer, structural units derived from a polyfunctional monomer such as glycerin may be contained as needed in addition to those derived from ethylene oxide and propylene oxide. The molecular weight of the alkylene oxide polymer is not particularly limited in the present application, and conventional knowledge in the art can be adopted, but specifically, for example, may be in a range from 100 to 3,000, preferably from 200 to 1,500, more preferably from 200 to 600. These alkylene oxide polymers may be used alone or in a combination of two or more thereof in any ratio. These alkylene oxide polymers can be produced according to a known method or can be obtained commercially.

According to an embodiment of the present application, as the organic additive, more specifically, for example, a C$_{1-20}$ aliphatic or C$_{5-10}$ alicyclic monoamine or polycarboxylic acid optionally comprising one or more groups —R$_2$—OH as the substituent or a salt thereof may be mentioned. Here, the group R$_2$ represents a single bond or a C$_{1-10}$ linear or branched alkylene group, preferably a single bond or a C$_{1-6}$ linear or branched alkylene group, preferably a single bond or a C$_{1-3}$ linear or branched alkylene group, such as ethylene or methylene. As the C$_{1-20}$ aliphatic mono- or polycarboxylic acid or salt thereof, a C$_{2-7}$ aliphatic mono- or polycarboxylic acid or a salt thereof is preferred, and more specifically, acetic acid, maleic acid, and oxalic acid can be mentioned. As the C$_{1-20}$ aliphatic mono- or polycarboxylic acid comprising one or more groups —R$_2$—OH as the substituent or salt thereof, a C$_{2-7}$ aliphatic mono- or polycarboxylic acid comprising one or more —R$_2$—OH as the substituent or a salt thereof is preferred, and more specifically, for example, citric acid, tartaric acid and malic acid can be mentioned. As the C$_{5-10}$ alicyclic mono- or polycarboxylic acid or salt thereof, a C$_{5-7}$ alicyclic mono- or polycarboxylic acid or a salt thereof is preferred, and more specifically, for example, cyclohexane dicarboxylic acid can be mentioned. These mono- or polycarboxylic acids or salts thereof may be used alone or in a combination of two or more thereof in any ratio. These mono- or polycarboxylic acids or salts thereof can be produced according to a known method, and can also be obtained commercially.

According to an embodiment of the present application, as the organic additive, more specifically, for example, C$_{1-20}$ aliphatic or C$_{5-10}$ alicyclic mono- or polyamine optionally comprising one or more substituents selected from the group consisting of —R$_2$—OH and —R$_6$—C(=O)OM may be mentioned. Here, the group R$_2$ represents a single bond or a C$_{1-10}$ linear or branched alkylene group, preferably a single bond or a C$_{1-6}$ linear or branched alkylene group, preferably a single bond or a C$_{1-3}$ linear or branched alkylene group, such as ethylene or methylene. The group R$_6$ represents a single bond or a C$_{1-10}$ linear or branched alkylene group, preferably a C$_{1-6}$ linear or branched alkylene group, preferably a C$_{1-3}$ linear or branched alkylene group, such as ethylene or methylene. The group M represents H, an alkali metal or an alkaline earth metal. Specific examples of the alkali metal include sodium and potassium. Specific examples of the alkaline earth metal include magnesium, calcium and barium. Further, as the C$_{1-20}$ aliphatic mono- or polyamine, a C$_{2-7}$ aliphatic mono- or polyamine is preferred, and more specifically, for example, ethylenediamine, triethylamine and hexamethylenediamine can be mentioned. As the C$_{1-20}$ aliphatic mono- or polyamine comprising one or more groups —R$_2$—OH as the substituent, a C$_{2-7}$ aliphatic mono- or polyamine comprising one or more groups —R$_2$—OH as the substituent is preferred, and more specifically, for example, ethanolamine, diethanolamine and triethanolamine can be mentioned. As the C$_{1-20}$ aliphatic mono- or polyamine comprising one or more groups —R$_6$—C(=O)OM as the substituent, a C$_{2-7}$ aliphatic mono- or polyamine comprising one or more groups —R$_6$—C(=O)OM as the substituent is preferred, and more specifically, for example, ethylenediaminetetraacetic acid or a salt thereof and nitrilotriacetic acid or a salt thereof can be mentioned. As the C$_{5-10}$ alicyclic mono- or polyamine, a C$_{5-7}$ alicyclic mono- or polyamine is preferred, and more specifically, for example, 1,2-cyclohexanediamine can be mentioned. As the C$_{5-10}$ alicyclic mono- or polyamine comprising one or more groups —R$_6$—C(=O)OM as the substituent, a C$_{5-7}$ alicyclic mono- or polyamine comprising one or more groups —R$_6$—C(=O)OM as the substituent is preferred, and more specifically, for example, 1,2-cyclohexanediaminetetraacetic acid or a salt thereof can be mentioned. These mono- or polyamines may be used alone or in a combination of two or more thereof in any ratio. These mono- or polyamines can be produced according to a known method or can be obtained commercially.

According to an embodiment of the present application, as the organic additive, more specifically, for example, C$_{2-20}$ aliphatic or C$_{5-10}$ alicyclic polyols can be mentioned. Here, as the C$_{2-20}$ aliphatic polyol, C$_{2-6}$ aliphatic polyols are preferred, and more specifically, ethylene glycol, butylene glycol, and glycerin can be mentioned. As the C$_{5-10}$ alicyclic polyol, C$_{5-7}$ alicyclic polyols are preferred, and more specifically, cyclohexane dimethanol can be mentioned. Further, as the organic additive, for example, polymers of the polyols, including oligomers or polymers of the polyols, more specifically, for example, polyethylene glycol, polypropylene glycol, diethylene glycol, triethylene glycol and tripropylene glycol, or the like may be mentioned. Here, the molecular weight of the polymer is generally in a range from 100 to 3,000, preferably from 200 to 1,500, more preferably from 200 to 600, but is not limited thereto. Further, as the organic additive, for example, C$_{1-6}$ linear or branched alkyl etherates of the polymers may be further mentioned, and more specifically, diethylene glycol monomethyl ether may be mentioned. These polyols, polymers or etherates may be used alone or in a combination of two or more thereof in any ratio. These polyols, polymers or etherates can be produced according to a known method, and can also be obtained commercially.

According to the present application, as the organic additive, more specifically, for example, ethylene glycol, glycerin, polyethylene glycol (having a molecular weight generally in a range from 200 to 1,500, more preferably from 200 to 600), diethylene glycol, butanediol, acetic acid, maleic acid, oxalic acid, nitrilotriacetic acid or a salt thereof, 1,2-cyclohexanediaminetetraacetic acid or a salt thereof, citric acid, tartaric acid, malic acid, ethylenediamine and ethylenediamine tetraacetic acid or a salt thereof may be mentioned. These organic additives may be used alone or in a combination of two or more thereof in any ratio. These organic additives can be produced according to a known method, and can also be obtained commercially.

According to the present application, in the process for producing a hydrogenation catalyst, for convenience of operation, the organic additive (including the organic additive as the first organic complexing agent and/or the organic additive as the second organic complexing agent) is generally used in the form of an impregnation liquid, preferably an aqueous solution, such as during the contacting or impregnation involved in the step (1) or step (3). In the impregnation liquid, the organic additive is present in any amount conventionally used in the art. In addition, in addition to the organic additive, the impregnation liquid may further comprise other components depending on the case, such as the first active metal component or the coagent, thereby avoiding the effort for separately preparing a corresponding impregnation liquid for the first active metal component or the coagent. In this case, the first active metal component or the coagent is present in the impregnation solution in an amount specified in the context of the present specification.

According to the present application, in the process for producing the hydrogenation catalyst, particularly in the step (1), as the amount of the first organic complexing agent, for example, the molar ratio of the first organic complexing agent to the first active metal component is generally in a range from 0.03:1 to 2:1, preferably from 0.08:1 to 1.5:1.

According to the present application, in the process for producing a hydrogenation catalyst, there is no particular limitation to the coagent involved in each of the relevant steps, such as step (1), step (0-1) or step (0-3), and for example, various active elements known in the art that can be used to improve the performance of the hydrogenation catalyst can be mentioned. These active elements may be used alone or in a combination of two or more thereof in any ratio. Here, as the active element, for example, metallic coagents and non-metallic coagents may be mentioned. More specifically, examples of the metallic coagent include Group IIB metallic elements, Group IA metallic elements, Group IIA metallic elements, and rare earth metallic elements. Examples of the Group IIB metallic element include zinc and cadmium. Examples of the Group IA metallic element include lithium, sodium, potassium, rubidium, cesium, and cesium. As the Group IIA metallic element, for example, beryllium, magnesium, calcium and strontium may be mentioned. As the rare earth metallic element, for example, lanthanum, cerium, praseodymium and neodymium may be mentioned. As the metallic coagent, zinc, sodium, potassium, magnesium, calcium, lanthanum and cerium are preferred. These metallic coagents may be used alone or in a combination of two or more thereof in any ratio.

Further, as the non-metallic coagent, more specifically, for example, Group IVA elements, Group VIIA elements, Group VA elements, and Group IIIA elements may be mentioned. Specific examples of the Group IVA element include silicon. Examples of the Group VIIA element include fluorine, chlorine, bromine and iodine. Examples of the Group VA element include phosphorus and arsenic. As the Group IIIA element, for example, boron can be mentioned. As the non-metallic coagent, fluorine, silicon, phosphorus and boron are more preferable. These non-metallic coagents may be used alone or in a combination of two or more thereof in any ratio. It should be particularly noted that, as described above, a carrier precursor or a carrier may be involved in the process for producing the hydrogenation catalyst, and both of the carrier precursor or carrier and the non-metallic coagent may contain silicon. In view of this, in the context of the present specification, unless specifically stated otherwise, when the content of silicon exceeds 10% by weight and the silicon is present in the form of an oxide, it is regarded as the carrier precursor or carrier, or otherwise it is regarded as the non-metallic coagent.

According to the present application, the non-metallic coagent may be used in any form known in the art. As the form of the non-metallic coagent, for example, various water-soluble salts of the corresponding non-metallic elements may be mentioned, and more specifically, for example, oxides, chlorides, oxysalts and ammonium salts of the corresponding non-metallic elements may be mentioned. These water-soluble salts may be used alone or in a combination of two or more thereof in any ratio. Further, the metallic coagent may be used in any form known in the art. As the form of the metallic coagent, for example, various water-soluble salts of the corresponding metallic elements can be mentioned, and more specifically, for example, chlorides, nitrates and sulfates of the corresponding metallic elements can be mentioned. These water-soluble salts may be used alone or in a combination of two or more thereof in any ratio.

According to the present application, in the process for producing the hydrogenation catalyst, for the convenience of operation, the coagent (including the metallic coagent and the non-metallic coagent) may sometimes be used in the form of an impregnation liquid (preferably an aqueous solution). Here, the content of the coagent, on the basis of the corresponding metallic element or the corresponding non-metallic element, in the impregnation liquid is generally in a range from 0.05 to 3 mol/L, preferably from 0.1 to 2 mol/L. In addition, the impregnation liquid may further comprise other components depending on the case, such as the first active metal component, the first organic complexing agent or the second active metal component, in addition to the coagent, thereby avoiding the effort for separately preparing a corresponding impregnation liquid for the first active metal component, the first organic complexing agent or the second active metal component. In this case, the first active metal component, the first organic complexing agent or the second active metal component is present in the impregnation liquid in an amount specified in the context of the present specification.

According to the present application, the coagents used in each of the relevant steps, such as step (1), step (0-1) or step (0-3), may be identical or different from one another, each independently representing the activity element. Moreover, the specific amount of the coagent used in each of the relevant steps in the present application is not particularly limited as long as the total amount of the coagent used in the process for producing the hydrogenation catalyst of the present application, i.e. the sum of the amounts used in the relevant steps, is such that the content of the coagent in the hydrogenation catalyst finally obtained by the process for producing the hydrogenation catalyst reaches the amount conventionally known in the art. More specifically, as the total amount of the metallic coagent used in the process for producing a hydrogenation catalyst of the present application, for example, it can be mentioned that, in the hydrogenation catalyst finally obtained by the process for producing the hydrogenation catalyst, the metallic coagent is generally present in an amount, on the basis of the metallic element, in a range from 0% by weight to 10% by weight, preferably from 0.5% by weight to 6% by weight, based on the total weight of the hydrogenation catalyst. In addition, as the total amount of the non-metallic coagent used in the process for producing a hydrogenation catalyst of the present application, for example, it can be mentioned that, in the hydrogenation catalyst finally obtained by the process for producing the hydrogenation catalyst, the metallic element is generally present in an amount, on the basis of the non-metallic element, in a range from 0% by weight to 10% by weight, preferably from 0.5% by weight to 6% by weight, based on the total weight of the hydrogenation catalyst.

According to the present application, there is also provided a hydrogenation catalyst. The hydrogenation catalyst is produced in accordance with the aforementioned process for producing a hydrogenation catalyst of the present application.

According to the present application, there is further provided a hydrogenation catalyst composition. The hydrogenation catalyst composition comprises at least two different hydrogenation catalysts, namely a hydrogenation catalyst I and a hydrogenation catalyst II. Here, the term "different" may specifically refer to a difference in structure, composition, production process, or performance, and where those skilled in the art believe that there is a non-negligible difference between the two hydrogenation catalysts, these two hydrogenation catalysts can be deemed to be different.

According to the present application, the hydrogenation catalyst I is a hydrogenation catalyst produced by the process for producing a hydrogenation catalyst of the present application or a hydrogenation catalyst of the present application, and the hydrogenation catalyst II is other hydrogen catalyst known in the art. These other hydrogenation catalysts may be used alone or in a combination of two or more thereof in any ratio. Further, the other hydrogenation catalyst may be produced according to a production process known in the art, or can be obtained commercially. Specifically, the hydrogenation catalyst II may, for example, comprise a carrier, a Group VIB metallic element and a Group VIII metallic element, and, on the basis of the corresponding metal oxide, the content of the Group VIII metallic element may be 1-10% by weight, and the content of the Group VIB metallic element may be 5-60% by weight, based on the total weight of the hydrogenation catalyst II. Here, regarding the carrier, the Group VIB metallic element, and the Group VIII metallic element, reference may be made to the related content described herein above.

According to the present application, in the hydrogenation catalyst composition, the hydrogenation catalyst I is generally present in an amount of 5 to 95%, preferably 10 to 80%, more preferably 20 to 70% by volume, based on the total volume of the hydrogenation catalyst composition, and the hydrogenation catalyst II is generally present in an amount of 5 to 95%, preferably 20 to 90%, more preferably 30 to 80%.

According to the present application, there is further provided a hydrotreatment process. The hydrotreatment process comprises a step of contacting a feedstock oil with a hydrogenation catalyst of the present application, a hydrogenation catalyst produced by the process for producing a hydrogenation catalyst of the present application, or a hydrogenation catalyst composition of the present application in the presence of hydrogen to conduct a hydrogenation reaction. Here, the hydrotreatment is directly applicable to the conventional understanding of those skilled in the art, and specific examples thereof include hydrorefining, and particularly, hydrodesulfurization and hydrodenitrogenation, but the present application is not limited thereto.

According to the present application, examples of the feedstock oil include, for example, those well known to those skilled in the art, and specific examples thereof include gasoline, diesel oil, lubricating oil, kerosene, naphtha, atmospheric residue, vacuum residue, petroleum wax and Fischer-Tropsch synthetic oil. These feedstock oils may be used alone or in a combination of two or more thereof in any ratio.

According to the present application, as the hydrogenation conditions, the reaction temperature is generally in a range from 300° C. to 400° C., preferably from 320° C. to 380° C.

According to the present application, as the hydrogenation conditions, the reaction pressure is generally in a range from 1 MPa to 10 MPa (gauge pressure), preferably from 1 MPa to 8 MPa (gauge pressure).

According to the present application, as the hydrogenation conditions, the liquid hourly space velocity of the feedstock oil is generally in a range from 0.5 $h^{-1}$ to 3 $h^{-1}$, preferably from 0.5 $h^{-1}$ to 2.5 $h^{-1}$.

According to the present application, as the hydrogenation conditions, the hydrogen-to-oil volume ratio is generally in a range from 100 to 800, preferably from 100 to 700. Here, the hydrogen-to-oil volume ratio refers to the ratio of the volumetric flow rate of hydrogen gas to the volumetric flow rate of the feedstock oil.

According to a particular embodiment of the present application, the feedstock oil is contacted with the hydrogenation catalyst composition in the presence of hydrogen. Here, as the mode for contacting the feedstock oil with the hydrogenation catalyst composition, specifically, for example, the feedstock oil may be firstly contacted with the hydrogenation catalyst I, and then with the hydrogenation catalyst II, or the feedstock oil may be firstly contacted with the hydrogenation catalyst II and then with the hydrogenation catalyst I, or, where multiple stages of the hydrogenation catalyst I and multiple stages of the hydrogenation catalyst II are present, the feedstock oil may be alternately contacted with these hydrogenation catalysts. Since the hydrogenation catalyst I has a higher catalytic activity and longer service life than the hydrogenation catalyst II, it is preferable to contact the hydrogenation catalyst I with the feedstock oil later, so that the hydrogenation reaction can be carried out by contacting it with the feedstock oil under more severe reaction conditions.

According to the present application, during the hydrogenation reaction using the catalyst composition, the mode for loading the hydrogenation catalyst I and the hydrogenation catalyst II in the hydrogenation reactor for carrying out the hydrogenation reaction is not particularly limited. Specific examples of the loading mode include a layered loading mode and a mixed loading mode. Specific examples of the layered loading mode include a process of loading the hydrogenation catalyst I upstream of the hydrogenation catalyst II along the flow direction of the feedstock oil, or loading the hydrogenation catalyst II upstream of the hydrogenation catalyst I, or alternately loading the hydrogenation catalyst I and the hydrogenation catalyst II in a layered manner, and preferably loading the hydrogenation catalyst II upstream of the hydrogenation catalyst I. In addition, the hydrogenation catalyst I and the hydrogenation catalyst II may be loaded in the same hydrogenation reactor to form the same catalyst bed or different catalyst beds, or may be loaded separately or in any combination in multiple hydrogenation reactors arranged in series, respectively.

According to the present application, it may be further provided before, after and/or in the bed of the hydrogenation catalyst I, and/or before, after and/or in the bed of the hydrogenation catalyst II any additional catalyst or filler that may be helpful for improving the beneficial properties of these hydrogenation catalysts. Here, as the type or the manner of use of the filler, conventional knowledge in the art can be adopted. For example, as the filler, ceramic balls and active supporting materials can be mentioned. Further, by way of example, if the bed of the hydrogenation catalyst I is located upstream of the bed of the hydrogenation catalyst II, a bed composed of a filler may be provided in front of the bed of the hydrogenation catalyst I in order to improve the distribution of the feedstock oil in the hydrogenation reactor.

EXAMPLE

The present application is further illustrated by the following examples, but the present application is not limited to the examples.

In the context of the present specification, in the following examples and comparative examples, the content of each element in the hydrogenation catalyst was determined using a 3271 E type X-ray fluorescence spectrometer of Nippon Science & Technology Co., Ltd.

In the context of the present specification, including the following examples and comparative examples, the total carbon content of the calcined composite carrier (hereinafter sometimes referred to as a semi-finished catalyst) was determined using an EMIA-320V carbon-sulfur analyzer manufactured by HORIBA, Japan.

In the context of the present specification, in the following examples and comparative examples, the dry weight of the calcined composite carrier (hereinafter sometimes referred to as a semi-finished catalyst) was determined as follows: a certain amount (e.g., 30 g) of the sample to be tested was weighed, calcined in a muffle furnace at 450° C. for 3 hours, and weighed again after cooling, and the weight thus obtained was recorded as the dry weight.

In the context of the present specification, in the following examples and comparative examples, the dry basis of the hydrated alumina or aluminum hydroxide powder was determined as follows: a certain amount (e.g., 30 g) of the sample to be tested was weighed, calcined in a muffle furnace at 600° C. for 3 hours, and weighed again after cooling, and the weight thus obtained was recorded as the dry weight. The ratio of the dry weight determined to the initial weight of the sample to be tested is the dry basis of the sample to be tested.

Example I-1

This example is provided to illustrate the hydrogenation catalyst and the process for producing the same according to the present application.

54 g of molybdenum trioxide, 19 g of basic cobalt carbonate, 20 g of phosphoric acid, 20 g of citric acid were weighed into 140 g of deionized water, and heated while stirring until dissolved to obtain a clear impregnation solution. 200 g of alumina carrier was impregnated with the above solution by a saturated impregnation method for 2 hours, dried at 120° C. for 2 hours, and then calcined under a flow of air at a calcination temperature of 400° C. for 2 hours, with a gas-to-reagent ratio of 2 L/(g·hr), to obtain a semi-finished catalyst Z-S1, of which the total carbon content is shown in Table I-1; 5 g of ethanol was added to 150 g of deionized water, and stirred to obtain a clear solution. Z-S1 was impregnated with the above solution by a saturated impregnation method for 2 hours, and then dried at 110° C. for 3 hours to obtain a catalyst S1. The content of the metallic element having hydrogenation activity of the catalyst, on the basis of oxide, based on the total amount of S1 is shown in Table I-1.

Comparative Example I-1

A hydrogenation catalyst was produced in the same manner as in Example I-1, except that the hydrogenation catalyst S1 produced in Example I-1 was calcined at 400° C. for 3 hours to obtain a catalyst D1. The content of the metallic element having hydrogenation activity of the catalyst, on the basis of oxide, based on the total amount of D1 is shown in Table I-1.

Example I-2

This example is provided to illustrate the hydrogenation catalyst and the process for producing the same according to the present application.

54 g of molybdenum trioxide, 21 g of basic nickel carbonate, 13 g of phosphoric acid, 30 g of citric acid were weighed into 140 g of deionized water, and heated while stirring until dissolved to obtain a clear impregnation solution. 200 g of zirconia carrier was impregnated with the above solution by a saturated impregnation method for 2 hours, dried at 150° C. for 2 hours, and then calcined under a flow of air at a calcination temperature of 360° C. for 3 hours, with a gas-to-reagent ratio of 10 L/(g·hr), to obtain a semi-finished catalyst Z-S2, of which the total carbon content is shown in Table I-1; 30 g of citric acid was added to 150 g of deionized water, and stirred to obtain a clear solution. Z-S2 was impregnated with the above solution by a saturated impregnation method for 2 hours, and then dried at 150° C. for 3 hours to obtain a catalyst S2. The content of the metallic element having hydrogenation activity of the catalyst, on the basis of oxide, based on the total amount of S2 is shown in Table I-1.

Example I-3

This example is provided to illustrate the hydrogenation catalyst and the process for producing the same according to the present application.

30 g of nickel nitrate, 45 g of ammonium metatungstate and 15 g of oxalic acid were weighed into 140 g of deionized water, and heated while stirring until dissolved to obtain a clear solution. 200 g of silica carrier was impregnated with the above solution by a saturated impregnation method for 2 hours, dried at 120° C. for 2 hours, and then calcined under a flow of air at a calcination temperature of 450° C. for 4 hours, with a gas-to-reagent ratio of 0.3 L/(g·hr), to obtain a semi-finished catalyst Z-S3, of which the total carbon content is shown in Table I-1; 10 g of diethylene glycol was added to 150 g of deionized water, and stirred to obtain a clear solution. Z-S3 was impregnated with the above solution by a saturated impregnation method for 2 hours, and then dried at 120° C. for 6 hours to obtain a catalyst S3. The content of the metallic element having hydrogenation activity of the catalyst, on the basis of oxide, based on the total amount of S3 is shown in Table I-1.

Comparative Example I-2

30 g of nickel nitrate, 45 g of ammonium metatungstate and 15 g of oxalic acid were weighed into 140 g of deionized water, and heated while stirring until dissolved to obtain a clear solution. 200 g of silica carrier was impregnated with the above solution by a saturated impregnation method for 2 hours, dried at 120° C. for 2 hours, and then calcined under a flow of air at a calcination temperature of 450° C. for 4 hours, with a gas-to-reagent ratio of 0.3 L/(g·hr) to obtain a catalyst D2. The content of the metallic element having hydrogenation activity of the catalyst, on the basis of oxide, based on the total amount of D2 is shown in Table I-1.

Comparative Example I-3

30 g of nickel nitrate, 45 g of ammonium metatungstate, 15 g of oxalic acid and 10 g of diethylene glycol were weighed into 140 g of deionized water, and heated while stirring until dissolved to obtain a clear solution. 200 g of silica carrier was impregnated with the above solution by a saturated impregnation method for 2 hours, and then dried at 120° C. for 2 hours to obtain a catalyst D3. The content of the metallic element having hydrogenation activity of the catalyst, on the basis of oxide, based on the total amount of D3 is shown in Table I-1.

Example I-4

This example is provided to illustrate the hydrogenation catalyst and the process for producing the same according to the present application.

83 g of nickel nitrate, 60 g of ammonium metatungstate, 10 g of ammonium molybdate, 20 g of ammonium dihydrogen phosphate and 20 g of citric acid were weighed into 140 g of deionized water, and heated while stirring until dissolved to obtain a clear solution. 200 g of an alumina-silica carrier (at a weight ratio of 1:1) was impregnated with the above solution by a saturated impregnation method for 2 hours, dried at 120° C. for 2 hours, and then calcinated under a flow of air at a calcination temperature of 450° C. for 3 hours, with a gas-to-reagent ratio of 0.8 L/(g·hr), to obtain a semi-finished catalyst Z-S4, of which the total carbon content is shown in Table I-1; 15 g of ethylenediamine was added to 150 g of deionized water, and stirred to obtain a clear solution. Z-S4 was impregnated with the above solution by a saturated impregnation method for 2 hours, and then dried at 120° C. for 3 hours to obtain a catalyst S4. The content of the metallic element having hydrogenation activity of the catalyst, on the basis of oxide, based on the total amount of S4 is shown in Table I-1.

Example I-5

This example is provided to illustrate the hydrogenation catalyst and the process for producing the same according to the present application.

A hydrogenation catalyst was produced in the same manner as in Example I-3 except that, after the metal active component was impregnated into the carrier, the carrier was calcined at a temperature of 480° C. for 6 hours. The total carbon content of the semi-finished catalyst obtained is shown in Table I-1. The content of the metallic element having hydrogenation activity of the catalyst, on the basis of oxide, based on the total amount of the catalyst S5 obtained, is shown in Table I-1.

Example I-6

This example is provided to illustrate the hydrogenation catalyst and the process for producing the same according to the present application.

A hydrogenation catalyst was produced in the same manner as in Example I-2 except that the gas-to-reagent ratio used during the calcination was 1.0 L/(g·hr). In the catalyst S6 obtained, The content of the metallic element having hydrogenation activity of the catalyst, on the basis of oxide, based on the total amount of S6 is shown in Table I-1.

Example I-7

This example is provided to illustrate the hydrogenation catalyst and the process for producing the same according to the present application.

A hydrogenation catalyst was produced in the same manner as in Example I-2 except that the ratio of the first organic complexing agent to the second organic complexing agent used was changed from 30 g: 30 g to 50 g: 10 g. In the catalyst S7, The content of the metallic element having hydrogenation activity of the catalyst, on the basis of oxide, based on the total amount of S7 is shown in Table I-1.

TABLE I-1

| | Total carbon content in the semi-finished catalyst, wt % | $MoO_3$, wt % | CoO, wt % | NiO, wt % | $WO_3$, wt % |
|---|---|---|---|---|---|
| Ex. I-1 | 0.04 | 20.0 | 3.9 | — | — |
| Comp. Ex. I-1 | 0.04 | 21.4 | 4.3 | — | — |
| Ex. I-2 | 0.4 | 20.1 | — | 3.9 | — |
| Ex. I-3 | 0.1 | — | — | 3.3 | 15.1 |
| Comp. Ex. I-2 | — | — | — | 3.9 | 16.5 |
| Comp. Ex. I-3 | — | — | — | 3.1 | 15.0 |
| Ex. I-4 | 0.08 | 3.2 | — | 7.6 | 20.3 |
| Ex. I-5 | 0.03 | — | — | 3.2 | 15.3 |
| Ex. I-6 | 0.45 | 20.0 | — | 3.7 | — |
| Ex. I-7 | 0.5 | 20.3 | — | 3.8 | — |

Test Example I-1

In this test example, the desulfurization activity and the denitrification activity of the hydrogenation catalyst produced by the process of the present application and the hydrogenation catalyst provided in the comparative examples were evaluated by the following method, and the evaluation results are shown in Table I-2 below.

The Middle East blended diesel (85% straight-run diesel+ 15% catalytic cracked diesel) was used as the raw material, and its properties are as follows:

| | |
|---|---|
| S content | 12000 μg/g |
| N content | 220 μg/g |
| Density (20° C.) | 0.8588 g/cm$^3$ |
| Refractive index (20° C.) | 1.4841 |

The desulfurization and denitrification activities of the catalyst were evaluated on a 30 ml diesel hydrogenation unit. The catalyst was pre-sulfurized before the reaction, and 30 mL of catalyst was loaded. The pre-sulfurization conditions were: 6.4 MPa, 320° C., 4 h, a hydrogen-to-oil volume ratio of 300:1, and a feed rate of sulfurized oil of 8 mL/h. The reaction conditions were as follows: a hydrogen partial pressure of 6.4 MPa, a reaction temperature of 350° C., a hydrogen-to-oil volume ratio of 300, and a liquid hourly space velocity of 1.5 h$^{-1}$. Samples were collected after 4 hours and 500 hours of reaction, respectively, and the sulfur and nitrogen contents of the raw material used in the hydrodesulfurization, hydrodenitrogenation reaction, and the product obtained were determined by gas chromatography.

The hydrodesulfurization activity of the catalyst was evaluated relative to the reference agent D (i.e. the catalyst produced in Comparative Example I-2), and the hydrodesulfurization reaction was treated as a 1.65-order reaction. The reaction rate constant $k(X)_{HDS}$ of the Catalyst X was calculated according to equation (1):

$$k(X)_{HDS} = LHSV \times \left( \frac{1}{\left( \text{Sulfer content of the raw material} \right)^{0.65}} - \frac{1}{\left( \text{Sulfer content of the product} \right)^{0.65}} \right). \quad (1)$$

The LHSV in the equation (1) refers to the liquid hourly space velocity of the hydrocarbon oil employed during the hydrorefining reaction.

The relative hydrodesulfurization activity of the Catalyst X was calculated according to equation (2) using the hydrodesulfurization activity of the catalyst D2 [denoted as $k(D2)_{HDS}$] produced in Comparative Example I-2 as the basis reference:

$$\text{Relative hydrodesulfurization activity } (X) = \left( \frac{k(X)_{HDS}}{k(D2)_{HDS}} \right) \times 100\%. \quad (2)$$

The hydrodenitrogenation activity of the catalyst was evaluated relative to the reference agent D (i.e. the catalyst produced in Comparative Example I-2), and the hydrodenitrogenation reaction was treated as a first-order reaction. The reaction rate constant $k(X)_{HDN}$ of the Catalyst X was calculated according to equation (3):

$$k(X)_{HDN} = LHSV \times Ln\left( \frac{\text{Nitrogen content of the raw material}}{\text{Nitrogen content of the product}} \right). \quad (3)$$

The LHSV in the equation (3) refers to the liquid hourly space velocity of the hydrocarbon oil employed during the hydrorefining reaction.

The relative hydrodenitrogenation activity of the Catalyst X was calculated according to equation (4) using the hydrodenitrogenation activity of the catalyst D2 [denoted as $k(D2)_{HDN}$] produced in Comparative Example I-2 as the basis reference:

$$\text{Relative hydrodenitrogenation activity } (X) = \left( \frac{k(X)_{HDN}}{k(D2)_{HDN}} \right) \times 100\%. \quad (4)$$

The hydrorefining evaluation results of the hydrogenation catalysts produced in the respective examples and comparative examples are shown in Table I-2.

TABLE I-2

| Examples | No. | Relative hydrodesulfurization activity, % | | Relative hydrodenitrogenation activity, % | |
|---|---|---|---|---|---|
| | | 4 hour of reaction | 500 hours of reaction | 4 hour of reaction | 500 hours of reaction |
| Ex. I-1 | S1 | 129 | — | 114 | — |
| Comp. Ex. I-1 | D1 | 103 | — | 100 | — |
| Ex. I-2 | S2 | 125 | — | 116 | — |
| Ex. I-3 | S3 | 127 | 120 | 119 | 115 |
| Comp. Ex. I-2 | D2 | 100 | — | 100 | — |
| Comp. Ex. I-3 | D3 | 111 | 70 | 104 | 81 |
| Ex. I-4 | S4 | 132 | — | 118 | — |
| Ex. I-5 | S5 | 115 | — | 105 | — |
| Ex. I-6 | S6 | 123 | — | 112 | — |
| Ex. I-7 | S7 | 117 | — | 106 | — |

Note:
"—" in Table I-2 indicates that no detection has been performed.

The results of Tables I-1 and I-2 show that the catalyst provided by the present application exhibit significantly improved hydrodesulfurization activity and hydrodenitrogenation activity, as compared to the hydrogenation catalyst produced by the prior process. In addition, when comparing the data of the relative hydrodesulfurization activity and the relative hydrodenitrogenation activity determined after 4 hours and 500 hours of reaction shown in Table I-2, it can be seen that the decrease of the activity of the catalyst provided by the present application after a long time of reaction is very small, and is much less than the comparative example. Thus, the catalyst produced by the process of the present application shows a significantly extended service life. The above results fully demonstrate that the process provided by the present application possesses advantages that are unmatched by other existing process.

Example II-1

This example is provided to illustrate the hydrogenation catalyst and the process for producing the same according to the present application.

270 g of magnesium nitrate was weighed, and heated, after an addition of deionized water, while stirring until dissolved, followed by addition of deionized water to 850 ml. 1000 g of alumina carrier was impregnated with the resultant solution by a saturated impregnation method for 2 hours, then dried at 120° C. for 2 hours, and calcined at 400° C. for 4 hours to obtain a magnesium-containing alumina Z1 having a water absorption of 0.85.

54 g of molybdenum trioxide, 21 g of basic nickel carbonate, 13 g of phosphoric acid, 30 g of citric acid were weighed into 140 g of deionized water, and heated while stirring until dissolved to obtain a clear impregnation solution. 200 g of the magnesium-containing alumina Z1 carrier was impregnated with the above solution by a saturated impregnation method for 2 hours, dried at 120° C. for 2 hours, and then calcined under a flow of air at a calcination temperature of 360° C. for 6 hours, with a gas-to-reagent ratio of 10.0 L/(g·hr), to obtain a semi-finished catalyst Z-S1, of which the total carbon content is shown in Table II-1; 30 g of citric acid was added to 150 g of deionized water, and stirred to obtain a clear solution. Z-S1 was impregnated with the above solution by a saturated impregnation method for 2 hours, and then dried at 200° C. for 2 hours to obtain a catalyst S1. The content of the metallic element having hydrogenation activity of the catalyst, on the basis of oxide, based on the total amount of S1 is shown in Table II-1.

Comparative Example II-1

A hydrogenation catalyst was produced in the same manner as in Example except that the hydrogenation catalyst S1 produced in Example was calcined at 400° C. for 3 hours to obtain a catalyst D1. The content of the metallic element having hydrogenation activity of the catalyst, on the basis of oxide, based on the total amount of the catalyst D1 is shown in Table II-2.

Example II-2

This example is provided to illustrate the hydrogenation catalyst and the process for producing the same according to the present application.

37 g of lanthanum nitrate was weighed, and heated, after an addition of deionized water, while stirring until dissolved, followed by addition of deionized water to 850 ml. 1000 g of alumina carrier was impregnated with the resultant solution by a saturated impregnation method for 2 hours, then dried at 100° C. for 2 hours, and calcined at 500° C. for 4 hours to obtain a lanthanum-containing alumina Z2 having a water absorption of 0.85.

30 g of nickel nitrate, 45 g of ammonium metatungstate, 15 g of oxalic acid were weighed into 140 g of deionized water, and heated while stirring until dissolved to obtain a clear solution. 200 g of lanthanum-containing alumina Z2 carrier was impregnated with the above solution by a saturated impregnation method for 2 hours, dried at 120° C. for 2 hours, and then calcined under a flow of air at a calcination temperature of 400° C. for 2 hours, with a gas-to-reagent ratio of 1.0 L/(g·hr), to obtain a semi-finished catalyst Z-S2, of which the total carbon content is shown in Table II-1; 10 g of diethylene glycol was added to 150 g of deionized water, and stirred to obtain a clear solution. Z-S2 was impregnated with the above solution by a saturated impregnation method for 2 hours, and then dried at 150° C. for 3 hours to obtain a catalyst S2. The content of the metallic element having hydrogenation activity of the catalyst, on the basis of oxide, based on the total amount of S2 is shown in Table II-1.

Example II-3

This example is provided to illustrate the hydrogenation catalyst and the process for producing the same according to the present application.

37 g of lanthanum nitrate was weighed, and heated, after an addition of deionized water, while stirring until dissolved, followed by addition of deionized water to 850 ml. 1000 g of silica carrier was impregnated with the resultant solution by a saturated impregnation method for 2 hours, then dried at 100° C. for 2 hours, and calcined at 500° C. for 4 hours to obtain a lanthanum-containing silica Z3 having a water absorption of 0.85.

83 g of nickel nitrate, 60 g of ammonium metatungstate, 10 g of ammonium molybdate, 20 g of ammonium dihydrogen phosphate, 20 g of citric acid were weighed into 140 g of deionized water, and heated while stirring until dissolved to obtain a clear solution. 200 g of the lanthanum-containing silica Z3 carrier was impregnated with the above solution by a saturated impregnation method for 2 hours, dried at 180° C. for 2 hours, and then calcined under a flow of air at a calcination temperature of 430° C. for 3 hours, with a gas-to-reagent ratio of 0.3 L/(g·hr), to obtain a semi-finished catalyst Z-S3, of which the total carbon content is shown in Table II-1; 15 g of ethylenediamine was added to 150 g of deionized water, and stirred to obtain a clear solution. Z-S3 was impregnated with the above solution by a saturated impregnation method for 1 hour, and then dried at 120° C. for 3 hours to obtain a catalyst S3. The content of the metallic element having hydrogenation activity of the catalyst, on the basis of oxide, based on the total amount of S3 is shown in Table II-1.

Example II-4

This example is provided to illustrate the hydrogenation catalyst and the process for producing the same according to the present application.

54 g of molybdenum trioxide, 19 g of basic cobalt carbonate, 20 g of phosphoric acid, 20 g of citric acid, 20 g of zinc nitrate were weighed into 140 g of deionized water, and heated while stirring until dissolved to obtain a clear impregnation solution. 200 g of alumina-silica carrier (at a weight ratio of 1:1) was impregnated with the above solution by a saturated impregnation method for 2 hours, dried at 120° C. for 2 hours, and then calcined under a flow of air at a calcination temperature of 400° C. for 2 hours, with a gas-to-reagent ratio of 2.0 L/(g·hr), to obtain a semi-finished catalyst Z-S4, of which the total carbon content is shown in Table II-1; 5 g of ethanol was added to 150 g deionized water, and stirred to obtain a clear solution. Z-S4 was impregnated with the above solution by a saturated impregnation method for 0.5 hour, and then dried at 110° C. for 3 hours to obtain a catalyst S4. The content of the metallic element having hydrogenation activity of the catalyst, on the basis of oxide, based on the total amount of S4 is shown in Table II-1.

Comparative Example II-2

54 g of molybdenum trioxide, 19 g of basic cobalt carbonate, 20 g of phosphoric acid, 20 g of citric acid, 20 g of zinc nitrate were weighed into 140 g of deionized water, and heated while stirring until dissolved to obtain a clear impregnation solution. 200 g of the same carrier as in Example II-4 was impregnated with the above solution by a saturated impregnation method for 2 hours, dried at 120° C. for 2 hours, and then calcined under a flow of air at a calcination temperature of 400° C. for 2 hours, with a gas-to-reagent ratio of 2.0 L/(g·hr) to obtain a catalyst D2. The content of the metallic element having hydrogenation activity of the catalyst, on the basis of oxide, based on the total amount of D2 is shown in Table II-2.

Comparative Example II-3

54 g of molybdenum trioxide, 19 g of basic cobalt carbonate, 20 g of phosphoric acid, 20 g of citric acid, 20 g of zinc nitrate and 5 g of ethanol were weighed into 140 g of deionized water, and heated while stirring until dissolved to obtain a clear impregnation solution. 200 g of the same carrier as in Example II-4 was impregnated with the above solution by a saturated impregnation method for 2 hours, and drying at 120° C. for 2 hours to obtain a catalyst D3. The content of the metallic element having hydrogenation activity of the catalyst, on the basis of oxide, based on the total amount of D3 is shown in Table II-2.

Example II-5

A hydrogenation catalyst was produced in the same manner as in Example II-2 except that, after the metal active component was impregnated into the carrier, the carrier was calcined at a temperature of 450° C. for 6 hours. The total carbon content of the semi-finished catalyst obtained is shown in Table II-1. In the catalyst S5 obtained, the content of the metallic element having hydrogenation activity of the catalyst, on the basis of oxide, based on the total amount of S5 is shown in Table II-1.

Example II-6

A hydrogenation catalyst was produced in the same manner as in Example II-1 except that the gas-to-reagent ratio used during the calcination was 1.0 L/(g·hr). In the catalyst S6 obtained, the content of the metallic element having hydrogenation activity of the catalyst, on the basis of oxide, based on the total amount of S6 is shown in Table II-1.

Example II-7

A hydrogenation catalyst was produced in the same manner as in Example except that the ratio of the first organic complexing agent to the second organic complexing agent used was changed from 30 g: 30 g to 50 g: 10 g. In the catalyst S7 obtained, the content of the metallic element having hydrogenation activity of the catalyst, on the basis of oxide, based on the total amount of S7 is shown in Table II-1.

TABLE II-1

|  | Ex. II-1 | Ex. II-2 | Ex. II-3 | Ex. II-4 | Ex. II-5 | Ex. II-6 | Ex. II-7 |
|---|---|---|---|---|---|---|---|
| $MoO_3$, wt % | 20.1 | — | 3.0 | 20.0 | — | 20.0 | 20.3 |
| CoO, wt % | — | — | — | 3.9 | — | — | — |
| NiO, wt % | 3.9 | 2.3 | 7.8 | — | 2.4 | 3.8 | 4.0 |
| $WO_3$, wt % | — | 15.3 | 20.0 | — | 15.4 | — | — |
| ZnO, wt % | — | — | — | 2.1 | — | — | — |
| MgO, wt % | 2.8 | — | — | — | — | 2.9 | 2.7 |
| $La_2O_3$, wt % | — | 1.0 | 1.0 | — | 1.0 | — | — |
| Total carbon content of semi-finished catalyst, wt % | 0.4 | 0.05 | 0.12 | 0.05 | 0.01 | 0.45 | 0.5 |

TABLE II-2

|  | Comp. Ex. II-1 | Comp. Ex. II-2 | Comp. Ex. II-3 |
|---|---|---|---|
| $MoO_3$, wt % | 20.6 | 20.3 | 20.2 |
| CoO, wt % | — | 4.1 | 4.0 |
| NiO, wt % | 4.3 | — | — |
| $WO_3$, wt % | — | — | — |
| ZnO, wt % | — | 2.35 | 2.3 |
| MgO, wt % | 3.1 | — | — |
| $La_2O_3$, wt % | — | — | — |
| Total carbon content of semi-finished catalyst, wt % | 0.4 | — | — |

Test Example II-1

In this test example, the desulfurization activity and the denitrification activity of the hydrogenation catalyst produced by the process of the present application and the hydrogenation catalyst provided in the comparative examples were evaluated by the following method, and the evaluation results are shown in Table II-4 below.

The Middle East blended diesel (85% straight-run diesel+ 15% catalytic cracked diesel) was used as the raw material, and its properties are as follows:

| S content | 12000 μg/g |
|---|---|
| N content | 220 μg/g |
| Density (20° C.) | 0.8588 g/cm$^3$ |
| Refractive index (20° C.) | 1.4841 |

The desulfurization and denitrification activities of the catalyst were evaluated on a 30 ml diesel hydrogenation unit. The catalyst was pre-sulfurized before the reaction, and 30 mL of catalyst was loaded. The pre-sulfurization conditions were: 6.4 MPa, 320° C., 4 h, a hydrogen-to-oil volume ratio of 300:1, and a feed rate of sulfurized oil of 8 mL/h. The reaction conditions were as follows: a hydrogen partial pressure of 6.4 MPa, a reaction temperature of 350° C., a hydrogen-to-oil volume ratio of 300, and a liquid hourly space velocity of 1.5 h$^{-1}$. Samples were collected after 4 hours and 500 hours of reaction, respectively, and the sulfur and nitrogen contents of the raw material used in the hydrodesulfurization, hydrodenitrogenation reaction, and the product obtained were determined by gas chromatography.

The hydrodesulfurization activity of the catalyst was evaluated relative to the reference agent D (i.e. the catalyst produced in Comparative Example II-2), and the hydrodesulfurization reaction was treated as a 1.65-order reaction. The reaction rate constant $k(X)_{HDS}$ of the Catalyst X was calculated according to equation (1):

$$k(X)_{HDS} = LHSV \times \left( \frac{1}{\left( \text{Sulfer content of the raw material} \right)^{0.65}} - \frac{1}{\left( \text{Sulfer content of the product} \right)^{0.65}} \right). \quad (1)$$

The LHSV in the equation (1) refers to the liquid hourly space velocity of the hydrocarbon oil employed during the hydrorefining reaction.

The relative hydrodesulfurization activity of the Catalyst X was calculated according to equation (2) using the hydrodesulfurization activity of the catalyst D2 [denoted as $k(D2)_{HDS}$] produced in Comparative Example II-2 as the basis reference:

$$\text{Relative hydrodesulfurization activity } (X) = \left( \frac{k(X)_{HDS}}{k(D2)_{HDS}} \right) \times 100\%. \quad (2)$$

The hydrodenitrogenation activity of the catalyst was evaluated relative to the reference agent D (i.e. the catalyst produced in Comparative Example II-2), and the hydrodenitrogenation reaction was treated as a first-order reaction. The reaction rate constant $k(X)_{HDN}$ of the Catalyst X was calculated according to equation (3):

$$k(X)_{HDN} = LHSV \times \text{Ln}\left(\frac{\text{Nitrogen content of the raw material}}{\text{Nitrogen content of the product}}\right) \quad (3)$$

The LHSV in the equation (3) refers to the liquid hourly space velocity of the hydrocarbon oil employed during the hydrorefining reaction.

The relative hydrodenitrogenation activity of the Catalyst X was calculated according to equation (4) using the hydrodenitrogenation activity of the catalyst D2 [denoted as $k(D2)_{HDN}$] produced in Comparative Example II-2 as the basis reference:

$$\text{Relative hydrodenitrogenation activity }(X) = \left(\frac{k(X)_{HDN}}{k(D2)_{HDN}}\right) \times 100\%. \quad (4)$$

The hydrorefining evaluation results of the hydrogenation catalysts produced in the respective examples and comparative examples are shown in Table II-3.

TABLE II-3

| Examples | No. | Relative hydrodesulfurization activity, % | | Relative hydrodenitrogenation activity, % | |
|---|---|---|---|---|---|
| | | 4 hour of reaction | 500 hours of reaction | 4 hour of reaction | 500 hours of reaction |
| Ex. II-1 | S1 | 142 | — | 124 | — |
| Comp. Ex. II-1 | D1 | 104 | — | 101 | — |
| Ex. II-2 | S2 | 157 | 154 | 133 | 129 |
| Ex. II-3 | S3 | 153 | — | 129 | — |
| Ex. II-4 | S4 | 139 | 130 | 121 | 116 |
| Comp. Ex. II-2 | D2 | 100 | — | 100 | — |
| Comp. Ex. II-3 | D3 | 112 | 75 | 106 | 86 |
| Ex. II-5 | S5 | 110 | — | 108 | — |
| Ex. II-6 | S6 | 140 | — | 120 | — |
| Ex. II-7 | S7 | 133 | — | 112 | — |

Note:
"—" in Table II-3 indicates that no test has been performed.

The results of Tables II-1 to II-3 show that the catalyst provided by the present application exhibit significantly improved hydrodesulfurization activity and hydrodenitrogenation activity, as compared to the hydrogenation catalyst produced by the prior process. In addition, when comparing the data of the relative hydrodesulfurization activity and the relative hydrodenitrogenation activity determined after 4 hours and 500 hours of reaction shown in Table II-3, it can be seen that the decrease of the activity of the catalyst provided by the present application after a long time of reaction is very small, and is much less than the comparative example. Thus, the catalyst produced by the process of the present application shows a significantly extended service life. The above results fully demonstrate that the process provided by the present application possesses advantages that are unmatched by other existing process.

Example III-1

This example is provided to illustrate the hydrogenation catalyst and the process for producing the same according to the present application.

2000 g of aluminum hydroxide powder (dry rubber powder produced by the Catalyst Plant of Changling Refining & Chemical Co., Ltd., 71% by weight on dry basis) and 1039 g of silica sol (commercially available from Qingdao Ocean Chemical Plant, silica content: 30% by weight) were uniformly mixed. The resultant mixture was extruded into a butterfly strip having a circumscribed circle diameter of 1.4 mm by an extruder, and the extruded wet strip was dried at 120° C. for 4 hours, followed by calcination at 600° C. for 3 hours to obtain a carrier Z1. In the carrier Z1, the silica content was 18.0% by weight and the alumina content was 82.0% by weight.

54 g of molybdenum trioxide, 19 g of basic cobalt carbonate, 13 g of phosphoric acid, 30 g of citric acid were weighed into 140 g of deionized water, and heated while stirring until dissolved to obtain a clear impregnation solution. 200 g of Z1 carrier was impregnated with the above solution by a saturated impregnation method for 2 hours, dried at 120° C. for 2 hours, and then calcined under a flow of air at a calcination temperature of 400° C. for 2 hours, with a gas-to-reagent ratio of 1 L/(g·hr), to obtain a semi-finished catalyst Z-S1, of which the total carbon content is shown in Table III-1; 30 g of citric acid was added to 150 g of deionized water, and stirred to obtain a clear solution. Z-S1 was impregnated with the above solution by a saturated impregnation method for 2 hours, and dried at 150° C. for 3 hours to obtain a catalyst S1. The content of the metallic element having hydrogenation activity of the catalyst, on the basis of oxide, based on the total amount of S1 is shown in Table III-1.

Comparative Example III-1

A hydrogenation catalyst was produced in the same manner as in Example III-1 except that the hydrogenation catalyst S1 produced in Example III-1 was calcined at 400° C. for 3 hours to obtain a catalyst D1. In the catalyst D1, the content of the metallic element having hydrogenation activity of the catalyst, on the basis of oxide, based on the total amount of D1 is shown in Table III-2.

Example III-2

This example is provided to illustrate the hydrogenation catalyst and the process for producing the same according to the present application.

30 g of nickel nitrate, 45 g of ammonium metatungstate, 15 g of oxalic acid and 21 g of ammonium fluoride were weighed into 140 g of deionized water, and heated while stirring until dissolved to obtain a clear solution. 200 g of alumina carrier was impregnated with the above solution by a saturated impregnation method for 2 hours, dried at 120° C. for 2 hours, and then calcined under a flow of air at a calcination temperature of 360° C. for 6 hours, with a gas-to-reagent ratio of 10.0 L/(g·hr), to obtain a semi-finished catalyst Z-S2, of which the total carbon content is shown in Table III-1; 10 g of diethylene glycol was added to 150 g of deionized water, and stirred to obtain a clear solution. Z-S2 was impregnated with the above solution by a saturated impregnation method for 2 hours, and then dried at 150° C. for 3 hours to obtain a catalyst S2. The content of the metallic element having hydrogenation activity of the catalyst, on the basis of oxide, based on the total amount of S2 is shown in Table III-1.

Comparative Example III-2

30 g of nickel nitrate, 45 g of ammonium metatungstate, 15 g of oxalic acid and 21 g of ammonium fluoride were weighed into 140 g of deionized water, and heated while stirring until dissolved to obtain a clear solution. 200 g of alumina carrier was impregnated with the above solution by a saturated impregnation method for 2 hours, dried at 120° C. for 2 hours, and then calcined under a flow of air at a calcination temperature of 350° C. for 6 hours, with a gas-to-reagent ratio of 10.0 L/(g·hr), to obtain a catalyst D2. The content of the metallic element having hydrogenation activity of the catalyst, on the basis of oxide, based on the total amount of D2 is shown in Table III-2.

Comparative Example III-3

30 g of nickel nitrate, 45 g of ammonium metatungstate, 15 g of oxalic acid, 10 g of diethylene glycol and 21 g of ammonium fluoride were weighed into 140 g of deionized water, and heated while stirring until dissolved to obtain a clear solution. 200 g of alumina carrier was impregnated with the above solution by a saturated impregnation method for 2 hours, and dried at 120° C. for 2 hours to obtain a catalyst D3. The content of the metallic element having hydrogenation activity of the catalyst, on the basis of oxide, based on the total amount of D3 is shown in Table III-2.

Example III-3

This example is provided to illustrate the hydrogenation catalyst and the process for producing the same according to the present application.

60 g of ammonium fluoride was weighed, and heated, after an addition of deionized water, while stirring until dissolved, followed by addition of deionized water to 850 ml. 1000 g of zirconia carrier was impregnated with the resultant solution by a saturated impregnation method for 2 hours, then dried at 120° C. for 2 hours, and calcined at 400° C. for 4 hours to obtain a fluorine-containing zirconia Z3.

83 g of nickel nitrate, 60 g of ammonium metatungstate, 10 g of ammonium molybdate, 20 g of ammonium dihydrogen phosphate and 20 g of citric acid were weighed into 180 g of deionized water, and heated while stirring until dissolved to obtain a clear solution. 200 g of the fluorine-containing zirconia Z3 was impregnated with the above solution by a saturated impregnation method for 2 hours, dried at 120° C. for 2 hours, and then calcined under a flow of air at a calcination temperature of 450° C. for 3 hours, with a gas-to-reagent ratio of 0.3 L/(g·hr) to obtain a semi-finished catalyst Z-S3, of which the total carbon content of Z-S3 is shown in Table III-1; 15 g of ethylenediamine was added to 150 g of deionized water and stirred to obtain a clear solution. Z-S3 was impregnated with the above solution by a saturated impregnation method for 2 hours, and then dried at 120° C. for 3 hours to obtain a catalyst S3. The content of the metallic element having hydrogenation activity of the catalyst, on the basis of oxide, based on the total amount of S3 is shown in Table III-1.

Example III-4

A hydrogenation catalyst was produced in the same manner as in Example III-1 except that, after the metal active component was impregnated into the carrier, the resultant was calcined at a temperature of 480° C. for 6 hours. The total carbon content of the semi-finished catalyst obtained is shown in Table III-1. In the resultant catalyst S4, the content of the metallic element having hydrogenation activity of the catalyst, on the basis of oxide, based on the total amount of S4 is shown in Table III-1.

Example III-5

A hydrogenation catalyst was produced in the same manner as in Example III-2 except that the gas-to-reagent ratio used during the calcination was 1.0 L/(g·hr). In the resultant catalyst S5, the content of the metallic element having hydrogenation activity of the catalyst, on the basis of oxide, based on the total amount of S5 is shown in Table III-1.

Example III-6

A hydrogenation catalyst was produced in the same manner as in Example III-1 except that the ratio of the first organic complexing agent to the second organic complexing agent used was changed from 30 g: 30 g to 50 g: 10 g. In the catalyst S6, the content of the metallic element having hydrogenation activity, on the basis of oxide, based on the total amount of S6 is shown in Table III-1.

TABLE III-1

|  | Ex. III-1 | Ex. III-2 | Ex. III-3 | Ex. III-4 | Ex. III-5 | Ex. III-6 |
| --- | --- | --- | --- | --- | --- | --- |
| $MoO_3$, wt % | 20.2 | — | 3.2 | 20.0 | — | 20.1 |
| CoO, wt % | 4.0 | — | — | 4.1 | — | 3.9 |
| NiO, wt % | — | 3.1 | 7.9 | — | 3.0 | — |
| $WO_3$, wt % | — | 15.2 | 21.0 | — | 15.5 | — |
| F, wt % | — | 3.3 | 1.2 | — | 3.1 | — |
| Si, wt % | 5.8 | — | — | 5.9 | — | 6.1 |
| Total carbon content of semi-finished catalyst, wt % | 0.04 | 0.4 | 0.1 | 0.03 | 0.45 | 0.5 |

TABLE III-2

|  | Comp. Ex. III-1 | Comp. Ex. III-2 | Comp. Ex. III-3 |
| --- | --- | --- | --- |
| $MoO_3$, wt % | 20.5 | — | — |
| CoO, wt % | 4.7 | — | — |
| NiO, wt % | — | 3.5 | 3.3 |
| $WO_3$, wt % | — | 15.9 | 15.8 |
| F, wt % | — | 3.6 | 3.4 |
| Si, wt % | 6.2 | — | — |
| Total carbon content of semi-finished catalyst, wt % | 0.04 | — | — |

Test Example III-1

In this test example, the desulfurization activity and the denitrification activity of the hydrogenation catalyst produced by the process of the present application and the hydrogenation catalyst provided in the comparative examples were evaluated by the following method, and the evaluation results are shown in Table III-3 below.

The Middle East blended diesel (85% straight-run diesel+ 15% catalytic cracked diesel) was used as the raw material, and its properties are as follows:

| S content | 12000 μg/g |
| N content | 220 μg/g |

-continued

| Density (20° C.) | 0.8588 g/cm³ |
| Refractive index (20° C.) | 1.4841 |

The desulfurization and denitrification activities of the catalyst were evaluated on a 30 ml diesel hydrogenation unit. The catalyst was pre-sulfurized before the reaction, and 30 mL of catalyst was loaded. The pre-sulfurization conditions were: 6.4 MPa, 320° C., 4 h, a hydrogen-to-oil volume ratio of 300:1, and a feed rate of sulfurized oil of 8 mL/h. The reaction conditions were as follows: a hydrogen partial pressure of 6.4 MPa, a reaction temperature of 350° C., a hydrogen-to-oil volume ratio of 300, and a liquid hourly space velocity of 1.5 h$^{-1}$. Samples were collected after 4 hours and 500 hours of reaction, respectively, and the sulfur and nitrogen contents of the raw material used in the hydrodesulfurization, hydrodenitrogenation reaction, and the product obtained were determined by gas chromatography.

The hydrodesulfurization activity of the catalyst was evaluated relative to the reference agent D (i.e. the catalyst produced in Comparative Example III-2), and the hydrodesulfurization reaction was treated as a 1.65-order reaction. The reaction rate constant $k(X)_{HDS}$ of the Catalyst X was calculated according to equation (1):

$$k(X)_{HDS} = LHSV \times \left( \frac{1}{\left(\text{Sulfer content of the raw material}\right)^{0.65}} - \frac{1}{\left(\text{Sulfer content of the product}\right)^{0.65}} \right). \quad (1)$$

The LHSV in the equation (1) refers to the liquid hourly space velocity of the hydrocarbon oil employed during the hydrorefining reaction.

The relative hydrodesulfurization activity of the Catalyst X was calculated according to equation (2) using the hydrodesulfurization activity of the catalyst D2 [denoted as $k(D2)_{HDS}$] produced in Comparative Example III-2 as the basis reference:

$$\text{Relative hydrodesulfurization activity } (X) = \left( \frac{k(X)_{HDS}}{k(D2)_{HDS}} \right) \times 100\%. \quad (2)$$

The hydrodenitrogenation activity of the catalyst was evaluated relative to the reference agent D (i.e. the catalyst produced in Comparative Example III-2), and the hydrodenitrogenation reaction was treated as a first-order reaction. The reaction rate constant $k(X)_{HDN}$ of the Catalyst X was calculated according to equation (3):

$$k(X)_{HDN} = LHSV \times Ln\left( \frac{\text{Nitrogen content of the raw material}}{\text{Nitrogen content of the product}} \right). \quad (3)$$

The LHSV in the equation (3) refers to the liquid hourly space velocity of the hydrocarbon oil employed during the hydrorefining reaction.

The relative hydrodenitrogenation activity of the Catalyst X was calculated according to equation (4) using the hydrodenitrogenation activity of the catalyst D2 [denoted as $k(D2)_{HDN}$] produced in Comparative Example III-2 as the basis reference:

$$\text{Relative hydrodenitrogenation activity } (X) = \left( \frac{k(X)_{HDN}}{k(D2)_{HDN}} \right) \times 100\%. \quad (4)$$

The hydrorefining evaluation results of the hydrogenation catalysts produced in the respective examples and comparative examples are shown in Table III-3.

TABLE III-3

| | | Relative hydrodesulfurization activity, % | | Relative hydrodenitrogenation activity, % | |
|---|---|---|---|---|---|
| Examples | No. | 4 hour of reaction | 500 hours of reaction | 4 hour of reaction | 500 hours of reaction |
| Ex. III-1 | S1 | 135 | — | 126 | — |
| Comp. Ex. III-1 | D1 | 92 | — | 89 | — |
| Ex. III-2 | S2 | 141 | 134 | 131 | 125 |
| Comp. Ex. III-2 | D2 | 100 | — | 100 | — |
| Comp. Ex. III-3 | D3 | 109 | 74 | 110 | 89 |
| Ex. III-3 | S3 | 137 | — | 128 | — |
| Ex. III-4 | S4 | 118 | — | 105 | — |
| Ex. III-5 | S5 | 139 | — | 128 | — |
| Ex. III-6 | S6 | 130 | — | 123 | — |

Note:
"—" in Table III-3 indicates that no test has been performed.

The results of Tables III-1 to III-3 show that the catalyst provided by the present application exhibit significantly improved hydrodesulfurization activity and hydrodenitrogenation activity, as compared to the hydrogenation catalyst produced by the prior process. In addition, when comparing the data of the relative hydrodesulfurization activity and the relative hydrodenitrogenation activity determined after 4 hours and 500 hours of reaction shown in Table III-3, it can be seen that the decrease of the activity of the catalyst provided by the present application after a long time of reaction is very small, and is much less than the comparative example. Thus, the catalyst produced by the process of the present application shows a significantly extended service life. The above results fully demonstrate that the process provided by the present application possesses advantages that are unmatched by other existing process.

Examples IV-1 to IV-7 are used to illustrate the hydrogenation catalyst I and the process for producing the same according to the present application, and Comparative Example IV-1 is used to illustrate a comparative catalyst and a process for producing the same.

Example IV-1

54 g of molybdenum trioxide, 21 g of basic nickel carbonate, 13 g of phosphoric acid, 30 g of citric acid were weighed into 140 g of deionized water, and heated while stirring until dissolved to obtain a clear impregnation solution. 200 g of alumina carrier was impregnated with the above solution by a saturated impregnation method for 2 hours, dried at 120° C. for 2 hours, and then calcined under a flow of air at a calcination temperature of 360° C. for 6 hours, with a gas-to-carrier ratio of 2 L/(g·hr), to obtain a catalyst precursor I-Z-S1, of which the total carbon content is shown in Table IV-1; 5 g of ethanol was added to 150 g of deionized water, and stirred to obtain a clear solution. I-Z-S1 was impregnated with the above solution by a saturated impregnation method for 2 hours, and then dried at 110° C. for 3 hours to obtain a catalyst I-1. The content of the metallic element having hydrogenation activity, on the basis of oxide, based on the total weight of the catalyst I-1 is shown in Table IV-1.

Comparative Example IV-1

A hydrogenation catalyst was produced in the same manner as in Example IV-1 except that the hydrogenation catalyst I-1 produced in Example IV-1 was calcined at 400° C. for 3 hours to obtain a catalyst D1. The content of the metallic element having hydrogenation activity, on the basis of oxide, based on the total weight of the catalyst D1 is shown in Table IV-1.

Example IV-2

54 g of molybdenum trioxide, 21 g of basic nickel carbonate, 13 g of phosphoric acid, 30 g of citric acid were weighed into 140 g of deionized water, and heated while stirring until dissolved to obtain a clear impregnation solution. 200 g of zirconia carrier was impregnated with the above solution by a saturated impregnation method for 2 hours, dried at 150° C. for 2 hours, and then calcined under a flow of air at a calcination temperature of 360° C. for 3 hours, with a gas-to-carrier ratio of 10 L/(g·hr), to obtain a catalyst precursor I-Z-S2, of which the total carbon content is shown in Table IV-1; 30 g of citric acid was added to 150 g of deionized water, and stirred to obtain a clear solution. I-Z-S2 was impregnated with the above solution by a saturated impregnation method for 2 hours, and then dried at 150° C. for 3 hours to obtain a catalyst I-2. The content of the metallic element having hydrogenation activity of the catalyst, on the basis of oxide, based on the total amount of I-2 is shown in Table IV-1.

Example IV-3

30 g of nickel nitrate, 45 g of ammonium metatungstate and 15 g of oxalic acid were weighed into 140 g of deionized water, and heated while stirring until dissolved to obtain a clear solution. 200 g of silica carrier was impregnated with the above solution by a saturated impregnation method for 2 hours, dried at 120° C. for 2 hours, and then calcined under a flow of air at a calcination temperature of 450° C. for 4 hours, with a gas-to-carrier ratio of 0.3 L/(g·hr) to obtain a catalyst precursor I-Z-S3, of which the total carbon content is shown in Table IV-1; 10 g of diethylene glycol was added to 150 g of deionized water, and stirred to obtain a clear solution. I-Z-S3 was impregnated with the above solution by a saturated impregnation method for 2 hours, and dried at 120° C. for 6 hours to obtain a catalyst I-3. The content of the metallic element having hydrogenation activity of the catalyst, on the basis of oxide, based on the total amount of I-3 is shown in Table IV-1.

Example IV-4

83 g of nickel nitrate, 60 g of ammonium metatungstate, 10 g of ammonium molybdate, 20 g of ammonium dihydrogen phosphate and 20 g of citric acid were weighed into 140 g of deionized water, and heated while stirring until dissolved to obtain a clear solution. 200 g of alumina-silica carrier (at a weight ratio of 1:1) was impregnated with the above solution by a saturated impregnation method for 2 hours, dried at 120° C. for 2 hours, and then calcinated under a flow of air at a calcination temperature of 450° C. for 3 hours, with a gas-to-carrier ratio of 0.8 L/(g·hr), to obtain a catalyst precursor I-Z-S4, of which the total carbon content is shown in Table IV-1; 15 g of ethylenediamine was added to 150 g of deionized water, and stirred to obtain a clear solution. I-Z-S4 was impregnated with the above solution by a saturated impregnation method for 2 hours, and then dried at 120° C. for 3 hours to obtain a catalyst I-4. The content of the metallic element having hydrogenation activity of the catalyst, on the basis of oxide, based on the total amount of I-4 is shown in Table IV-1.

Example IV-5

A hydrogenation catalyst was produced in the same manner as in Example IV-3 except that, after the metal active component was impregnated into the carrier, the resultant was calcined at a temperature of 480° C. for 6 hours. The total carbon content of the resultant catalyst precursor is shown in Table IV-1. In the resultant catalyst I-5, the content of the metallic element having hydrogenation activity of the catalyst, on the basis of oxide, based on the total amount of I-5 is shown in Table IV-1.

Example IV-6

A hydrogenation catalyst was produced in the same manner as in Example IV-2 except that the gas-to-carrier ratio used during calcination was 1.0 L/(g·hr). In the resultant catalyst I-6, the content of the metallic element having hydrogenation activity, on the basis of oxide, based on the total amount of I-6 is shown in Table IV-1.

Example IV-7

A hydrogenation catalyst was produced in the same manner as in Example IV-2 except that the ratio of the first organic complexing agent to the second organic complexing agent used was changed from 30 g: 30 g to 50 g: 10 g. In the catalyst I-7, the content of the metallic element having hydrogenation activity of the catalyst, on the basis of oxide, based on the total amount of I-7 is shown in Table IV-1.

TABLE IV-1

| Examples | Total carbon content of the catalyst precursor, wt % | $MoO_3$, wt % | CoO, wt % | NiO, wt % | $WO_3$, wt % | P content, wt % |
|---|---|---|---|---|---|---|
| Comp. Ex. IV-1 | 0.04 | 21.4 | 4.3 | — | — | 2.9 |
| Ex. IV-1 | 0.04 | 20.0 | 3.9 | — | — | 2.8 |
| Ex. IV-2 | 0.4 | 20.1 | — | 3.9 | — | 3.0 |
| Ex. IV-3 | 0.1 | — | — | 3.3 | 15.1 | — |
| Ex. IV-4 | 0.08 | 3.2 | — | 7.6 | 20.3 | 4.9 |
| Ex. IV-5 | 0.03 | — | — | 3.2 | 15.3 | — |
| Ex. IV-6 | 0.45 | 20.0 | — | 3.7 | — | 2.8 |
| Ex. IV-7 | 0.5 | 20.3 | — | 3.8 | — | 2.9 |

Examples IV-8 to IV-11 illustrate the process for producing the hydrogenation catalyst II.

Example IV-8

The hydrogenation catalyst II-1 was produced as follows:

A certain amount of microporous alumina precursor (a first hydrated alumina, industrial product obtained by sodium metaaluminate-carbon dioxide method, product name dry boehmite, produced by Shandong Aluminum Factory, containing 80% by weight of boehmite and 5% by weight of gibbsite) was weighed. A certain amount of macroporous alumina precursor (a second hydrated alumina, industrial product obtained by sodium metaaluminate-aluminum sulfate method, product name Changling dry rubber powder, produced by the Catalyst Plant of Changling Refinery, containing 68% by weight of boehmite and 5% by weight of gibbsite) was also weighed. The two kinds of hydrated alumina were uniformly mixed at a dry weight ratio of 75:25, and an extrusion assistant, an adhesive and water were added, and then extruded into a trilobal strip having a circumscribed circle diameter of 1.4 mm, dried at 120° C., and calcined at 550-650° C., respectively, for 4 hours, to produce hydrogenation catalyst carriers. A certain amount of the alumina carriers were respectively weighed, impregnated with an ammonium fluoride (chemically pure) aqueous solution for 1 hour, dried at 120° C., and calcined at 530° C. for 4 hours to obtain fluorine-containing alumina carriers. The fluorine-containing alumina carriers were impregnated with a mixed aqueous solution of quantitative ammonium metatungstate (chemically pure) and nickel nitrate (chemically pure) for 4 hours, dried at 120° C., and calcined at 530° C. for 4 hours to obtain a hydrogenation catalyst II-1, which comprises 4% by weight of nickel (on the basis of NiO), 30% by weight of tungsten (on the basis of tungsten oxide), 4% by weight of fluorine (on the basis of elemental fluorine), with the balance being alumina.

Example IV-9

The hydrogenation catalyst II-2 was produced as follows:

27.2 g of molybdenum trioxide, 9.1 g of basic cobalt carbonate, 5.5 g of phosphoric acid, and 7.6 g of citric acid were separately weighed into 55 mL of deionized water, heated to 80° C. while stirring to dissolve, producing a brown-red clear solution after about 1 hour. The solution was added to a beaker, heated to 90° C. and kept under stirring for 8 hours, and water was added to 85 mL to obtain a clear impregnation solution. 2000 g of aluminum hydroxide powder (dry rubber powder produced by the Catalyst Plant of Changling Refining & Chemical Co., Ltd., 71% by weight on dry basis) and 1039 g of silica sol (product of Qingdao Ocean Chemical Plant, silica content: 30% by weight) were uniformly mixed. The resultant mixture was extruded into a butterfly strip having a circumscribed circle diameter of 1.4 mm by an extruder, and the extruded wet strip was dried at 120° C. for 4 hours, followed by calcination at 600° C. for 3 hours to obtain a carrier comprising 18.0% by weight of silica and 82.0% by weight of alumina. The water absorption of the carrier was 0.85. 100 g of the carrier was impregnated with 85 mL of the clear impregnation solution by a saturated impregnation method for 2 hours, dried at 120° C. for 2 hours, and further dried at 250° C. for 3 hours to obtain a hydrogenation catalyst II-2 containing 3.9% by weight of Co (on the basis of CoO), 20.1% by weight of molybdenum (on the basis of $MoO_3$), 2.1% by weight of phosphorus (on the basis of $P_2O_5$), 5.6% of citric acid, with the balance being alumina.

Example IV-10

The hydrogenation catalyst II-3 was produced as follows:

A high-concentration $NaAlO_2$ solution containing 210 g of alumina/liter and having a causticity coefficient of 1.62 was mixed with deionized water to prepare 5 liters of solution having an $Al_2O_3$ concentration of 40 g/L, and then 16.3 g of sodium gluconate was added to obtain a $NaAlO_2$ solution containing sodium gluconate. The solution was then transferred to a gelation reactor having a total volume of 8 L and a height-diameter ratio of 8, equipped with a $CO_2$ gas distributor at the lower portion. The temperature of the solution was controlled at 25±5° C., and a $CO_2$ gas having a concentration of 90% by volume was introduced from the bottom of the reactor to conduct a gelation reaction. The gelation temperature was controlled at 20-40° C., and the flow rate of the $CO_2$ gas was adjusted to 15±2 L/min. The pH arrived at 8.0-8.5 within 4-6 minutes at the end of reaction, and at this time, the aeration was stopped, and the gelation reaction was terminated. The resulting slurry was heated to 70° C. and aged for 4 hours, and then filtered using a vacuum filter. After filtration, the filter cake was rinsed with 20 liters of deionized water (at 70° C.) for about 30 minutes. The washed filter cake was added to 1.5 liters of deionized water and stirred to form a slurry. The slurry was pumped into a spray dryer and dried to obtain hydrated alumina P1-2. 300 g of pseudo-boehmite P1-2 and 700 g of pseudo-boehmite P2-3 (commercial pseudo-boehmite SD powder produced by Shandong Aluminum Co., Ltd.) were mixed and extruded by an extruder into a clover strip having a circumscribed circle diameter of 1.6 mm, and dried at 120° C. for 8 hours. 300 g of the resultant was taken and calcined at 800° C. for 4 hours under a flow of air to obtain a carrier, with the air flow rate being 1.5 normal cubic meters/kg·hr. 100 g of the carrier was weighed and impregnated with 85 ml of an aqueous solution containing 20.6 g of nickel nitrate, 34.8 g of ammonium paramolybdate and 11.4 g of phosphoric acid for 1.5 hours, dried at 120° C. for 5 hours, treated at 380° C. for 4 hours, and then impregnated with 55 ml of an aqueous solution containing 8.4 g of glycerol for 2 hours, and dried at 140° C. for 5 hours to obtain a hydrogenation catalyst II-3 containing 3.5% by weight of nickel (on the basis of NiO), 19.1% by weight of molybdenum (on the basis of $MoO_3$), 4.8% by weight of phosphorus (on the basis of $P_2O_5$), 5.7% of an organic additive, with the balance being alumina.

Example IV-11

The hydrogenation catalyst II-4 was produced as follows:

2000 g of aluminum hydroxide powder (dry rubber powder produced by the Catalyst Plant of Changling Branch, 70% by weight on dry basis) and 299 g of silica sol containing 25% of silica (Qingdao Ocean Chemical Plant) were weighed, and extruded into a butterfly strip having a circumscribed circle diameter of 1.3 mm, and the wet strip was dried at 120° C. for 4 hours and calcined at 600° C. for 3 hours to obtain a carrier comprising 5.0% by weight of silica. 200 g of the carrier was weighed, and the carrier was impregnated with 176 ml of an aqueous solution containing 16.9 g of ammonium fluoride for 2 hours, dried at 120° C. for 3 hours, and calcined at 420° C. for 3 hours to obtain a fluorine-containing silica-alumina carrier. The carrier was impregnated with 170 ml of an aqueous solution containing 23.0 g of ammonium paramolybdate for 3 hours, dried at 120° C. for 4 hours, and further dried at 170° C. for 4 hours to obtain a molybdenum-containing carrier. Then, the carrier was impregnated with 162 ml of an aqueous solution containing 53.2 g of nickel nitrate, 140.7 g of ammonium metatungstate and 18.1 g of phosphoric acid for 3 hours, dried at 200° C. for 4 hours, and then impregnated with 121 ml of an aqueous solution containing 77.3 g of ethylene glycol, and dried at 120° C. for 6 hours, to obtain a hydrogenation catalyst II-4 containing 3.6% by weight of nickel (on the basis of NiO), 5.0% by weight of molybdenum (on the basis of $MoO_3$), and 32.5% by weight of tungsten (on the basis of tungsten oxide), 2.2% by weight of fluorine (on the basis of elemental fluorine), 3.0% by weight of phosphorus (on the basis of $P_2O_5$), 5.0% by weight of ethylene glycol, with the balance being alumina-silica.

Example IV-12 to Example IV-18

In the Examples IV-12 to IV-18, the desulfurization activity and the denitrification activity of the hydrogenation catalyst produced by the process according to the present application and the hydrogenation catalyst provided in the comparative examples were subjected to hydrorefining evaluation according to the following method. The calculation was carried out according to the calculation method for the hydrorefining evaluation results, and the results are shown in Table IV-2 below.

The Middle East straight-run diesel fraction blended with 15% of catalytic diesel was used as the raw material, and its properties are shown in Table IV-3. The desulfurization and denitrification activities of the catalyst were evaluated on a 30 ml diesel hydrogenation unit. The catalyst was pre-sulfurized before the reaction, and 30 mL of the catalyst was loaded. The inlet for feedstock oil was located on the top of the hydrogenation unit, the hydrogenation catalyst II was loaded in the upper bed of the reactor, and the hydrogenation catalyst I (or D1) was loaded in the lower bed of the hydrogenation reactor, i.e. downstream of the hydrogenation catalyst II. The pre-sulfurization conditions were: 6.4 MPa, 320° C., 4 h, a hydrogen-to-oil volume ratio of 300, and a sulfurized oil feed rate of 8 mL/h. The reaction conditions were as follows: a hydrogen partial pressure of 6.4 MPa, a reaction temperature of 350° C., a hydrogen-to-oil volume ratio of 300, and a liquid hourly space velocity of 1.5 $h^{-1}$. Samples were collected after 4 hours and 500 hours of reaction, respectively, and the sulfur and nitrogen contents of the raw materials and the resultant products were determined by gas chromatography.

Comparative Example IV-2 to Comparative Example IV-4

The catalyst D1, the catalyst combination D1+II-1 and the catalyst II-1 were subjected to hydrorefining evaluation according to the process as described in Example IV-12 to Example IV-18, and the results were calculated according to the calculation method for the hydrorefining evaluation results, and the results are shown in Table IV-2 below.

Calculation Method for the Hydrorefining Evaluation Results:

The hydrodesulfurization activity of the catalyst was evaluated relative to the reference agent D1 (i.e. the catalyst produced in Comparative Example IV-1), and the hydrodesulfurization reaction was treated as a 1.65-order reaction. The reaction rate constant $k(X)_{HDS}$ of the Catalyst X was calculated according to equation (1):

$$k(X)_{HDS} = LHSV \times \left( \frac{1}{\left(\text{Sulfur content of the raw material}\right)^{0.65}} - \frac{1}{\left(\text{Sulfur content of the product}\right)^{0.65}} \right). \quad (1)$$

The LHSV in the equation (1) refers to the liquid hourly space velocity of the hydrocarbon oil employed during the hydrorefining reaction.

The relative hydrodesulfurization activity of the Catalyst X was calculated according to equation (2) using the hydrodesulfurization activity of the catalyst D1 [denoted as $k(D1)_{HDS}$] produced in Comparative Example IV-1 as the basis reference:

$$\text{Relative hydrodesulfurization activity}(X) = \left(\frac{k(X)_{HDS}}{k(D1)_{HDS}}\right) \times 100\%. \quad (2)$$

The hydrodenitrogenation activity of the catalyst was evaluated relative to the reference agent D1 (i.e. the catalyst produced in Comparative Example IV-1), and the hydrodenitrogenation reaction was treated as a first-order reaction. The reaction rate constant $k(X)_{HDN}$ of the Catalyst X was calculated according to equation (3):

$$k(X)_{HDN} = LHSV \times \ln\left(\frac{\text{Nitrogen content of the raw material}}{\text{Nitrogen content of the product}}\right). \quad (3)$$

The LHSV in the equation (3) refers to the liquid hourly space velocity of the hydrocarbon oil employed during the hydrorefining reaction.

The relative hydrodenitrogenation activity of the Catalyst X was calculated according to equation (4) using the hydrodenitrogenation activity of the catalyst D1 [denoted as $k(D1)_{HDN}$] produced in Comparative Example IV-1 as the basis reference:

$$\text{Relative hydrodenitrogenation activity}(X) = \left(\frac{k(X)_{HDN}}{k(D1)_{HDN}}\right) \times 100\%. \quad (4)$$

The results of Table IV-2 indicate that the hydrogenation catalyst composition according to the present application shows better relative hydrodesulfurization activity and relative hydrodenitrogenation activity, the decrease rate per unit time of the relative activity is small, and the service life is longer.

TABLE IV-2

| Examples | Catalyst composition | Proportion of Catalyst I/vol % | Relative hydrodesulfurization activity, % | | Relative hydrodenitrogenation activity, % | |
|---|---|---|---|---|---|---|
| | | | 4 hour of reaction | 500 hours of reaction | 4 hour of reaction | 500 hours of reaction |
| Comp. Ex. IV-2 | D1 | | 100 | 76 | 100 | 85 |
| Comp. Ex. IV-3 | D1 + II-1 | 20(D1) | 106 | 81 | 107 | 89 |
| Comp. Ex. IV-4 | II-1 | | 104 | — | 109 | — |
| Ex. IV-12 | I-1 + II-1 | 20 | 130 | 124 | 120 | 114 |
| Ex. IV-13 | I-2 + II-2 | 30 | 134 | — | 118 | — |
| Ex. IV-14 | I-3 + II-2 | 40 | 138 | 131 | 125 | 120 |
| Ex. IV-15 | I-4 + II-3 | 50 | 143 | — | 124 | — |
| Ex. IV-16 | I-5 + II-3 | 60 | 127 | — | 110 | — |
| Ex. IV-17 | I-6 + II-4 | 70 | 131 | — | 120 | — |
| Ex. IV-18 | I-7 + II-4 | 80 | 129 | — | 113 | — |

Note:
"—" in Table IV-2 indicates that no detection has been performed.

TABLE IV-3

| S content | 12000 µg/g |
|---|---|
| N content | 220 µg/g |
| Density (20° C.) | 0.8588 g/cm$^3$ |
| Refractive index (20° C.) | 1.4841 |

Example V-1

This example is provided to illustrate the hydrogenation catalyst I and the process for producing the same according to the present application.

270 g of magnesium nitrate was weighed, and heated, after an addition of deionized water, while stirring until dissolved, followed by addition of deionized water to 850 ml. 1000 g of alumina carrier was impregnated with the resultant solution by a saturated impregnation method for 2 hours, then dried at 120° C. for 2 hours, and calcined at 400° C. for 4 hours to obtain a magnesium-containing alumina I-Z1 having a water absorption of 0.85.

54 g of molybdenum trioxide, 21 g of basic nickel carbonate, 13 g of phosphoric acid, 30 g of citric acid were weighed into 140 g of deionized water, and heated while stirring until dissolved to obtain a clear impregnation solution. 200 g of the magnesium-containing alumina I-Z1 carrier was impregnated with the above solution by a saturated impregnation method for 2 hours, dried at 120° C. for 2 hours, and then calcined under a flow of air at a calcination temperature of 360° C. for 6 hours, with a gas-to-carrier ratio of 10.0 L/(g·hr), to obtain a semi-finished catalyst I-Z-S1, of which the total carbon content is shown in Table V-1; 30 g of citric acid was added to 150 g of deionized water, and stirred to obtain a clear solution. I-Z-S1 was impregnated with the above solution by a saturated impregnation method for 2 hours, and then dried at 200° C. for 2 hours to obtain a catalyst I-1. The content of the metallic element having hydrogenation activity and the metallic element of the coagent, on the basis of oxide, based on the total weight of the catalyst I-1 is shown in Table V-1.

Comparative Example V-1

A hydrogenation catalyst was produced in the same manner as in Example V-1 except that the hydrogenation catalyst I-1 produced in Example V-1 was calcined at 400° C. for 3 hours to obtain a catalyst D1. The content of the metallic element having hydrogenation activity and the metallic element of the coagent, on the basis of oxide, based on the total weight of the catalyst D1 is shown in Table V-1.

Example V-2

This example is provided to illustrate the hydrogenation catalyst and the process for producing the same according to the present application.

37 g of lanthanum nitrate was weighed, and heated, after an addition of deionized water, while stirring until dissolved, followed by addition of deionized water to 850 ml. 1000 g of alumina carrier was impregnated with the resultant solution by a saturated impregnation method for 2 hours, then dried at 100° C. for 2 hours, and calcined at 500° C. for 4 hours to obtain a lanthanum-containing alumina I-Z2 having a water absorption of 0.85.

30 g of nickel nitrate, 45 g of ammonium metatungstate, 15 g of oxalic acid were weighed into 140 g of deionized water, and heated while stirring until dissolved to obtain a clear solution. 200 g of the lanthanum-containing alumina I-Z2 carrier was impregnated with the above solution by a saturated impregnation method for 2 hours, dried at 120° C. for 2 hours, and then calcined under a flow of air at a calcination temperature of 400° C. for 2 hours, with a gas-to-carrier ratio of 1.0 L/(g·hour), to obtain a semi-finished catalyst I-Z-S2, of which the total carbon content is shown in Table V-1; 10 g of diethylene glycol was added to 150 g of deionized water, and stirred to obtain a clear solution. I-Z-S2 was impregnated with the above solution by a saturated impregnation method for 2 hours, and then dried at 150° C. for 3 hours to obtain a catalyst I-2. The content of the metallic element having hydrogenation activity and the metallic element of the coagent, on the basis of oxide, based on the total weight of the catalyst I-2 is shown in Table V-1.

Example V-3

This example is provided to illustrate the hydrogenation catalyst and the process for producing the same according to the present application.

37 g of lanthanum nitrate was weighed, and heated, after an addition of deionized water, while stirring until dissolved, followed by addition of deionized water to 850 ml. 1000 g of silica carrier was impregnated with the resultant solution by a saturated impregnation method for 2 hours, then dried at 100° C. for 2 hours, and calcined at 500° C. for 4 hours to obtain a lanthanum-containing silica I-Z3 having a water absorption of 0.85.

83 g of nickel nitrate, 60 g of ammonium metatungstate, 10 g of ammonium molybdate, 20 g of ammonium dihydrogen phosphate, 20 g of citric acid were weighed into 140 g of deionized water, and heated while stirring until dissolved to obtain a clear solution. 200 g of the lanthanum-containing silica I-Z3 carrier was impregnated with the above solution by a saturated impregnation method for 2 hours, dried at 180° C. for 2 hours, and then calcined under a flow of air at a calcination temperature of 430° C. for 3 hours, with a gas-to-carrier ratio of 0.3 L/(g·hr), to obtain a semi-finished catalyst I-Z-S3, of which the total carbon content is shown in Table V-1; 15 g of ethylenediamine was added to 150 g of deionized water and stirred to obtain a clear solution. I-Z-S3 was impregnated with the above solution by a saturated impregnation method for 1 hour, and then dried at 120° C. for 3 hours to obtain a catalyst I-3. The content of the metallic element having hydrogenation activity and the metallic element of the coagent, on the basis of oxide, based on the total weight of the catalyst I-3 is shown in Table V-1.

Example V-4

This example is provided to illustrate the hydrogenation catalyst and the process for producing the same according to the present application.

54 g of molybdenum trioxide, 19 g of basic cobalt carbonate, 20 g of phosphoric acid, 20 g of citric acid, 20 g of zinc nitrate were weighed into 140 g of deionized water, and heated while stirring until dissolved to obtain a clear impregnation solution. 200 g of alumina-silica carrier (at an alumina to silica ratio of 1:1) was impregnated with the above solution by a saturated impregnation method for 2 hours, and dried at 120° C. for 2 hours, followed by calcination under a flow of air at a calcination temperature of 400° C. for 2 hours, with a gas-to-carrier ratio of 2.0 L/(g·hr), to obtain a semi-finished catalyst I-Z-S4, of which the total carbon content is shown in Table V-1; 5 g of ethanol was added to 150 g of deionized water, and stirred to obtain a clear solution. I-Z-S4 was impregnated with the above solution by a saturated impregnation method for 0.5 hours, and then dried at 110° C. for 3 hours to obtain a catalyst I-4. The content of the metallic element having hydrogenation activity and the metallic element of the coagent, on the basis of oxide, based on the total weight of the catalyst I-4 is shown in Table V-1.

Example V-5

A hydrogenation catalyst was produced in the same manner as in Example V-2 except that, after the metal active component was impregnated into the carrier, the carrier was calcined at a temperature of 450° C. for 6 hours. The total carbon content of the resultant semi-finished catalyst is shown in Table V-1. In the resultant catalyst I-5, the content of the metallic element having hydrogenation activity and the metallic element of the coagent, on the basis of oxide, based on the total weight of the catalyst I-5 is shown in Table V-1.

Example V-6

A hydrogenation catalyst was produced in the same manner as in Example V-1 except that the gas-to-carrier ratio used during the calcination was 1.0 L/(g·hr). In the resultant catalyst I-6, the content of the metallic element having hydrogenation activity and the metallic element of the coagent, on the basis of oxide, based on the total weight of the catalyst I-6 is shown in Table V-1.

Example V-7

A hydrogenation catalyst was produced in the same manner as in Example V-1 except that the ratio of the first organic complexing agent to the second organic complexing agent was changed from 30 g and 30 g to 50 g and 10 g, respectively. In the resultant catalyst I-7, the content of the metallic element having hydrogenation activity and the metallic element of the coagent, on the basis of oxide, based on the total weight of the catalyst I-7 is shown in Table V-1.

Examples V-8 to V-11 illustrate the process for producing the hydrogenation catalyst II.

Example V-8

The hydrogenation catalyst II-1 was produced as follows:
A certain amount of microporous alumina precursor (a first hydrated alumina, industrial product obtained by sodium metaaluminate-carbon dioxide method, product name dry boehmite, produced by Shandong Aluminum Factory, containing 80% by weight of boehmite and 5% by weight of gibbsite) was weighed. A certain amount of macroporous alumina precursor (a second hydrated alumina, industrial product obtained by sodium metaaluminate-aluminum sulfate method, product name Changling dry rubber powder, produced by the Catalyst Plant of Changling Refinery, containing 68% by weight of boehmite and 5% by weight of gibbsite) was also weighed. The two kinds of hydrated alumina were uniformly mixed at a dry weight ratio of 75:25, and an extrusion assistant, an adhesive and water were added, and then extruded into a trilobal strip having a circumscribed circle diameter of 1.4 mm, dried at 120° C., and calcined at 550-650° C., respectively, for 4 hours, to produce hydrogenation catalyst carriers. A certain amount of the alumina carriers were respectively weighed, impregnated with an ammonium fluoride (chemically pure) aqueous solution for 1 hour, dried at 120° C., and calcined at 530° C. for 4 hours to obtain fluorine-containing alumina carriers. The fluorine-containing alumina carriers were impregnated with a mixed aqueous solution of quantitative ammonium metatungstate (chemically pure) and nickel nitrate (chemically pure) for 4 hours, dried at 120° C., and calcined at 530° C. for 4 hours to obtain a hydrogenation catalyst II-1, which comprises 4% by weight of nickel (on the basis of NiO), 30% by weight of tungsten (on the basis of tungsten oxide), 4% by weight of fluorine (on the basis of elemental fluorine), with the balance being alumina.

Example V-9

The hydrogenation catalyst II-2 was produced as follows:
27.2 g of molybdenum trioxide, 9.1 g of basic cobalt carbonate, 5.5 g of phosphoric acid, and 7.6 g of citric acid were weighed into 55 mL of deionized water, heated to 80° C. while stirring to dissolve, producing a brown-red clear solution after about 1 hour. The solution was added to a beaker, heated to 90° C. and kept under stirring for 8 hours, and water was added to 85 mL to obtain a clear impregnation solution. 2000 g of aluminum hydroxide powder (dry rubber powder produced by the Catalyst Plant of Changling Refining & Chemical Co., Ltd., 71% by weight on dry basis) and 1039 g of silica sol (product of Qingdao Ocean Chemical Plant, silica content: 30% by weight) were uniformly mixed. The resultant mixture was extruded into a butterfly strip having a circumscribed circle diameter of 1.4 mm by an extruder, and the extruded wet strip was dried at 120° C. for 4 hours, followed by calcination at 600° C. for 3 hours to obtain a carrier comprising 18.0% by weight of silica and 82.0% by weight of alumina. The water absorption of the carrier was 0.85. 100 g of the carrier was impregnated with 85 mL of the clear impregnation solution by a saturated impregnation method for 2 hours, dried at 120° C. for 2 hours, and further dried at 250° C. for 3 hours to obtain a hydrogenation catalyst II-2 containing 3.9% by weight of Co (on the basis of CoO), and 20.1% by weight of molybdenum (on the basis of $MoO_3$), 2.1% by weight of phosphorus (on the basis of $P_2O_5$), 5.6% of citric acid, with the balance being alumina.

Example V-10

The hydrogenation catalyst II-3 was produced as follows:

A high-concentration $NaAlO_2$ solution containing 210 g of alumina/liter and having a causticity coefficient of 1.62 was mixed with deionized water to prepare 5 liters of solution having an $Al_2O_3$ concentration of 40 g/L, and then 16.3 g of sodium gluconate was added to obtain a $NaAlO_2$ solution containing sodium gluconate. The solution was then transferred to a gelation reactor having a total volume of 8 L and a height-diameter ratio of 8, equipped with a $CO_2$ gas distributor at the lower portion. The temperature of the solution was controlled at 25±5° C., and a $CO_2$ gas having a concentration of 90% by volume was introduced from the bottom of the reactor to conduct a gelation reaction. The gelation temperature was controlled at 20-40° C., and the flow rate of the $CO_2$ gas was adjusted to 15±2 L/min. The pH arrived at 8.0-8.5 within 4-6 minutes at the end of reaction, and at this time, the aeration was stopped, and the gelation reaction was terminated. The resulting slurry was heated to 70° C. and aged for 4 hours, and then filtered using a vacuum filter. After filtration, the filter cake was rinsed with 20 liters of deionized water (at 70° C.) for about 30 minutes. The washed filter cake was added to 1.5 liters of deionized water and stirred to form a slurry. The slurry was pumped into a spray dryer and dried to obtain hydrated alumina P1-2. 300 g of pseudo-boehmite P1-2 and 700 g of pseudo-boehmite P2-3 (commercial pseudo-boehmite SD powder produced by Shandong Aluminum Co., Ltd.) were mixed and extruded by an extruder into a clover strip having a circumscribed circle diameter of 1.6 mm, and dried at 120° C. for 8 hours. 300 g of the resultant was taken and calcined at 800° C. for 4 hours under a flow of air to obtain a carrier, with the air flow rate being 1.5 normal cubic meters/kg·hr. 100 g of the carrier was weighed and impregnated with 85 ml of an aqueous solution containing 20.6 g of nickel nitrate, 34.8 g of ammonium paramolybdate and 11.4 g of phosphoric acid for 1.5 hours, dried at 120° C. for 5 hours, treated at 380° C. for 4 hours, and then impregnated with 55 ml of an aqueous solution containing 8.4 g of glycerol for 2 hours, and dried at 140° C. for 5 hours to obtain a hydrogenation catalyst II-3 containing 3.5% by weight of nickel (on the basis of NiO), 19.1% by weight of molybdenum (on the basis of $MoO_3$), 4.8% by weight of phosphorus (on the basis of $P_2O_5$), 5.7% of an organic additive, with the balance being alumina.

Example V-11

The hydrogenation catalyst II-4 was produced as follows:

2000 g of aluminum hydroxide powder (dry rubber powder produced by the Catalyst Plant of Changling Branch, 70% by weight on dry basis) and 299 g of silica sol containing 25% of silica (Qingdao Ocean Chemical Plant) were weighed, and extruded into a butterfly strip having a circumscribed circle diameter of 1.3 mm, and the wet strip was dried at 120° C. for 4 hours and calcined at 600° C. for 3 hours to obtain a carrier comprising 5.0% by weight of silica. 200 g of the carrier was weighed, and the carrier was impregnated with 176 ml of an aqueous solution containing 16.9 g of ammonium fluoride for 2 hours, dried at 120° C. for 3 hours, and calcined at 420° C. for 3 hours to obtain a fluorine-containing silica-alumina carrier. The carrier was impregnated with 170 ml of an aqueous solution containing 23.0 g of ammonium paramolybdate for 3 hours, dried at 120° C. for 4 hours, and further dried at 170° C. for 4 hours to obtain a molybdenum-containing carrier. Then, the carrier was impregnated with 162 ml of an aqueous solution containing 53.2 g of nickel nitrate, 140.7 g of ammonium metatungstate and 18.1 g of phosphoric acid for 3 hours, dried at 200° C. for 4 hours, and then impregnated with 121 ml of an aqueous solution containing 77.3 g of ethylene glycol, and dried at 120° C. for 6 hours, to obtain a hydrogenation catalyst II-4 containing 3.6% by weight of nickel (on the basis of NiO), 5.0% by weight of molybdenum (on the basis of $MoO_3$), and 32.5% by weight of tungsten (on the basis of tungsten oxide), 2.2% by weight of fluorine (on the basis of elemental fluorine), 3.0% by weight of phosphorus (on the basis of $P_2O_5$), 5.0% by weight of ethylene glycol, with the balance being alumina-silica.

Example V-12 to Example V-18

In the Examples V-12 to V-18, the desulfurization activity and the denitrification activity of the hydrogenation catalyst produced by the process according to the present application and the hydrogenation catalyst provided in the comparative examples were subjected to hydrorefining evaluation according to the following method. The calculation was carried out according to the calculation method for the hydrorefining evaluation results, and the results are shown in Table V-2.

The Middle East straight-run diesel fraction blended with 15% of catalytic diesel was used as the raw material, and its properties are shown in Table V-3. The desulfurization and denitrification activities of the catalyst were evaluated on a 30 ml diesel hydrogenation unit, and 30 mL of catalyst was loaded. The inlet for feedstock oil was located on the top of the hydrogenation unit, and the hydrogenation catalyst II was loaded in the upper bed of the reactor, the hydrogenation catalyst I (or D1) is loaded in the lower bed of the hydrogenation reactor, i.e. downstream of the hydrogenation catalyst II. The catalyst was pre-sulfurized before the reaction. The pre-sulfurization conditions were: a hydrogen partial pressure of 6.4 MPa, a temperature of 320° C., a liquid hourly space velocity of 4 $h^{-1}$, a hydrogen-to-oil volume ratio of 300, and a feed rate of sulfurized oil of 8 mL/h. The reaction conditions were as follows: a hydrogen partial pressure of 6.4 MPa, a reaction temperature of 350° C., a hydrogen-to-oil volume ratio of 300, and a liquid hourly space velocity of 1.5 $h^{-1}$. Samples were collected after 4 hours and 500 hours of reaction, respectively, and the sulfur and nitrogen contents of the raw material and the resultant product were determined by gas chromatography.

Comparative Example V-2 to Comparative Example V-4

The catalyst D1, the catalyst combination D1+II-1 and the catalyst II-1 were subjected to hydrorefining evaluation according to the process as described in Example V-12 to Example V-18, and the results were calculated according to the calculation method for the hydrorefining evaluation results, and the results were shown in Table V-2 below.

Calculation Method for the Hydrorefining Evaluation Results:

The hydrodesulfurization activity of the catalyst was evaluated relative to the reference agent D1 (i.e. the catalyst produced in Comparative Example V-1), and the hydrodesulfurization reaction was treated as a 1.65-order reaction.

The reaction rate constant $k(X)_{HDS}$ of the Catalyst X was calculated according to equation (1):

$$k(X)_{HDS} = LHSV \times \left( \frac{1}{\left(\text{Sulfur content of the raw material}\right)^{0.65}} - \frac{1}{\left(\text{Sulfur content of the product}\right)^{0.65}} \right) \quad (1)$$

The LHSV in the equation (1) refers to the liquid hourly space velocity of the hydrocarbon oil employed during the hydrorefining reaction.

The relative hydrodesulfurization activity of the Catalyst X was calculated according to equation (2) using the hydrodesulfurization activity of the catalyst D1 [denoted as $k(D1)_{HDS}$] produced in Comparative Example V-1 as the basis reference:

$$\text{Relative hydrodesulfurization activity } (X) = \left( \frac{k(X)_{HDS}}{k(D1)_{HDS}} \right) \times 100\%. \quad (2)$$

The hydrodenitrogenation activity of the catalyst was evaluated relative to the reference agent D1 (i.e. the catalyst produced in Comparative Example V-1), and the hydrodenitrogenation reaction was treated as a first-order reaction. The reaction rate constant $k(X)_{HDN}$ of the Catalyst X was calculated according to equation (3):

$$k(X)_{HDN} = LHSV \times \ln \left( \frac{\text{Nitrogen content of the raw material}}{\text{Nitrogen content of the product}} \right). \quad (3)$$

The LHSV in the equation (3) refers to the liquid hourly space velocity of the hydrocarbon oil employed during the hydrorefining reaction.

The relative hydrodenitrogenation activity of the Catalyst X was calculated according to equation (4) using the hydrodenitrogenation activity of the catalyst D1 [denoted as $k(D1)_{HDN}$] produced in Comparative Example V-1 as the basis reference:

$$\text{Relative hydrodenitrogenation activity } (X) = \left( \frac{k(X)_{HDN}}{k(D1)_{HDN}} \right) \times 100\%. \quad (4)$$

The results of Table V-2 show that the hydrogenation catalyst composition according to the present application has better relative hydrodesulfurization activity and relative hydrodenitrogenation activity, the decrease rate per unit time of the relative activity is small, and the service life is longer.

TABLE V-1

| Item | Comp. Ex. V-1 | Ex. V-1 | Ex. V-2 | Ex. V-3 | Ex. V-4 | Ex. V-5 | Ex. V-6 | Ex. V-7 |
|---|---|---|---|---|---|---|---|---|
| MoO$_3$, wt % | 20.6 | 20.1 | — | 3.0 | 20.0 | — | 20.0 | 20.3 |
| CoO, wt % | — | — | — | — | 3.9 | — | — | — |
| NiO, wt % | 4.3 | 3.9 | 2.3 | 7.8 | — | 2.4 | 3.8 | 4.0 |
| WO$_3$, wt % | — | — | 15.3 | 20.0 | — | 15.4 | — | — |
| ZnO, wt % | — | — | — | — | 2.1 | — | — | — |
| MgO, wt % | 3.1 | 2.8 | — | — | — | — | 2.9 | 2.7 |
| La$_2$O$_3$, wt % | — | — | 1.0 | 1.0 | — | 1.0 | — | — |
| Total carbon content of semi-finished catalyst, wt % | 0.4 | 0.4 | 0.05 | 0.12 | 0.05 | 0.01 | 0.45 | 0.5 |

TABLE V-2

| Examples | Catalyst composition | Proportion of Catalyst I/vol % | Relative hydrodesulfurization activity, % | | Relative hydrodenitrogenation activity, % | |
|---|---|---|---|---|---|---|
| | | | 4 hour of reaction | 500 hours of reaction | 4 hour of reaction | 500 hours of reaction |
| Comp. Ex. V-2 | D1 | 100(D1) | 100 | 76 | 100 | 87 |
| Comp. Ex. V-3 | D1 + II-1 | 20(D1) | 105 | 80 | 105 | 90 |
| Comp. Ex. V-4 | II-1 | 0 | 104 | — | 107 | — |
| Ex. V-12 | I-1 + II-1 | 20 | 147 | 137 | 126 | 117 |
| Ex. V-13 | I-2 + II-2 | 30 | 169 | 162 | 138 | 132 |
| Ex. V-14 | I-3 + II-2 | 40 | 161 | — | 134 | — |
| Ex. V-15 | I-4 + II-3 | 50 | 150 | 144 | 130 | 125 |
| Ex. V-16 | I-5 + II-3 | 60 | 123 | — | 114 | — |
| Ex. V-17 | I-6 + II-4 | 70 | 152 | — | 126 | — |
| Ex. V-18 | I-7 + II-4 | 80 | 144 | — | 120 | — |

Note:
"—" in Table V-2 indicates that no detection has been performed.

TABLE V-3

| S content | 12000 µg/g |
|---|---|
| N content | 220 µg/g |
| Density (20° C.) | 0.8588 g/cm$^3$ |
| Refractive index (20° C.) | 1.4841 |

Example VI-1

This example is provided to illustrate the hydrogenation catalyst I and the process for producing the same according to the present application.

2000 g of aluminum hydroxide powder (dry rubber powder produced by the Catalyst Plant of Changling Refining & Chemical Co., Ltd., 71% by weight on dry basis) and 1039 g of silica sol (product of Qingdao Ocean Chemical Plant, silica content: 30% by weight) were uniformly mixed. The resultant mixture was extruded into a butterfly strip having a circumscribed circle diameter of 1.4 mm by an extruder, and the extruded wet strip was dried at 120° C. for 4 hours, followed by calcination at 600° C. for 3 hours to obtain a carrier I-Z1. The carrier I-Z1 comprises 18.0% by weight of silica and 82.0% by weight of alumina.

54 g of molybdenum trioxide, 19 g of basic cobalt carbonate, 13 g of phosphoric acid, 30 g of citric acid were weighed into 140 g of deionized water, and heated while stirring until dissolved to obtain a clear impregnation solution. 200 g of I-Z1 carrier was impregnated with the above solution by a saturated impregnation method for 2 hours, dried at 120° C. for 2 hours, and then calcined under a flow of air at a calcination temperature of 400° C. for 2 hours, with a gas-to-reagent ratio of 1 L/(g·hr), to obtain a semi-finished catalyst I-Z-S1, of which the total carbon content is shown in Table VI-1; 30 g of citric acid was added to 150 g of deionized water, stirred to obtain a clear solution. I-Z-S1 was impregnated with the above solution by a saturated impregnation method for 2 hours, and then dried at 150° C. for 3 hours to obtain a catalyst I-1. The content of the metallic element having hydrogenation activity of the catalyst, on the basis of oxide, based on the total amount of the catalyst I-1 is shown in Table VI-1.

Comparative Example VI-1

A hydrogenation catalyst was produced in the same manner as in Example VI-1 except that the hydrogenation catalyst I-1 produced in Example VI-1 was calcined at 400° C. for 3 hours to obtain a catalyst D1. The content of the metallic element having hydrogenation activity, on the basis of oxide, based on the total amount of the catalyst D1 is shown in Table VI-1.

Example VI-2

This example is provided to illustrate the hydrogenation catalyst I and the process for producing the same according to the present application.

30 g of nickel nitrate, 45 g of ammonium metatungstate, 15 g of oxalic acid and 21 g of ammonium fluoride were weighed into 140 g of deionized water, and heated while stirring until dissolved to obtain a clear solution. 200 g of alumina carrier was impregnated with the above solution by a saturated impregnation method for 2 hours, dried at 120° C. for 2 hours, and then calcined under a flow of air at a calcination temperature of 360° C. for 6 hours, with a gas-to-reagent ratio of 10.0 L/(g·hr), to obtain a semi-finished catalyst I-Z-S2, of which the total carbon content is shown in Table VI-1; 10 g of diethylene glycol was added to 150 g of deionized water, and stirred to obtain a clear solution. I-Z-S2 was impregnated with the above solution by a saturated impregnation method for 2 hours, and then dried at 150° C. for 3 hours to obtain a catalyst I-2. The content of the metallic element having hydrogenation activity of the catalyst, on the basis of oxide, based on the total amount of the catalyst I-2 is shown in Table VI-1.

Example VI-3

This example is provided to illustrate the hydrogenation catalyst I and the process for producing the same according to the present application.

60 g of ammonium fluoride was weighed, and heated, after an addition of deionized water, while stirring until dissolved, followed by addition of deionized water to 850 ml. 1000 g of zirconia carrier was impregnated with the resultant solution by a saturated impregnation method for 2 hours, then dried at 120° C. for 2 hours, and calcined at 400° C. for 4 hours to obtain a fluorine-containing zirconia carrier I-Z3.

83 g of nickel nitrate, 60 g of ammonium metatungstate, 10 g of ammonium molybdate, 20 g of ammonium dihydrogen phosphate and 20 g of citric acid were weighed into 180 g of deionized water, and heated while stirring until dissolved to obtain a clear solution. 200 g of the fluorine-containing zirconia carrier I-Z3 was impregnated with the above solution by a saturated impregnation method for 2 hours, dried at 120° C. for 2 hours, and then calcined under a flow of air at a calcination temperature of 450° C. for 3 hours, with a gas-to-reagent ratio of 0.3 L/(g·hr), to obtain a semi-finished catalyst IZ-S3, of which the total carbon content is shown in Table VI-1; 15 g of ethylenediamine was added to 150 g of deionized water and stirred to obtain a clear solution. I-Z-S3 was impregnated with the above solution by a saturated impregnation method for 2 hours, and then dried at 120° C. for 3 hours to obtain a catalyst I-3. The content of the metallic element having hydrogenation activity of the catalyst, on the basis of oxide, based on the total amount of the catalyst I-3 is shown in Table VI-1.

Example VI-4

Hydrogenation catalyst I was produced in the same manner as in Example VI-1 except that, after the metal active component was impregnated into the carrier, the carrier was calcined at a temperature of 480° C. for 6 hours. The total carbon content of the semi-finished catalyst obtained is shown in Table VI-1. In the resultant catalyst I-4, the content of the metallic element having hydrogenation activity of the catalyst, on the basis of oxide, based on the total amount of the catalyst I-4 is shown in Table VI-1.

Example VI-5

Hydrogenation catalyst I was produced in the same manner as in Example VI-2 except that the gas-to-reagent ratio used during the calcination was 1.0 L/(g·hr). In the resultant catalyst I-5, the content of the metallic element having hydrogenation activity of the catalyst, on the basis of oxide, based on the total amount of the catalyst I-5 is shown in Table VI-1.

Example VI-6

Hydrogenation catalyst I was produced in the same manner as in Example VI-1 except that the ratio of the first organic complexing agent to the second organic complexing agent was changed from 30 g: 30 g to 50 g: 10 g. In the resultant catalyst I-6, the content of the metallic element having hydrogenation activity of the catalyst, on the basis of oxide, based on the total amount of the catalyst I-6 is shown in Table VI-1.

Examples VI-7 to VI-10 illustrate the process for producing the catalyst II.

Example VI-7

The hydrogenation catalyst II-1 was produced as follows:
A certain amount of microporous alumina precursor (a first hydrated alumina, industrial product obtained by sodium metaaluminate-carbon dioxide method, product name dry boehmite, produced by Shandong Aluminum Factory, containing 80% by weight of boehmite and 5% by weight of gibbsite) was weighed. A certain amount of macroporous alumina precursor (a second hydrated alumina, industrial product obtained by sodium metaaluminate-aluminum sulfate method, product name Changling dry rubber powder, produced by the Catalyst Plant of Changling Refinery, containing 68% by weight of boehmite and 5% by weight of gibbsite) was also weighed. The two kinds of hydrated alumina were uniformly mixed at a dry weight ratio of 75:25, and an extrusion assistant, an adhesive and water were added, and then extruded into a trilobal strip having a circumscribed circle diameter of 1.4 mm, dried at 120° C., and calcined at 550-650° C., respectively, for 4 hours, to produce hydrogenation catalyst carriers. A certain amount of the alumina carriers were respectively weighed, impregnated with an ammonium fluoride (chemically pure) aqueous solution for 1 hour, dried at 120° C., and calcined at 530° C. for 4 hours to obtain fluorine-containing alumina carriers. The fluorine-containing alumina carriers were impregnated with a mixed aqueous solution of quantitative ammonium metatungstate (chemically pure) and nickel nitrate (chemically pure) for 4 hours, dried at 120° C., and calcined at 530° C. for 4 hours to obtain a hydrogenation catalyst II-1, which comprises 4% by weight of nickel (on the basis of NiO), 30% by weight of tungsten (on the basis of tungsten oxide), 4% by weight of fluorine (on the basis of elemental fluorine), with the balance being alumina.

Example VI-8

The hydrogenation catalyst II-2 was produced as follows:
27.2 g of molybdenum trioxide, 9.1 g of basic cobalt carbonate, 5.5 g of phosphoric acid, and 7.6 g of citric acid were weighed into 55 mL of deionized water, heated to 80° C. while stirring to dissolve, producing a brown-red clear solution after about 1 hour. The solution was added to a beaker, heated to 90° C. and kept under stirring for 8 hours, and water was added to 85 mL to obtain a clear impregnation solution. 2000 g of aluminum hydroxide powder (dry rubber powder produced by the Catalyst Plant of Changling Refining & Chemical Co., Ltd., 71% by weight on dry basis) and 1039 g of silica sol (product of Qingdao Ocean Chemical Plant, silica content: 30% by weight) were uniformly mixed. The resultant mixture was extruded into a butterfly strip having a circumscribed circle diameter of 1.4 mm by an extruder, and the extruded wet strip was dried at 120° C. for 4 hours, followed by calcination at 600° C. for 3 hours to obtain a carrier comprising 18.0% by weight of silica and 82.0% by weight of alumina. The water absorption of the carrier was 0.85. 100 g of the carrier was impregnated with 85 mL of the clear impregnation solution by a saturated impregnation method for 2 hours, dried at 120° C. for 2 hours, and further dried at 250° C. for 3 hours to obtain a hydrogenation catalyst II-2 containing 3.9% by weight of Co (on the basis of CoO), and 20.1% by weight of molybdenum (on the basis of $MoO_3$), 2.1% by weight of phosphorus (on the basis of $P_2O_5$), 5.6% of citric acid, with the balance being alumina.

Example VI-9

The hydrogenation catalyst II-3 was produced as follows:
A high-concentration $NaAlO_2$ solution containing 210 g of alumina/liter and having a causticity coefficient of 1.62 was mixed with deionized water to prepare 5 liters of solution having an $Al_2O_3$ concentration of 40 g/L, and then 16.3 g of sodium gluconate was added to obtain a $NaAlO_2$ solution containing sodium gluconate. The solution was then transferred to a gelation reactor having a total volume of 8 L and a height-diameter ratio of 8, equipped with a $CO_2$ gas distributor at the lower portion. The temperature of the solution was controlled at 25±5° C., and a $CO_2$ gas having a concentration of 90% by volume was introduced from the bottom of the reactor to conduct a gelation reaction. The gelation temperature was controlled at 20-40° C., and the flow rate of the $CO_2$ gas was adjusted to 15±2 L/min. The pH arrived at 8.0-8.5 within 4-6 minutes at the end of reaction, and at this time, the aeration was stopped, and the gelation reaction was terminated. The resulting slurry was heated to 70° C. and aged for 4 hours, and then filtered using a vacuum filter. After filtration, the filter cake was rinsed with 20 liters of deionized water (at 70° C.) for about 30 minutes. The washed filter cake was added to 1.5 liters of deionized water and stirred to form a slurry. The slurry was pumped into a spray dryer and dried to obtain hydrated alumina P1-2. 300 g of pseudo-boehmite P1-2 and 700 g of pseudo-boehmite P2-3 (commercial pseudo-boehmite SD powder produced by Shandong Aluminum Co., Ltd.) were mixed and extruded by an extruder into a clover strip having a circumscribed circle diameter of 1.6 mm, and dried at 120° C. for 8 hours. 300 g of the resultant was taken and calcined at 800° C. for 4 hours under a flow of air to obtain a carrier, with the air flow rate being 1.5 normal cubic meters/kg·hr. 100 g of the carrier was weighed and impregnated with 85 ml of an aqueous solution containing 20.6 g of nickel nitrate, 34.8 g of ammonium paramolybdate and 11.4 g of phosphoric acid for 1.5 hours, dried at 120° C. for 5 hours, treated at 380° C. for 4 hours, and then impregnated with 55 ml of an aqueous solution containing 8.4 g of glycerol for 2 hours, and dried at 140° C. for 5 hours to obtain a hydrogenation catalyst II-3 containing 3.5% by weight of nickel (on the basis of NiO), 19.1% by weight of molybdenum (on the basis of $MoO_3$), 4.8% by weight of phosphorus (on the basis of $P_2O_5$), 5.7% of an organic additive, with the balance being alumina.

Example VI-10

The hydrogenation catalyst II-4 was produced as follows:
2000 g of aluminum hydroxide powder (dry rubber powder produced by the Catalyst Plant of Changling Branch, 70% by weight on dry basis) and 299 g of silica sol containing 25% of silica (Qingdao Ocean Chemical Plant) were weighed, and extruded into a butterfly strip having a circumscribed circle diameter of 1.3 mm, and the wet strip was dried at 120° C. for 4 hours and calcined at 600° C. for 3 hours to obtain a carrier comprising 5.0% by weight of silica. 200 g of the carrier was weighed, and the carrier was impregnated with 176 ml of an aqueous solution containing 16.9 g of ammonium fluoride for 2 hours, dried at 120° C. for 3 hours, and calcined at 420° C. for 3 hours to obtain a fluorine-containing silica-alumina carrier. The carrier was impregnated with 170 ml of an aqueous solution containing 23.0 g of ammonium paramolybdate for 3 hours, dried at 120° C. for 4 hours, and further dried at 170° C. for 4 hours to obtain a molybdenum-containing carrier. Then, the carrier was impregnated with 162 ml of an aqueous solution containing 53.2 g of nickel nitrate, 140.7 g of ammonium metatungstate and 18.1 g of phosphoric acid for 3 hours, dried at 200° C. for 4 hours, and then impregnated with 121 ml of an aqueous solution containing 77.3 g of ethylene glycol, and dried at 120° C. for 6 hours, to obtain a hydrogenation catalyst II-4 containing 3.6% by weight of nickel (on the basis of NiO), 5.0% by weight of molybdenum (on the basis of $MoO_3$), and 32.5% by weight of tungsten (on the basis of tungsten oxide), 2.2% by weight of fluorine (on the basis of elemental fluorine), 3.0% by weight of phosphorus (on the basis of $P_2O_5$), 5.0% by weight of ethylene glycol, with the balance being alumina-silica.

Example VI-11 to Example VI-16

In Examples VI-11 to VI-6, the desulfurization activity and the denitrification activity of the hydrogenation catalyst produced by the process according to the present application and the hydrogenation catalyst provided in the comparative examples were subjected to hydrorefining evaluation according to the following method. The calculation was carried out according to the calculation method for the hydrorefining evaluation results, and the results are shown in Table VI-2.

The Middle East straight-run diesel fraction blended with 15% of catalytic diesel oil was used as the raw material, and its properties are shown in Table VI-3. The desulfurization and denitrification activities of the catalyst were evaluated on a 30 ml diesel hydrogenation unit, and 30 mL of catalyst was loaded. The inlet for feedstock oil was located on the top of the hydrogenation unit, the hydrogenation catalyst II was loaded in the upper bed of the reactor, and the hydrogenation catalyst I (or D1) was loaded in the lower bed of the hydrogenation reactor, i.e. downstream of the hydrogenation catalyst II. The catalyst was pre-sulfurized before the reaction. The pre-sulfurization conditions were: a hydrogen partial pressure of 6.4 MPa, a temperature of 320° C., a liquid hourly space velocity of 4 $h^{-1}$, a hydrogen-to-oil volume ratio of 300, and a feed rate of sulfurized oil of 8 mL/h. The reaction conditions were as follows: a hydrogen partial pressure of 6.4 MPa, a reaction temperature of 350° C., a hydrogen-to-oil volume ratio of 300, and a liquid hourly space velocity of 1.5 $h^{-1}$. Samples were collected after 4 hours and 500 hours of reaction, respectively, and the sulfur and nitrogen contents of the raw material and the resultant product were determined by gas chromatography.

Comparative Example VI-2 to Comparative Example VI-4

The catalyst D1, the catalyst combination D1+II-1 and the catalyst II-1 were subjected to hydrorefining evaluation according to the process as described in Example VI-11 to Example VI-16, and the results were calculated according to the calculation method for the hydrorefining evaluation results, and the results were shown in Table VI-2 below.

Calculation Method for the Hydrorefining Evaluation Results:

The hydrodesulfurization activity of the catalyst was evaluated relative to the reference agent D1 (i.e. the catalyst produced in Comparative Example VI-1), and the hydrodesulfurization reaction was treated as a 1.65-order reaction. The reaction rate constant $k(X)_{HDS}$ of the Catalyst X was calculated according to equation (1):

$$k(X)_{HDS} = LHSV \times \left( \frac{1}{\left(\text{Sulfur content of the raw material}\right)^{0.65}} - \frac{1}{\left(\text{Sulfur content of the product}\right)^{0.65}} \right). \quad (1)$$

The LHSV in the equation (1) refers to the liquid hourly space velocity of the hydrocarbon oil employed during the hydrorefining reaction.

The relative hydrodesulfurization activity of the Catalyst X was calculated according to equation (2) using the hydrodesulfurization activity of the catalyst D1 [denoted as $k(D1)_{HDS}$] produced in Comparative Example VI-1 as the basis reference:

$$\text{Relative hydrodesulfurization activity } (X) = \left( \frac{k(X)_{HDS}}{k(D1)_{HDS}} \right) \times 100\%. \quad (2)$$

The hydrodenitrogenation activity of the catalyst was evaluated relative to the reference agent D1 (i.e. the catalyst produced in Comparative Example V-1), and the hydrodenitrogenation reaction was treated as a first-order reaction. The reaction rate constant $k(X)_{HDN}$ of the Catalyst X was calculated according to equation (3):

$$k(X)_{HDN} = LHSV \times \ln\left( \frac{\text{Nitrogen content of the raw material}}{\text{Nitrogen content of the product}} \right). \quad (3)$$

The LHSV in the equation (3) refers to the liquid hourly space velocity of the hydrocarbon oil employed during the hydrorefining reaction.

The relative hydrodenitrogenation activity of the Catalyst X was calculated according to equation (4) using the hydrodenitrogenation activity of the catalyst D1 [denoted as $k(D1)_{HDN}$] produced in Comparative Example VI-1 as the basis reference:

$$\text{Relative hydrodenitrogenation activity } (X) = \left( \frac{k(X)_{HDN}}{k(D1)_{HDN}} \right) \times 100\%. \quad (4)$$

The results of Table VI-2 show that the hydrogenation catalyst composition according to the present application has better relative hydrodesulfurization activity and relative hydrodenitrogenation activity, the decrease rate per unit time of the relative activity is small, and the service life is longer.

TABLE VI-1

| Item | Comp. Ex. VI-1 | Ex. VI-1 | Ex. VI-2 | Ex. VI-3 | Ex. VI-4 | Ex. VI-5 | Ex. VI-6 |
|---|---|---|---|---|---|---|---|
| MoO$_3$, wt % | 20.5 | 20.2 | — | 3.2 | 20.0 | — | 20.1 |
| CoO, wt % | 4.7 | 4.0 | — | — | 4.1 | — | 3.9 |
| NiO, wt % | — | — | 3.1 | 7.9 | — | 3.0 | — |
| WO$_3$, wt % | — | — | 15.2 | 21.0 | — | 15.5 | — |
| F, wt % | — | — | 3.3 | 1.2 | — | 3.1 | — |
| Si, wt % | 6.2 | 5.8 | — | — | 5.9 | — | 6.1 |
| Total carbon content of semi-finished catalyst, wt % | 0.04 | 0.04 | 0.4 | 0.1 | 0.03 | 0.45 | 0.5 |

TABLE VI-2

| Examples | Catalyst composition | Proportion of Catalyst I/% | Relative hydrodesulfurization activity, % | | Relative hydrodenitrogenation activity, % | |
|---|---|---|---|---|---|---|
| | | | 4 hour of reaction | 500 hours of reaction | 4 hour of reaction | 500 hours of reaction |
| Comp. Ex. VI-2 | D1 | 100(D1) | 100 | 71 | 100 | 82 |
| Comp. Ex. VI-3 | D1 + II-1 | 20(D1) | 125 | 80 | 112 | 86 |
| Comp. Ex. VI-4 | II-1 | 0 | 120 | — | 118 | — |
| Ex. VI-11 | I-1 + II-1 | 20 | 146 | 138 | 131 | 123 |
| Ex. VI-12 | I-2 + II-2 | 30 | 156 | 149 | 136 | 130 |
| Ex. VI-13 | I-3 + II-2 | 40 | 151 | — | 132 | — |
| Ex. VI-14 | I-4 + II-3 | 50 | 133 | — | 114 | — |

TABLE VI-2-continued

| Examples | Catalyst composition | Proportion of Catalyst I/% | Relative hydrodesulfurization activity, % | | Relative hydrodenitrogenation activity, % | |
|---|---|---|---|---|---|---|
| | | | 4 hour of reaction | 500 hours of reaction | 4 hour of reaction | 500 hours of reaction |
| Ex. VI-15 | I-5 + II-3 | 60 | 152 | — | 131 | — |
| Ex. VI-16 | I-6 + II-4 | 70 | 147 | — | 130 | — |

Note:
"—" in Table VI-2 indicates that no detection has been performed.

TABLE VI-3

| S content | 12000 µg/g |
|---|---|
| N content | 220 µg/g |
| Density (20° C.) | 0.8588 g/cm³ |
| Refractive index (20° C.) | 1.4841 |

The embodiments of the present application have been described in detail with reference to the working examples, and the scope of the present application is not limited to these embodiments, but defined by the appended claims. A person skilled in the art can make an appropriate modification to these embodiments without departing from the spirit and scope of the present application, and such modified embodiments are obviously covered by the scope of the present application.

The invention claimed is:

1. A process for producing a hydrogenation catalyst, comprising the steps of:
   (1) contacting a first active metal component, a first organic complexing agent and an optional coagent with a carrier to obtain a composite carrier;
   (2) calcining the composite carrier to obtain a calcined composite carrier, wherein the total carbon content on dry basis of the calcined composite carrier is 1% by weight or less, based on the dry weight of the calcined composite carrier; and
   (3) contacting a second organic complexing agent with the calcined composite carrier to obtain the hydrogenation catalyst, and
   optionally, the process further comprises one or more of the following steps:
   (0) producing the carrier; and
   (4) sulfurizing the hydrogenation catalyst,
   wherein the process does not comprise the calcination step during or after the step (3).

2. The process according to claim 1, wherein the step (0) further comprises the following steps:
   (0-1) forming a carrier precursor or a carrier precursor composition to obtain a preformed carrier, wherein the carrier precursor composition comprises a carrier precursor, a shaping aid, and an optional coagent;
   (0-2) calcining the preformed carrier to obtain the carrier; and
   (0-3) optionally contacting the coagent and/or a second active metal component with the carrier,
   wherein the coagent is one or more selected from the group consisting of metallic coagents and non-metallic coagents, and wherein the metallic coagent is one or more selected from the group consisting of Group IIB metallic elements, Group IA metallic elements, Group IIA metallic elements, and rare earth metallic elements,
   wherein the non-metallic coagent is one or more selected from the group consisting of Group IVA elements, Group VIIA elements, Group VA elements and Group IIIA elements, and
   wherein, in the hydrogenation catalyst, the content of the metallic coagent, calculated on the basis of the metallic element, is in a range from 0% by weight to 10% by weight, based on the total weight of the hydrogenation catalyst, and the content of the non-metallic coagent, calculated on the basis of the non-metallic element, is in a range from 0% by weight to 10% by weight.

3. The process according to claim 2, wherein conditions for the calcination of the step (0-2) include: a calcination temperature in a range from 250° C. to 500° C., and a calcination time in a range from 2 h to 8 h.

4. The process according to claim 2, wherein the step (0-3) further comprises the following steps:
   (0-3-1) impregnating the carrier with the coagent and/or the second active metal component to obtain an impregnated product; and
   (0-3-2) drying the impregnated product at a temperature in a range from 100° C. to 250° C., and/or calcining the impregnated product at a temperature in a range from 250° C. to 600° C.

5. The process according to claim 1, wherein the step (1) further comprises the following steps:
   (1-1) impregnating the carrier with the first active metal component, the first organic complexing agent, and the optional coagent to obtain an impregnated product, and
   (1-2) heat-treating the impregnated product at a temperature in a range from 100° C. to 250° C. to obtain the composite carrier.

6. The process according to claim 1, wherein conditions for the calcination of the step (2) include: a calcination temperature in a range from 350° C. to 500° C., a calcination time in a range from 0.5 h to 8 h, an oxygen-containing gas introduced in an amount of more than 0.2 L/(g·hr), based on the weight of the carrier.

7. The process according to claim 1, wherein the step (3) further comprises the following steps:
   (3-1) impregnating the calcined composite carrier with the second organic complexing agent to obtain an impregnated product; and
   (3-2) heat-treating the impregnated product at a temperature in a range from 100° C. to 250° C. to obtain the hydrogenation catalyst.

8. The process according to claim 1, wherein the content of the first active metal component, calculated on the basis of the weight of oxides of the first active metal component, is in a range from 6% by weight to 70% by weight based on the total weight of the hydrogenation catalyst; a molar ratio of the first organic complexing agent to the first active metal component is in a range from 0.03:1 to 2:1; and a molar ratio of the first organic complexing agent to the second organic complexing agent is in a range from 1:0.25 to 1:4.

9. The process according to claim 2, wherein the carrier precursor is one or more selected from the group consisting of alumina, silica, alumina-silica, titania, magnesia, silica-magnesia, silica-zirconia, silica-thoria, silica-beryllia, silica-titania, silica-zirconia, titania-zirconia, silica-alumina-thoria, silica-alumina-titania, silica-alumina-magnesia, and silica-alumina-zirconia, and precursors thereof.

10. The process according to claim 1, wherein
    the first organic complexing agent and the second organic complexing agent are the same or different from each other, each independently being one or more selected from the group consisting of ethylene glycol, glycerol, polyethylene glycol, diethylene glycol, butanediol, acetic acid, maleic acid, oxalic acid, nitrilotriacetic acid, a salt of nitrilotriacetic acid, 1,2-cyclohexanediamine tetraacetic acid, a salt of 1,2-cyclohexanediamine tetraacetic acid, citric acid, tartaric acid, malic acid, ethylenediamine, and ethylenediamine tetraacetic acid, and a salt ethylenediamine tetraacetic acid.

11. The process according to claim 1, wherein the first active metal component is one or more selected from the group consisting of a Group VIB metallic element and a Group VIII metallic element.

12. The process according to claim 1, wherein the process does not comprise any step for introducing a coagent and/or a metallic element having hydrogenation activity during or after the step (3).

13. The process according to claim 2, wherein the total content of the first active metal component and the second active metal component, calculated on the basis of the weight of oxides of the first active metal component and oxides of the second active metal component, is in a range from 6% by weight to 70% by weight, based on the total weight of the hydrogenation catalyst; a molar ratio of the first organic complexing agent to the first active metal component is in a range from 0.03:1 to 2:1; a molar ratio of the first organic complexing agent to the second organic complexing agent is in a range from 1:0.25 to 1:4; and a molar ratio of the first active metal component to the second active metal component is in a range from 1:0 to 1:0.4.

14. The process according to claim 2, wherein the first active metal component and the second active metal component are the same or different from each other, each independently being one or more selected from the group consisting of a Group VIB metallic element and a Group VIII metallic element.

* * * * *